US008192803B2

(12) United States Patent
Makuta et al.

(10) Patent No.: US 8,192,803 B2
(45) Date of Patent: *Jun. 5, 2012

(54) INK JET RECORDING METHOD AND INK JET RECORDING DEVICE

(75) Inventors: Toshiyuki Makuta, Kanagawa (JP); Yusuke Nakazawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 951 days.

This patent is subject to a terminal disclaimer.

(21) Appl. No.: 11/865,131

(22) Filed: Oct. 1, 2007

(65) Prior Publication Data

US 2008/0081116 A1 Apr. 3, 2008

(30) Foreign Application Priority Data

Sep. 29, 2006 (JP) ................................ 2006-269414
Apr. 12, 2007 (JP) ................................ 2007-104687

(51) Int. Cl.
*B05D 3/06* (2006.01)
*C08F 2/06* (2006.01)
*C08F 2/46* (2006.01)

(52) U.S. Cl. .................. 427/511; 427/372.2; 427/407.1; 427/508; 427/514

(58) Field of Classification Search ............... 427/407.1, 427/372.2, 508, 511, 514
See application file for complete search history.

(56) References Cited

U.S. PATENT DOCUMENTS 5,629,354 A 5/1997 West et al.
5,871,894 A * 2/1999 Takahashi et al. ............ 430/538
5,988,807 A 11/1999 Bernard et al.
6,007,182 A 12/1999 Matsubara et al.
6,214,458 B1 4/2001 Kobayashi et al.
6,620,469 B2 * 9/2003 Totani et al. ............... 428/32.34
6,797,768 B2 9/2004 Lyons
6,929,827 B2 * 8/2005 Yonehara ...................... 427/493
7,374,280 B2 5/2008 Kusunoki
7,517,399 B2 4/2009 Sato et al.
7,537,652 B2 5/2009 Koganehira et al.
7,645,036 B2 1/2010 Umebayashi et al.
(Continued)

FOREIGN PATENT DOCUMENTS

EP 1 149 881 A2 10/2001
(Continued)

OTHER PUBLICATIONS

European Search Report Date Dec. 28, 2007.

(Continued)

*Primary Examiner* — Elena T Lightfoot
(74) *Attorney, Agent, or Firm* — Sughrue Mion, PLLC

(57) ABSTRACT

An ink jet recording method comprising: applying an undercoating liquid containing a polymer onto a recording medium; partially curing the undercoating liquid that has been applied onto the recording medium; and recording an image by ejecting an ink that is curable by irradiation with actinic energy onto the partially cured undercoating liquid. According to the invention, an image having excellent uniformity between various types of recording mediums can be recorded, irrespective of the type of the recording medium; ink bleeding or unevenness in line width or color due to coalescence of the ink droplets can be effectively suppressed; and an image can be well reproduced to details with high density while maintaining a uniform dot diameter, irrespective of the form of the image, when an image having low dot density is recorded with a small amount of a liquid (e.g., an image having low resolution or density).

12 Claims, 9 Drawing Sheets

U.S. PATENT DOCUMENTS

| | | | | |
|---|---|---|---|---|
| 7,658,489 | B2 | 2/2010 | Yamanobe | |
| 2003/0021961 | A1 | 1/2003 | Ylitalo et al. | |
| 2003/0083396 | A1 | 5/2003 | Ylitalo et al. | |
| 2003/0130371 | A1 | 7/2003 | Tanaka et al. | |
| 2004/0045931 | A1 | 3/2004 | Hill et al. | |
| 2004/0091642 | A1 | 5/2004 | Murakami et al. | |
| 2005/0065235 | A1 | 3/2005 | Bauer | |
| 2005/0190248 | A1 | 9/2005 | Konno et al. | |
| 2005/0195260 | A1 | 9/2005 | Figov et al. | |
| 2006/0023044 | A1 | 2/2006 | Bauer | |
| 2006/0033794 | A1 | 2/2006 | Yamanobe | |
| 2006/0050121 | A1 | 3/2006 | Takabayashi et al. | |
| 2006/0066704 | A1 | 3/2006 | Nishida | |
| 2006/0075916 | A1 * | 4/2006 | Edwards et al. | 101/483 |
| 2006/0075917 | A1 | 4/2006 | Edwards | |
| 2006/0077243 | A1 | 4/2006 | Edwards | |
| 2006/0203024 | A1 | 9/2006 | Kusunoki | |
| 2006/0203056 | A1 | 9/2006 | Furukawa et al. | |
| 2006/0230969 | A1 * | 10/2006 | Vosahlo | 101/488 |
| 2006/0258774 | A1 | 11/2006 | Kim et al. | |
| 2007/0216743 | A1 | 9/2007 | Makuta et al. | |
| 2008/0079796 | A1 | 4/2008 | Makuta et al. | |
| 2008/0192102 | A1 * | 8/2008 | Leenders et al. | 347/102 |
| 2008/0199631 | A1 | 8/2008 | Makuta | |

FOREIGN PATENT DOCUMENTS

| | | | | |
|---|---|---|---|---|
| EP | 1 426 193 | A1 | | 6/2004 |
| EP | 1 652 686 | A1 | | 5/2006 |
| EP | 1 671 804 | A1 | | 6/2006 |
| EP | 1 671 805 | A2 | | 6/2006 |
| EP | 1 728 644 | A1 | | 12/2006 |
| EP | 1 870 247 | A1 | | 12/2007 |
| EP | 1 902 849 | A1 | | 3/2008 |
| EP | 1 905 608 | A1 | | 4/2008 |
| JP | 61-043592 | A | | 3/1986 |
| JP | 63-60783 | A | | 3/1988 |
| JP | 06-313127 | A | | 11/1994 |
| JP | 07-040649 | A | | 2/1995 |
| JP | 8-174997 | A | | 7/1996 |
| JP | 08171010 | A | * | 7/1996 |
| JP | 08-218018 | A | | 8/1996 |
| JP | 10-067905 | A | | 3/1998 |
| JP | 3642152 | B2 | | 10/1998 |
| JP | 10-323975 | A | | 12/1998 |
| JP | 2000-135781 | A | | 5/2000 |
| JP | 2000141616 | A | | 5/2000 |
| JP | 2000141873 | A | | 5/2000 |
| JP | 3478495 | B2 | | 6/2001 |
| JP | 2001-181549 | A | | 7/2001 |
| JP | 2001-348519 | A | | 12/2001 |
| JP | 2002 225425 | A | | 8/2002 |
| JP | 2002-370445 | A | | 12/2002 |
| JP | 2003-012971 | A | | 1/2003 |
| JP | 2003-145745 | A | | 5/2003 |
| JP | 2004-42525 | A | | 2/2004 |
| JP | 2004-042548 | A | | 2/2004 |
| JP | 2004-42548 | A | | 2/2004 |
| JP | 2004276322 | | * | 10/2004 |
| JP | 2004276322 | A | * | 10/2004 |
| JP | 2005-96254 | A | | 4/2005 |
| JP | 2005-126540 | A | | 5/2005 |
| JP | 2005-154767 | A | | 6/2005 |
| JP | 2005 254562 | A | | 9/2005 |
| JP | 2006-137183 | A | | 6/2006 |
| JP | 2006-137185 | A | | 6/2006 |
| WO | WO 02/053383 | A2 | | 7/2002 |
| WO | 02/085638 | A1 | | 10/2002 |
| WO | 2004/002746 | A1 | | 1/2004 |
| WO | 2004/087824 | A2 | | 10/2004 |
| WO | 2006/046061 | A1 | | 5/2006 |
| WO | WO 2006/068677 | A1 | | 6/2006 |
| WO | 2006/104278 | A1 | | 10/2006 |
| WO | 2006/128839 | A1 | | 12/2006 |
| WO | 2006/128849 | A2 | | 12/2006 |

OTHER PUBLICATIONS

EP Communication dated Jul. 13, 2010 in EP Application No. 07016628.5, 8 pages.

EP Communication dated Dec. 2, 2010 in EP Application No. 07017352.1, 7 pages.

EP Communication dated Oct. 1, 2007 in EP Application No. 07012056.3, 6 pages.

Office Action dated Jul. 26, 2011 on Japanese Application No. JP 2007-104687, English language translation.

Office Action dated Aug. 9, 2011 on Japanese Application No. JP 2007-116850.

Office Action dated Aug. 9, 2011 on Japanese Application No. JP 2007-162307.

* cited by examiner

INK JET RECORDING METHOD AND INK JET RECORDING DEVICE

CROSS-REFERENCE TO RELATED APPLICATION

This application claims priority under 35 USC 119 from Japanese Patent Application Nos. 2006-269414 and 2007-104687, the disclosures of which are incorporated by reference herein.

BACKGROUND OF THE INVENTION

1. Field of the Invention

The invention relates to an ink jet recording method and an ink jet recording device that are favorably used for formation of a high-quality image at high speed.

2. Description of the Related Art

An ink jet method of ejecting ink in the form of liquid droplets from an ink ejector has been used in various kinds of printers for the reasons of being compact and less expensive, capable of forming an image without contacting a recording medium, and the like. Among these ink jet methods, there are a piezo ink jet method utilizing deformation of piezoelectric elements to eject ink and a thermal ink jet method utilizing a boiling phenomenon of ink due to thermal energy to eject the ink in the form of droplets, which have the characteristics of high resolution and high-speed printability.

Improvements in speed and image quality have currently become important objectives, upon printing by ejecting ink droplets onto a plain paper sheet or a non-water absorbing recording medium made of plastics or the like with an ink jet printer.

Ink jet recording is a method of ejecting ink droplets according to image data to form a line or an image on a recording medium with the liquid droplets. However, there have been problems in practical use, particularly in a case of recording on the above-described non-absorbing recording medium, e.g., bleeding of an image easily occurs, or mixing of adjacent ink droplets occurs on the recording medium to inhibit formation of a sharp image, when it takes time for the liquid droplets to dry or penetrate into the recording medium after having been ejected. When the liquid droplets mix with each other, the ejected adjacent liquid droplets coalesce with each other to shift from the positions at which they have landed, thereby causing unevenness in line width in a case of forming fine lines or unevenness in color in a case of forming a colored area, or the like. Further, since the degree of occurrence of unevenness in line width or color unevenness in a colored area varies depending on ink absorption and wettability of the surface of the recording medium, there has also been a problem in that different images are formed on different types of recording media, even when the same ink is used under the same ejection conditions.

As a method of suppressing image bleeding or nonuniformity of line width, there is a method of promoting fixation of liquid droplets. For example, there have been disclosed methods of using inks of two-liquid type having reactivity and allowing them to react with each other on a recording medium to achieve a depicting property with high definition, such as a method of recording with ink containing an anionic dye after application of a liquid containing a basic polymer (for example, refer to Japanese Patent Application Laid-Open (JP-A) No. 63-60783), or a method of applying ink containing an anionic compound and a coloring material after application of a liquid composition containing a cationic substance (for example, refer to JP-A No. 8-174997).

An ink jet recording method has also been proposed in which an ultraviolet-curable ink is used as the ink, the ejected ink dots ejected onto a recording medium are irradiated with ultraviolet rays in conformity with the timing of ejection, then the dots are pre-cured to be thickened to such an extent that the adjacent dots do not mix with each other, and thereafter the dots are further irradiated with ultraviolet rays to be completely cured (for example, refer to JP-A No. 2004-42548).

Further, a method has been proposed that improves visibility or bleeding of color ink or a problem such as variation in the obtained images formed on different types of recording media, by applying a radiation curable white ink to form a uniform undercoating layer onto a transparent or semi-transparent non-absorbing recording medium, then curing or thickening the layer by irradiating with radiation rays, and thereafter recording with a radiation curable color ink (for example, refer to JP-A No. 2003-145745 and JP-A No. 2004-42525). There has also been proposed a method in which a substantially transparent actinic ray-curable ink is applied onto a recording medium in place of the above radiation curable white ink by an ink jet head (for example, refer to JP-A No. 2005-96254).

However, in the method described in JP-A No. 2004-42548, although bleeding can be suppressed, there still remains a problem of variation in images among various types of recording media, and thus a problem of unevenness in line width, color or the like due to mixing of ink droplets has not been sufficiently solved. This problem of unevenness in line width, color or the like due to mixing of ink droplets has also not been sufficiently solved by either of the methods described in JP-A No. 2003-145745 or JP-A No. 2004-42525. Further, there sill remains a problem of unevenness in line width, color or the like due to mixing of ink droplets in the method described in JP-A No. 2005-96254.

On the other hand, when the ejected amount of an ink is small or the density of the ejected droplets is low, e.g., when an image is recorded by a head unit having low resolution, there are also problems in that disorders or bleeding in an image is caused by unregulated spreading of ink drops (dots), or to the contrary, white spots, degradation in density, bleeding or unevenness in an image is caused by insufficient spreading of the dots.

The invention has been made in view of the above problems and is intended to provide an ink jet recording method and an ink jet recording apparatus by which images having excellent uniformity can be recorded on various types of recording media and ink bleeding or unevenness in line width or color due to coalescence of droplets can be suppressed, and at the same time, an image well reproduced to details with high density can be recorded irrespective of the form of the image, when an image having low dot density (e.g., an image having low resolution or density) is recorded with a small amount of ink, while maintaining the uniformity in dot diameters.

The invention has been achieved based on the findings that it is important that the ejected and formed dots have the characteristics of spreading to a certain extent of area, and are capable of maintaining the shape thereof when the dots spread to coalesce with each other, in order to retain a high degree of density over the whole area of the image to details and allow reproduction of a clear image, in a case where the amount of the ink ejected at the time of recording is small and the dot density is relatively low.

When the dots spread to a desired extent, and the shapes thereof are maintained when they coalesce with each other, a certain degree of density can be achieved even with an inexpensive apparatus provided with a head unit having low resolution, and also the quality of a recorded image can be improved.

SUMMARY OF THE INVENTION

The invention has been made in view of the above problems and provides an ink jet recording method and an ink jet recording device.

According to a first aspect of the invention, there is provided an ink jet recording method comprising:

applying an undercoating liquid containing a polymer onto a recording medium;

partially curing the undercoating liquid that has been applied onto the recording medium; and recording an image by ejecting an ink that is curable by irradiation with actinic energy onto the partially cured undercoating liquid.

According to a second aspect of the invention, there is provided an ink jet recording device comprising:

an undercoating liquid application unit that applies an undercoating liquid containing a polymer onto a recording medium;

an undercoating liquid curing unit that is provided downstream of the undercoating liquid application unit and that partially cures the undercoating liquid by applying energy; and an image recording unit that is provided downstream of the undercoating liquid curing unit and that forms an image by ejecting, onto the partially cured undercoating liquid, an ink that is curable by irradiation with actinic energy rays.

BRIEF DESCRIPTION OF THE DRAWINGS

Exemplary embodiments of the present invention will be described in detail based on the following figures, wherein.

DETAILED DESCRIPTION OF THE INVENTION

Figure 1:
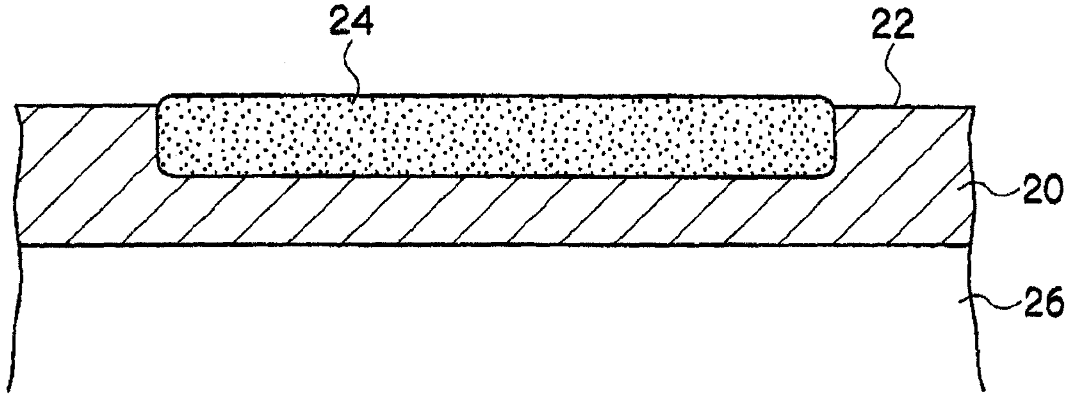
FIG. 1 is a schematic sectional view showing a recording medium on which an image is formed by ejecting an ink onto a partially cured undercoating liquid.

The ink jet recording method of the invention includes the processes of applying an undercoating liquid containing a polymer onto a recording medium; partially curing the applied undercoating liquid; and forming an image by ejecting an ink capable of being cured by irradiation with actinic energy rays onto the partially cured undercoating liquid. The method may further include other processes such as partial curing of the ink, as necessary.

Generally, in an ink jet recording method, ink droplets are ejected so as to partly overlap each other in order to obtain a high degree of image density, and the adjacent ink droplets contact each other before being dried while staying on a recording medium. Therefore, image bleeding or unevenness in line width of fine lines may easily occur due to the coalescence of the ink droplets to prevent the formation of an image having high sharpness. However, according to the ink jet recording method of the invention, in which an undercoating liquid is applied onto a recording medium and partially cured, coalescence between the adjacent ink droplets can be suppressed by the interaction between the undercoating liquid and the ink droplets, even when the ink droplets are applied onto the partially cured undercoating liquid so as to partly overlap each other. Then, image bleeding or unevenness in line width of fine lines can be effectively prevented Therefore, according to the ink jet recording method of the invention, sharp lines with a uniform width can be formed and reproducibility of a fine image such as a fine line in an image can be improved without causing white spots or reduced density in a reverse character or a solid image area.

In the invention, the description "adjacent ink droplets" refers to liquid droplets of an ink of a single color ejected from an ink ejecting port so as to have an overlapping portion, or liquid droplets of inks of different colors respectively ejected from an ink ejecting port so as to have an overlapping portion. The adjacent ink droplets may be the liquid droplets that are ejected at the same time, or may be a combination of preceding liquid droplets and following liquid droplets where the former are ejected prior to the ejection of the latter.

In the invention, at least one kind of ink and at least one kind of undercoating liquid are used as the liquids for formation of an image. The undercoating liquid preferably has a different composition from that of the ink. The undercoating liquid is preferably applied onto the region that is equal to, or larger than, the region on which an image is to be formed by ejecting ink droplets onto a recording medium.

Further, the ink in the invention is preferably used as inks of plural colors in a multicolor ink set. In a case of using the multicolor ink set, it is preferable that after each ejection of the ink of each color, partial curing of the ink droplets is further performed.

One of the specific configurations of the ink jet recording method of the invention includes the steps of applying, onto a recording medium, an undercoating liquid containing a polymerizable or crosslinkable material in advance in the region that is equal to, or larger than, the region on which an image is formed with ink; applying energy rays or heat to the undercoating liquid applied onto the recording medium to partially cure the undercoating liquid; and after the partial curing of the undercoating liquid, ejecting ink droplets of plural colors onto the undercoating liquid that has been applied onto the recording medium, wherein the ink droplets contain a polymerizable or crosslinkable material for formation of the image and have a different composition from that of the undercoating liquid.

In the above method, it is preferable to provide a step of fixing the recorded image to further promote the curing of the undercoating liquid and the ink by applying energy and the like, after the undercoating liquid has been applied and at least all of the desired ink (preferably inks of plural colors) have been ejected, from the viewpoint of achieving excellent fixing properties.

—Application of Undercoating Liquid and Recording—

In the undercoating liquid application process, an undercoating liquid is applied onto a recording medium. The undercoating liquid contains at least a polymer and preferably contains a radical polymerizable compound and a surfactant. The undercoating liquid may further include other components. Details of the components that constitute the undercoating liquid layer will be discussed later.

In the recording process, images are recorded by ejecting an ink that is curable by irradiation with actinic energy rays onto a partially cured undercoating liquid that has been partially cured in a partial curing process to be described later. The ink is applied onto the partially cured undercoating liquid in the form of droplets by using an ink jet nozzle or the like.

In the ink jet recording method of the invention, the undercoating liquid can be applied onto the recording medium using a coating device, an ink jet nozzle, and the like.

(i) Application Using an Application Device

In a preferable embodiment of the invention, an image is recorded by applying an undercoating liquid onto a recording medium using an application device, and thereafter ink droplets are ejected using an ink jet nozzle. Details of the ink jet nozzle will be discussed later.

The type of the application device is not particularly limited and can be selected from known application devices as appropriate according to purposes. Examples of the application devices include an air doctor coater, blade coater, lot coater, knife coater, squeeze coater, immersion coater, reverse roll coater, transfer roll coater, gravure coater, kiss roll coater, cast coater, spray coater, curtain coater and an extruding coater. Details of these coating devices are described in Yuji Harasaki, "Coating Engineering", (1978).

(ii) Ejection by Ink Jet Nozzle

In the invention, an embodiment is also preferable in which an image is recorded by ejecting an undercoating liquid using an ink jet nozzle, and thereafter ink droplets are ejected by the ink jet nozzle. Details of the ink jet nozzle will be discussed later.

As the conditions for applying of the undercoating liquid by the ink jet nozzle, it is preferable that the undercoating liquid is ejected by a head capable of ejecting a greater amount per droplet and having lower nozzle density as compared with the head for an ink, and the head is arranged as a full-line head unit in a width direction of the recording medium. Such a head having a greater amount per droplets to be ejected generally has a high degree of ejection power, and is therefore compatible with an undercoating liquid having high viscosity, and is also advantageous in terms of avoiding nozzle clogging. Further, using of a head capable of ejecting a greater amount per droplet is also advantageous from the viewpoint that an inexpensive head having lower driving frequency can be applied, since the droplet resolution of the undercoating liquid in a direction in which a recording medium is conveyed can be reduced.

In either case of the above embodiments, liquids other than the undercoating liquid and ink can be further applied. Any means such as an application device or an ink jet nozzle can be applied to the application of such liquids, and the timing thereof is also not particularly limited. When a colorant is contained in the liquid other than the undercoating liquid and ink, the liquid is preferably applied by ejecting with an ink jet nozzle, and is preferably applied after the undercoating liquid has been applied.

Next, a method of ejecting using an ink jet nozzle (ink jet recording method) will be discussed.

In the invention, known ink jet recording methods are preferably used, such as an electrostatic induction method in which an ink is ejected by means of electrostatic power, drop-on-demand method (pressure-pulse method) utilizing vibration pressure of a piezoelectric element, acoustic ink jet method in which ink is ejected by means of radiation pressure caused by irradiating the ink with an acoustic beam which has been converted from an electric signal, and a thermal ink jet method of utilizing pressure generated by heating ink to form air bubbles.

In the invention, the ink is preferably ejected onto the partially cured undercoating liquid to a droplet size of from 0.1 pL (picoliter; hereinafter the same) to 100 pL. When the droplet size is within the above range, an image with high sharpness and density can be effectively formed. The droplet size is more preferably in the range of from 0.5 pL to 50 pL.

The amount of the undercoating liquid to be applied in terms of mass ratio per area is preferably from 0.05 to 5, more preferably from 0.07 to 4, and still more preferably from 0.1 to 3.

The ejection interval between the application of the undercoating liquid and the ejection of the ink droplets is preferably in the range of from 5μ seconds to 10 seconds. When the ejection interval is within the above range, the effect of the invention can be remarkably achieved. The ejection interval of the ink droplet is more preferably in the range of from 10μ seconds to 5 seconds, and particularly preferably from 20μ seconds to 5 seconds.

Further, in the recording process, a multicolored image can be recorded using an ink set including inks of multiple colors. In this case, in terms of reproducibility of a fine image or color tone, a step of partially curing at least one of the inks of multiple colors ejected onto a recording medium is preferably provided, and after each ejection of the ink of one color or a predetermined set of colors, an exposure process is preferably provided (so-called pinning exposure).

Actinic energy rays are preferably used for the pinning exposure and details thereof is the same as the cases in the fixing process to be described later. Examples of the actinic energy rays include ultraviolet rays, visible rays, α-rays, γ-rays, X-rays and electron beams. Among these, ultraviolet rays and visible rays are preferable in terms of cost and safety, and ultraviolet rays are most preferable.

The amount of the energy required for partial curing here varies depending on the type or content of a polymerization initiator, but is generally preferably from 1 to 500 $mJ/cm^2$, more preferably from 1 to 200 $mJ/cm^2$, and still more preferably from 1 to 100 $mJ/cm^2$.

—Partial Curing Process—

In the partial curing process, the undercoating liquid that has been applied in the above-described application process is partially cured.

In the invention, the curing process is provided after the application of the undercoating liquid and before the ejection of at least one ink.

In the invention, the description "partial curing" refers to a state in which the undercoating liquid is partially but not completely cured. When the undercoating liquid that has been applied onto a recording medium (substrate) is partially cured, the degree of the curing may be uneven. For example, the curing is preferably more developed at a deeper point in a depth direction.

When a radical polymerizable undercoating liquid is used in the air or the air that has partly been substituted by an inert gas, the radial polymerization at the surface of the undercoating liquid tends to be inhibited by the action of oxygen to inhibit the radial polymerization. As a result, the degree of the curing becomes uneven and the curing tends to be more developed in the inside of the undercoating liquid than at the surface thereof.

In a case where a cationic polymerization liquid is used in the air containing moisture, the curing also tends to be more developed in the inside of the undercoating liquid than at the surface thereof, due to the action of the moisture to inhibit the cationic polymerization.

In the invention, when a radical photopolymerizable undercoating liquid is used under coexistence of oxygen that tends to inhibit radical polymerization and partially photo-cured, the curing degree of the undercoating liquid becomes higher at the outside than in the inside thereof.

When an ink (hereinafter, referred to as "colored liquid" sometimes) is ejected onto an undercoating liquid that has been partially cured, favorable effects can be achieved in the quality of an image that has been formed onto a recording medium. The mechanism of this action can be determined by observing a section of the recording medium.

Hereinafter, explanation will be given taking the case where an ink of about 12 pL is ejected onto a partially cured undercoating liquid layer having a thickness of 5 μm as an example.

In the invention, an undercoating liquid is partially cured and the degree of curing thereof is higher at a point that is closer to a substrate, relative to that at a point more remote from the substrate. In this case, three features can be observed: that is, as shown in FIG. 1, (1) a part of an ink 24 is exposed on the surface; (2) a part of the ink 24 is submerged in an undercoating layer 20; and (3) the undercoating liquid 20 exists between the ink 24 and the substrate 26. Therefore, the recording medium on which an image is formed by applying the ink 24 onto the partially cured undercoating layer 20 has a section as schematically shown in FIG. 1. In a case where all of the above conditions (1), (2) and (3) are satisfied, it can be determined that the ink 24 has been applied onto the undercoating layer 20 which is in a partially cured state. In this case, the ink droplets that have been ejected with high density coalesce with each other to form a colored film, and a uniform and high degree of color density can be achieved.

Figure 2A:
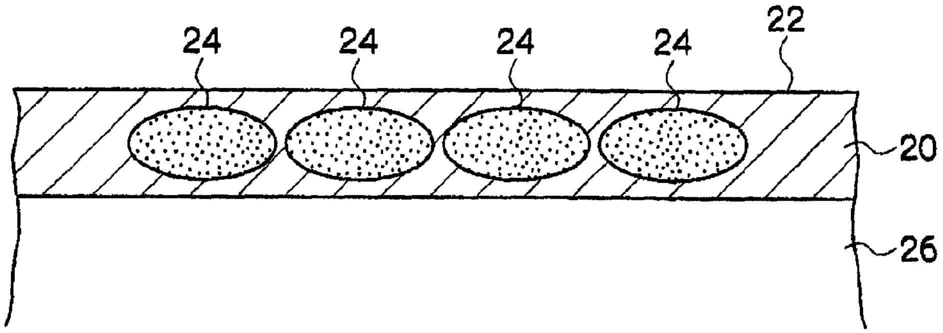
FIGS. 2A and 2B are schematic sectional views showing a recording medium on which an image is formed by ejecting an ink onto an undercoating liquid that has not been cured.
Figure 2B:
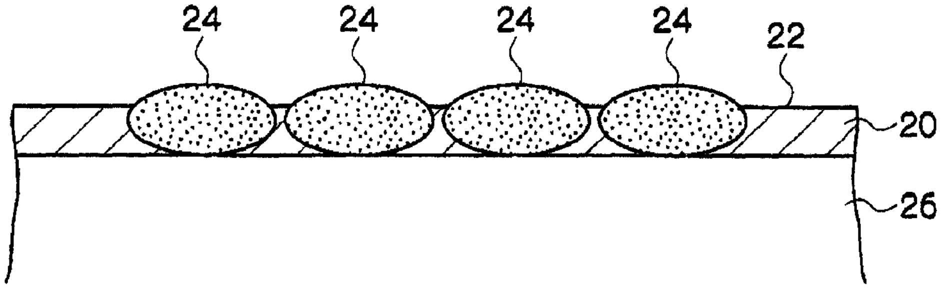

On the other hand, as shown in FIGS. 2A and 2B, when the ink 24 is ejected onto the undercoating liquid 20 that has not been cured, the ink 24 submerges entirely in the undercoating liquid 20, and/or the undercoating liquid 20 does not exist between the ink 24 and the substrate 26. In this case, the droplets remain independent from each other even when the ink is applied with high density, thereby becoming a factor of reduced color density. The recording medium on which an image is formed by applying the ink 24 onto the uncured undercoating liquid 20 has a section as schematically shown in FIGS. 2A and 2B.

Figure 2C:
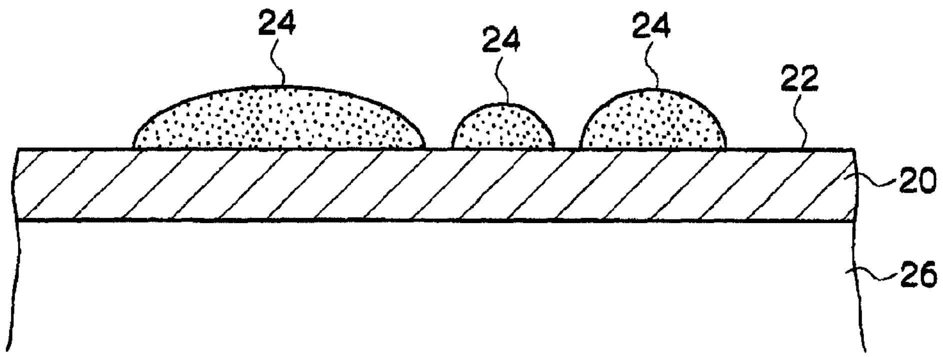
FIG. 2C is a schematic sectional view showing a recording medium on which an image is formed by ejecting an ink onto an undercoating liquid that has been completely cured.

When the ink 24 is ejected onto a completely cured undercoating liquid 20, the ink 24 does not submerge in the undercoating liquid 20, as shown in FIG. 2C. Such a situation may become a factor of interdroplet interference, thereby failing to form a uniform colored liquid film and causing reduction in color reproducibility. The recording medium on which an image is formed by applying the ink 24 onto the completely cured undercoating liquid 20 has a section as schematically shown in FIG. 2C.

It is preferable that the amount per area of the uncured part of the undercoating liquid is sufficiently smaller than the largest amount per area of the applied ink, from the viewpoint that when the ink droplets are applied with high density, they do not remain independent of each other, and form a uniform liquid layer of the ink; and that the occurrence of interdroplet interference is prevented. Therefore, the mass per area of the uncured part of the undercoating liquid "M (undercoating liquid)" and the largest mass per area of the applied ink droplets "m (ink)" preferably satisfies a relation "m (ink)/30<M (undercoating liquid)<m (ink)", further preferably satisfies a relation "m (ink)/20<M (undercoating liquid)<m (ink)/3", and still more preferably satisfies a relation "m (ink)/10<M (undercoating liquid)<m (ink)/5". The largest mass per area of the ink to be ejected here refers to the largest mass of each case of respective colors. When a relation "m (ink)/30<M (undercoating liquid)" is satisfied, occurrence of interdroplet interference can be prevented and excellent dot size reproducibility can be achieved. Further, when a relation "M (undercoating liquid)<m (ink)" is satisfied, uniform liquid layer of the ink can be formed and high density can be obtained.

The mass per area of the uncured part of the undercoating liquid can be determined by a transferring test, in which a permeable medium such as a plain paper sheet is pressed against the partially cured undercoating liquid, at a point after the completion of the partial curing process (e.g., after irradiation with actinic energy rays) and prior to the ejection of the ink droplets, and the mass of the undercoating liquid that has been transferred onto the permeable medium from the undercoating layer is measured.

For example, when the largest ejection amount of the ink droplets in an ejection density of 600×600 dpi is 12 pL per pixel, the largest mass per area of the ejected ink "m (ink)" is determined to be 7.4 g/cm$^2$ (here, the density of the ink is assumed to be 1.1 g/cm$^3$). Therefore, the preferable mass per area of the uncured part of the undercoating liquid is greater than 0.25 g/cm$^2$ and less than 7.4 g/cm$^2$, more preferably greater than 0.37 g/cm$^2$ and less than 2.5 g/cm$^2$, and still more preferably greater than 0.74 g/cm$^2$ and less than 1.48 g/cm$^2$.

Figure 3:
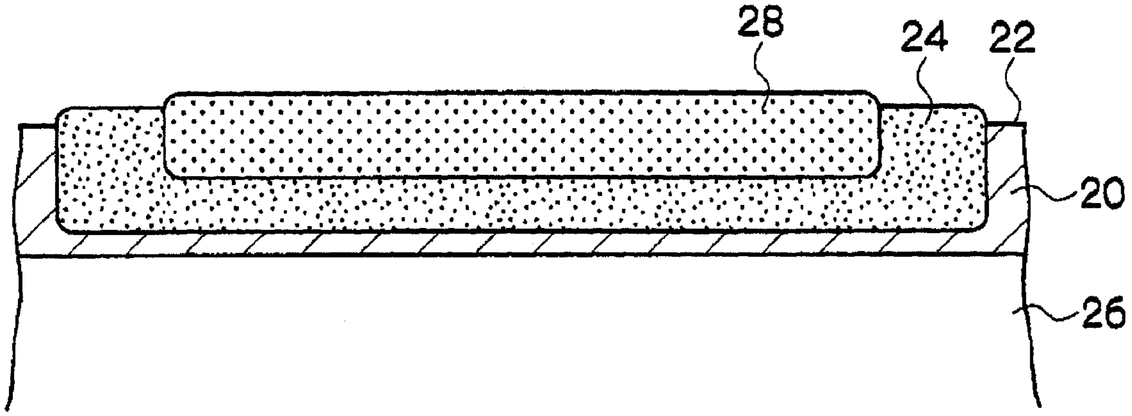
FIG. 3 is a schematic sectional view showing a recording medium on which an image is formed by ejecting an ink B onto a partially cured ink A.

Further, in a case of forming a secondary color from the inks of two colors (hereinafter, referred to as an ink A and an ink B), one of the inks can be applied onto the other ink that has been partially cured, e.g., applying the ink B onto the partially cured ink A. When the ink B is ejected onto the partially cured ink A, a part of the ink B28 submerges in the ink A24, and at the same time, the ink A24 exists under the ink B28. Therefore, a recording medium on which an image is formed by applying the ink B28 onto the partially cured ink A24 has a section as schematically shown in FIG. 3. By laminating the cured layers of the inks A and B, favorable color reproduction can be achieved.

Figure 4A:
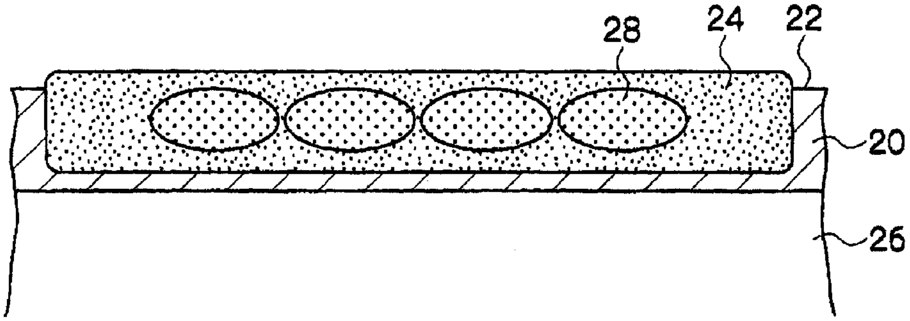
FIGS. 4A and 4B are schematic sectional views showing a recording medium on which an image is formed by ejecting an ink B onto an ink A that has not been cured.
Figure 4B:
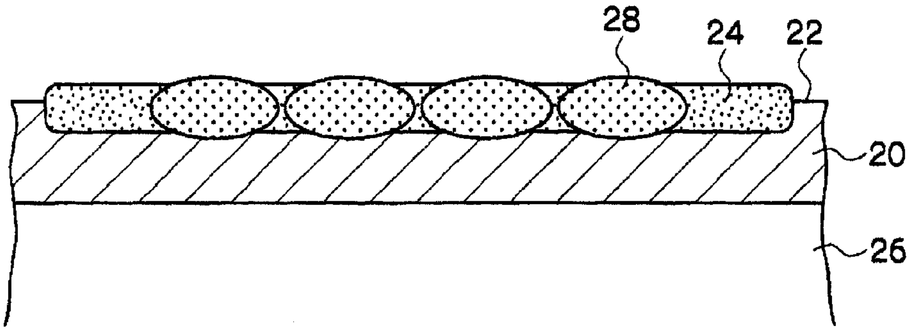

On the other hand, when the ink B is ejected onto the uncured ink A, the ink B28 submerges entirely in the ink A24, as shown in FIG. 4A, and/or the ink A24 does not exist under the ink B28, as shown in FIG. 4B. In this case, the droplets remain independent from each other even when the ink B is applied with high density, thereby becoming a factor of reduced color saturation of the secondary color. The recording medium on which an image is formed by applying the ink B28 onto the uncured ink A24 thus has a section as schematically shown in FIGS. 4A and 4B.

When the ink B is ejected onto the completely cured ink A, ink B28 does not submerge in the ink A24, as shown in FIG.

Figure 4C:
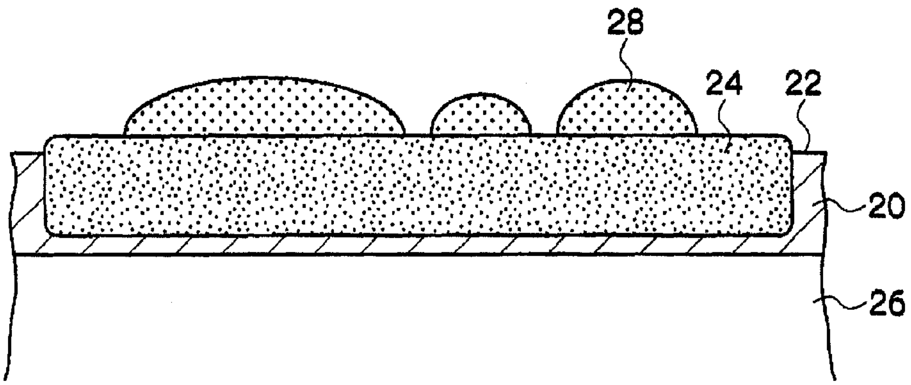
FIG. 4C is a schematic sectional view showing a recording medium on which an image is formed by ejecting an ink B onto an ink A that has been completely cured.

4C. Such a situation may become a factor of interdroplet interference, thereby failing to form a uniform ink film and causing reduction in color reproducibility. The recording medium on which an image is formed by applying the ink B28 onto the completely cured ink A24 thus has a section as schematically shown in FIG. 4C.

It is preferable that the amount per area of the uncured part of the ink A is sufficiently smaller than the largest amount per area of the applied ink B, from the viewpoint that the droplets of the ink B applied with high density does not remain independent of each other, and form a uniform liquid layer of ink B, and that occurrence of interdroplet interference is prevented. Therefore, the mass per area of the uncured part of ink A layer "M (ink A)" and the largest mass per area of the applied droplets of the ink B "m (ink B)" preferably satisfies a relation "m (ink B)/30<M (ink A)<m (ink B)", further preferably satisfies a relation "m (ink B)/20<M (ink A)<m (ink B)/3", and still more preferably satisfies a relation "m (ink B)/10<M (ink A)<m (ink B)/5". When a relation "m (ink B)/30<M (ink A)" is satisfied, occurrence of interdroplet interference can be prevented, and excellent dot size reproducibility can be achieved. Further, when a relation "M (ink A)<m (ink B)" is satisfied, uniform liquid layer of an ink can be formed and high density can be obtained.

The mass per area of the uncured part of the ink A can be determined by a transferring test, in which a permeable medium such as a plain paper sheet is pressed against the partially cured layer of ink A, at a point after the completion of the partial curing process (e.g., after irradiation with actinic energy rays) and prior to the ejection of the droplets of ink B, and the mass of the liquid that has been transferred onto the permeable medium from the layer of the ink A is measured.

For example, when the largest ejection amount of the droplets of the ink B in an ejection density of 600×600 dpi is 12 pL per pixel, the largest mass per area of the ejected ink B "m (ink)" is determined to be 7.4 $g/cm^2$ (here, the density of the ink B is assumed to be 1.1 $g/cm^3$). Therefore, the mass per area of the uncured part of the layer of the ink A is preferably greater than 0.25 $g/cm^2$ and less than 7.4 $g/cm^2$, more preferably greater than 0.37 $g/cm^2$ and less than 2.5 $g/cm^2$, and still more preferably greater than 0.74 $g/cm^2$ and less than 1.48 $g/cm^2$.

When the curing reaction is based on an ethylene unsaturated compound or a cyclic ether, the unpolymerization rate can be quantitatively measured from the reaction rate of the ethylene unsaturated compound or the cyclic ether.

When the above-described partially cured state of the undercoating liquid and/or the ink is achieved by polymerization reaction of a polymerizable compound that starts polymerization by irradiation with actinic energy rays or heating, the unpolymerization rate defined as "A (after polymerization)/A (before polymerization)" is preferably from 0.2 to 0.9, more preferably from 0.3 to 0.9, and still more preferably from 0.5 to 0.9, in terms of improving abrasion resistance of a printed material.

In the above discussion, "A (after polymerization)" indicates an absorbance at an infrared absorption peak of a polymerizable group after polymerization, and "A (before polymerization)" indicates an absorbance at an infrared absorption peak of a polymerizable group before polymerization. For example, when the polymerizable compound contained in the undercoating liquid and/or the ink is an acrylate monomer or a methacrylate monomer, an absorption peak based on a polymerizable group (acrylate group or methacrylate group) can be observed in the vicinity of 810 $cm^{-1}$, and the unpolymerizaion rate is preferably determined by the absorbance at this peak. On the other hand, when the polymerizable compound is an oxetane compound, an absorption peak based on a polymerizable group (oxetane group) can be observed in the vicinity of 986 $cm^{-1}$, and the unpolymerizaion rate is preferably determined by the absorbance at this peak. Further, when the polymerizable compound is an epoxy compound, an absorption peak based on a polymerizable group (epoxy group) can be observed in the vicinity of 750 $cm^{-1}$, and the unpolymerizaion rate is preferably determined by the absorbance at this peak.

As the device for measuring an infrared absorption spectrum, any commercially available infrared spectrometer of transmission type or reflection type may be used and selected according to the form of the sample. For example, an infrared spectrometer (FTS-6000, manufactured by BIO-RAD Laboratories, Inc.) can be used for the measurement.

The viscosity of the partially cured undercoating liquid (25° C.) is preferably 5000 mPa·s or more. The surface portion of the partially cured undercoating liquid (25° C.) is preferably 100 mPa·s or more and less than 5000 mPa·s. The viscosities of the surface and the inside of the undercoating liquid can be measured by a commercially available viscometer (e.g., a portable digital viscometer for laboratory use, VISCOSTICK, manufactured by MARUYASU INDUSTRIES Co., Ltd.), in the samples obtained by scraping up the surface and internal portions of the partially cured undercoating liquid (25° C.), respectively.

Further, the viscosity of the inside of the partially cured undercoating liquid (25° C.) is preferably at least 1.5 times higher, more preferably at least 2 times higher, and still more preferably at least 3 times higher than that of the surface portion of the partially cured undercoating liquid (25° C.) from the viewpoint of suppressing coalesce between adjacent ink droplets by means of interaction of the undercoating liquid and the ink droplets.

The methods for partially curing the undercoating layer can be any known methods for increasing viscosity such as: (1) a method of utilizing a so-called aggregation phenomenon performed by adding a basic compound to an acidic polymer, or adding an acidic compound or metallic compound to a basic polymer; (2) a method of adjusting the viscosity of the undercoating liquid by preliminarily preparing an undercoating liquid to have high viscosity, then adding a low boiling point organic solvent to the undercoating liquid to decrease the viscosity thereof, and thereafter bringing the undercoating liquid back to have high viscosity by evaporating the low boiling point organic solvent; (3) a method of adjusting the viscosity of the undercoating liquid by heating the undercoating liquid which has previously been prepared to have high viscosity, then cooling the undercoating liquid back to have high viscosity; and (4) a method of causing a curing reaction by applying actinic energy rays or heat to the undercoating liquid. Among these, (4) a method of causing a curing reaction by applying actinic energy rays or heat to the undercoating liquid is most preferable.

The method of causing a curing reaction by applying actinic energy rays or heat to an undercoating liquid is a method of causing an insufficient polymerization reaction of a polymerizable compound at the surface of the undercoating liquid applied onto a recording medium. At the surface of the undercoating layer, the polymerization reaction is easily inhibited under the influences of oxygen in the air, as compared with the inside of the undercoating layer. Therefore, partial curing of the undercoating layer can be caused by regulating the conditions of application of actinic energy rays or heat.

Specific examples of the actinic energy rays are the same as these used in the later discussed fixing process and include ultraviolet rays, visible rays, α-rays, γ-rays, X-rays and electron beams, wherein ultraviolet rays and visible rays are preferable and ultraviolet rays are particularly preferable, from the viewpoint of cost or safety.

The amount of the energy required for the partial curing of the undercoating liquid varies depending on the type or content of the polymerization initiator, but is generally preferably from about 1 to about 500 $mJ/cm^2$ when energy is applied by actinic energy rays. When energy is applied by heating, it is preferable to heat a recording medium under the conditions where the surface temperature of the recording medium becomes in the range of from 40 to 80° C., for a period of from 0.1 to 1 second.

By applying actinic energy rays or heat such as active light or heat, generation of active species can be promoted by decomposition of the polymerization initiator, and the curing reaction due can also be promoted to polymerization or crosslinking of a polymerizable or crosslinkable material resulting from the active species, by the increased active species or elevated temperature. Increasing of viscosity can also be favorably performed by irradiating with active light or heating.

In the above, the partial curing of the undercoating liquid has been discussed, but the same will apply to the cases of partially curing the ink (hereinafter, referred to as "ink liquid" sometimes).

—Fixing Process—

A fixing process is preferably carried out after the processes of above discussed undercoating liquid applying, partial curing and recording. In the fixing process, curing of the undercoating liquid and ejected ink is further promoted by applying energy or the like, thereby fixing the recorded image.

When a polymerizable or crosslinkable material is contained in the image, the curing reaction due to the polymerization or crosslinking of the material is promoted by applying energy, and therefore an image having higher strength can be formed more efficiently. For example, in a case of a system containing a polymerization initiator, generation of active species is promoted by the decomposition of the polymerization initiator, and the curing reaction resulting from polymerization or crosslinking of polymerizable or crosslinkable materials due to the active species is promoted by the increased active species or elevated temperature.

Application of energy can favorably be performed by irradiating with actinic energy rays or heating. As the actinic energy, similar ones to the later discussed active lights for image fixation can be used, such as ultraviolet rays, visible rays, α-rays, γ-rays, X-rays and electron beams, wherein ultraviolet rays and visible rays are preferable and ultraviolet rays are particularly preferable, from the viewpoint of cost or safety.

Further, the heating can be performed using a non-contact type heating device, and preferable ones include a heating device in which the recording medium passes through, such as an oven, or a heating device in which exposure is performed over the whole area with light in the range of ultraviolet light—visible light—infrared light, or the like. Examples of the preferable light sources for use in exposure as a heating device include a metal halide lamp, xenon lamp, tungsten lamp, carbon arc lamp and a mercury lamp.

When the energy is applied by irradiation with active light, the amount of the energy required for curing reaction varies depending on the type or content of the polymerization initiator, but is generally preferably from about 100 to about 10,000 $mJ/cm^2$. When the energy is applied by heating, it is preferable to heat a recording medium under such conditions that the surface temperature of the recording medium becomes from 40 to 80° C., for a period of from 0.1 to 1 second.

(Curing Sensitivity of Ink and Undercoating Liquid)

In the invention, the curing sensitivity of the ink is preferably equal to or higher than the curing sensitivity of the undercoating liquid. More preferably, the curing sensitivity of the ink is not less than the curing sensitivity of the undercoating liquid and not more than 4 times as high as the curing sensitivity of the undercoating liquid. Further preferably, the curing sensitivity of the ink is not less than the curing sensitivity of the undercoating liquid and not more than twice as high as the curing sensitivity of the undercoating liquid or less.

When the curing sensitivity of the ink is equal to or higher than the curing sensitivity of the undercoating liquid, uniform dot diameter and dot shape can be obtained in cases of ejecting an ink onto an undercoating liquid or onto an ink that has previously been ejected to form a multicolor image.

The curing sensitivity here refers to the amount of the energy necessary to completely cure the ink and/or the undercoating liquid using a mercury lamp of super high pressure, high pressure, medium pressure or the like, preferably a super high pressure mercury lamp. Smaller amount of the energy indicates that the sensitivity is higher. Therefore, the curing sensitivity being twice as high indicates that the amount of energy is ½ as much.

When one of the two curing sensitivities is not more than twice as high as the other, the two curing sensitivities are regarded as being equal.

(Physical Properties of Ink and Undercoating Liquid)

Regarding the physical properties of the ink (liquid droplet) to be ejected onto a recording medium in an ink jet recording method, the viscosity at 25° C. thereof is preferably in the range of from 5 to 100 mPa·s, and more preferably in the range of from 10 to 80 mPa·s, although the value may vary dependent on the type of the devices. The viscosity at 25° C. of the undercoating liquid before being subjected to partial curing is preferably in the range of from 100 to 5000 mPa·s, and more preferably in the range of from 200 to 3000 mPa·s.

In the invention, the undercoating liquid preferably contains a surfactant from the viewpoint of forming dots of desired size onto a recording medium, and preferably satisfies all of the conditions (A), (B), and (C) described below:

(A) The surface tension of the undercoating liquid is smaller than that of at least one of the inks.

(B) At least one surfactant contained in the undercoating liquid satisfies the following relation:

$$\gamma s(0)-\gamma s(\text{saturated})>0(\text{mN/m}).$$

(C) The surface tension of the undercoating liquid satisfies the following relation:

$$\gamma s<(\gamma s(0)+\gamma s(\text{saturated})^{max})/2.$$

In the above relations, γs is the value of the surface tension of the undercoating liquid; γs (0) is the value of the surface tension of the liquid having a composition of the undercoating liquid from which all surfactants are excluded; γs (saturated) is the value of the surface tension of the liquid, wherein the liquid is obtained by adding one of the surfactants contained in the undercoating liquid to the above "liquid excluding all of the surfactants", the value being measured when the surface tension reaches a point of saturation as the density of the surfactant is increased; and γs $(\text{saturated})^{max}$ is the maximum value among the values of γs (saturated) respectively measured for all kinds of the surfactants which are contained in the undercoating liquid that satisfy the above condition (B).

<Condition (A)>

In the invention, the surface tension γs of the undercoating liquid is preferably smaller than the surface tension γk of at least one of the inks in order to form ink dots of desired size onto the recording medium as described above.

Further, from the viewpoint of preventing spreading of the ink dots during the period from the landing of the ink droplets up to the exposure more effectively, the values of γs and γk preferably satisfy the relation of $\gamma s<\gamma k-3$(mN/m), and more preferably satisfy the relation of $\gamma s<\gamma k-5$ (mN/m).

In a case of printing a full-color image, from the viewpoint of improving sharpness of the image, the surface tension of the undercoating liquid γs is preferably at least smaller than the surface tension of the ink containing a coloring agent with high visibility, and more preferably smaller than the surface tensions of all of the inks. The coloring agent with high visibility is, for example, a coloring agent that exhibits the color of magenta, black, or cyan.

Even though the values of the surface tension of the ink γk and the surface tension of the undercoating liquid γs satisfy the above-described relations, when both of the values are less than 15 mN/m, formation of the liquid droplets may become difficult at the time of ejecting the ink, and the ejection may not be carried out. On the other hand, when the above values are greater than 50 mN/m, wettability with the ink jet head may be deteriorated to cause a failure in ejection. Therefore, it is preferable that each of the surface tension of the ink γk and the surface tension of the undercoating liquid γs is within the range of from 15 mN/m to 50 mN/m, more preferably in the range of from 18 mN/m to 40 mN/m, and particularly preferably in the range of from 20 mN/m to 38 mN/m.

The surface tension mentioned here is a value measured in accordance with a Wilhelmy method at a liquid temperature of 20° C. and at 60% RH, by a commonly used surface tensiometer (for example, surface tensiometer CBVP-Z, manufactured by KYOWA INTERFACE SCIENCE Co., Ltd.).

<Conditions (B) and (C)>

In the invention, the undercoating liquid preferably contains at least one kind of surfactant in order to form the ink dots of desired size onto a recording medium. In this case, it is preferable that at least one kind of surfactant contained in the undercoating liquid satisfies the condition (B) described below:

$$\gamma s(0)-\gamma s(\text{saturated})>0(\text{mN/m}) \quad \text{Condition (B)}$$

Further, it is preferable that the surface tension of the undercoating liquid preferably satisfies the condition (C) described below:

$$\gamma s<(\gamma s(0)+\gamma s(\text{saturated})^{max})/2 \quad \text{Condition (C)}$$

As mentioned above, γs is the value of the surface tension of the undercoating liquid; γs (0) is the value of the surface tension of the liquid having a composition of the undercoating liquid from which all surfactants are excluded; γs (saturated) is the value of the surface tension of the liquid, wherein the liquid is obtained by adding one kind of the surfactants contained in the undercoating liquid to the above "liquid excluding all of the surfactants", and wherein the value is measured when the surface tension reaches a point of saturation as the density of the surfactant is increased; and γs $(\text{saturated})^{max}$ is the maximum value among the values of γs (saturated) respectively measured for all kinds of surfactants contained in the undercoating liquid that satisfy the above condition (B).

The value γs (0) can be obtained by measuring the value of the surface tension of the liquid having the composition of the undercoating liquid from which all surfactants are excluded. The value γs (saturated) can be obtained by adding one kind of the surfactant contained in the undercoating liquid to the "liquid excluding all of the surfactants", then increasing the concentration of the surfactant by the increment of 0.01% by mass, and measuring the surface tension at the point where the change in the degree of the surface tension relative to the change in the concentration of the surfactant becomes 0.01 mN/m or less.

Details of the values γs (0), γs (saturated) and γs $(\text{saturated})^{max}$ will be discussed below by reference to the case where the components of the undercoating liquid (Example 1) are: a high boiling point solvent (diethyl phthalate, manufactured by Wako Pure Chemical Industries, Ltd.); a polymerizable material (dipropylene glycol diacrylate, manufactured by Akcros Chemicals Ltd.), a polymerization initiator (TPO, shown below as "Initiator-1"); a fluorine-based surfactant (MEGAFAC F475, manufactured by Dainippon Ink and Chemicals, Inc.); and a hydrocarbon-based surfactant (sodium di-2-ethylhexyl sulfosuccinate).

Initiator-1

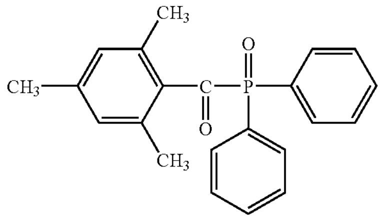

In the above example, the values of γs (0), γs $(\text{saturated})^1$ (when the fluorine-based surfactant is added), γs $(\text{saturated})^2$ (when the hydrocarbon-based surfactant is added), γs (saturated), and γs $(\text{saturated})^{max}$ are determined as follows.

The value of γs (0), indicating the surface tension of the liquid having a composition of the undercoating liquid from which all surfactants are excluded, is determined as 36.7 mN/m.

The value of γs $(\text{saturated})^1$, which is the saturated value of the surface tension of the liquid when the fluorine-based surfactant is added and the concentration thereof is increased, is determined as 20.2 mN/m.

The value of γs $(\text{saturated})^2$, which is the saturated value of the surface tension of the liquid when the hydrocarbon-based surfactant is added and the concentration thereof is increased, is determined as 30.5 mN/m.

Since the undercoating liquid (Example 1) contains two kinds of the surfactants that satisfy the above-described condition (B), there are two values of γs (saturated), i.e., the value when the fluorine-based surfactant is added (γs $(\text{saturated})^1$) and the value when the hydrocarbon-based surfactant is added (γs $(\text{saturated})^2$). Here, the value of γs $(\text{saturated})^{max}$, i.e., the maximum value between γs $(\text{saturated})^1$ and γs $(\text{saturated})^2$, is determined as the value of γs $(\text{saturated})^2$.

The above results are summarized as follows:

γs (0)=36.7 mN/m

γs $(\text{saturated})^1$=20.2 mN/m (when the fluorine-based surfactant is added)

γs $(\text{saturated})^2$=30.5 mN/m (when the hydrocarbon-based surfactant is added)

γs $(\text{saturated})^{max}$=30.5 mN/m

From the above results, the surface tension of the undercoating liquid γs preferably satisfies the relationship:

$$\gamma s<(\gamma s(0)+\gamma s(\text{saturated})^{max})/2=33.6 \text{ mN/m}.$$

As for the above-described condition (C), from the viewpoint of preventing spreading of the ink droplets during the period from the landing of the liquid droplets up to the exposure, the surface tension of the undercoating liquid more preferably satisfies the relationship:

$$\gamma s<\gamma s(0)-3\times\{\gamma s(0)+\gamma s(\text{saturated})^{max}\}/4$$

and particularly preferably satisfies the relationship:

$$\gamma s\leqq\gamma s(\text{saturated})^{max}.$$

The compositions of the ink and the undercoating liquid may be selected so that the desired surface tension can be obtained, but it is preferable that these liquids contain a surfactant. As described above, in order to form the ink dots of desired size onto a recording medium, the undercoating liquid preferably contains at least one kind of surfactant. Details of the surfactants will be explained below.

(Surfactant)

The surfactant used in the invention is a substance having strong surface activity to at least one solvent selected from hexane, cyclohexane, p-xylene, toluene, ethyl acetate, methylethylketone, butyl carbitol, cyclohexanone, triethylene glycol monobutyl ether, 1,2-hexanediol, propylene glycol monomethyl ether, isopropanol, methanol, water, isobornyl acrylate, 1,6-hexane diacrylate, and polyethylene glycol diacrylate; preferably a substance having strong surface activity to at least one kind of solvent from hexane, toluene, propylene glycol monomethylether, isobonylacrylate, 1,6-hexanediacrylate, and polyethylene glycol diacrylate, more preferably a substance having a strong surface activity to at least one solvent selected from propylene glycol monomethyl ether, isobornyl acrylate, 1,6-hexane diacrylate, and polyethylene glycol diacrylate; and particularly preferably a substance having strong surface activity to at least one solvent selected from isobornyl acrylate, 1,6-hexane diacrylate, and polyethylene glycol diacylate.

Whether a compound has strong surface activity to the solvents listed above can be determined by the procedures as described below.

(Procedures)

One solvent is selected from the solvents listed above and measure the surface tension thereof $\gamma_{solvent}$ (0). Add the objective compound in the same solvent used to measure the $\gamma_{solvent}$ (0), increase the concentration of the compound by the increment of 0.01% by mass, and measure the surface tension of the solution $\gamma_{solvent}$ (saturated) at the point when the change in the surface tension with respect to the change in the concentration of the compound becomes 0.01 mN/m or less.

If the relationship between the $\gamma_{solvent}$ (0) and the $\gamma_{solvent}$ (saturated) satisfies the following relation, the compound can be determined to have strong surface activity to the solvent:

$$\gamma_{solvent}(0)-\gamma_{solvent}(\text{saturated})>1(\text{mN/m}).$$

Specific examples of the surfactants contained in the undercoating liquid include anionic surfactants such as dialkylsulfosuccinates, alkylnaphthalenensulfonates and fatty acid salts; nonionic surfactants such as polyoxyethylenealkyl ethers, polyoxyethylenealkylallyl ethers, acetylene glycols and polyoxyethylene-polyoxypropylene block copolymers; cationic surfactants such as alkylamine salts and quaternary ammonium salts; and fluorine-based surfactants. Examples of other surfactants include the surfactants described in JP-A No. 62-173463 and JP-A No. 62-183457.

—Recording Medium—

Any recording medium of permeable, non-permeable or slow-permeable can be used as the recording medium in the ink jet recording method in the invention. Among these, a non-permeable and a slow permeable recording medium are preferable from the viewpoint that the effect of the invention can be remarkably displayed. The permeable recording medium refers to, for example, a recording medium having such properties that when a liquid droplet of 10 pL is dropped onto the recording medium, the permeation time for the total amount of the droplet is 100 ms or less. The description "substantially does not permeate" refers to, for example, the conditions where the permeability of the liquid droplets after the lapse of one minute is 5% or less. The slow-permeable recording medium refers to a recording medium having such properties that when a liquid droplet of 10 pL is dropped onto the recording medium, the permeating time for the total amount of the droplet is 100 ms or more.

Examples of the permeable recording media include plain paper, porous paper, and other recording media that are capable of absorbing a liquid.

Examples of the materials of the recording media which are non-permeable or slow-permeable include art paper, synthetic resin, rubber, resin coated paper, glass, metal, ceramic, and wood. In the invention, a composite recording medium composed of some of the above materials in combination can also be used for the purpose of adding functions.

Any kind of synthetic resin can be used as the synthetic resin, and examples thereof include polyesters such as polyethylene terephthalate and polybutadiene terephthalate, polyolefins such as polyvinyl chloride, polystyrene, polyethylene, polyurethane, and polypropylene, acrylic resins, polycarbonate, acrylonitrile-butadiene-styrene copolymers, diacetate, triacetate, polyimide, cellophane, and celluloid. The thickness and shape of the recording medium when a synthetic resin is used are not particularly limited and the medium may be any shape of film, card and block, and may be either transparent or opaque.

As to the form of usage, the synthetic resin is preferably used in the form of a film for so-called light wrapping, and various non-absorbing plastics and a film thereof can be used. Examples of the plastic films include a PET film, an OPS film, an OPP film, a PNy film, a PVC film, a PE film, a TAC film, and a PP film. Examples of other plastics include polycarbonate resins, acrylic resins, ABS resins, polyacetal resins, PVA resins, and rubbers.

Examples of the resin coated papers include a transparent polyester film, an opaque polyester film, an opaque polyolefin resin film, and a paper supporting body having both sides laminated with a polyolefin resin. A paper supporting body having both sides laminated with a polyolefin resin is particularly preferable.

The kind of the metal is not particularly limited and preferable examples thereof include aluminum, iron, gold, silver, copper, nickel, titanium, chromium, molybdenum, silicon, lead, zinc, stainless steel, and composite materials thereof.

Further, ink jet recording can be performed on the label side of read-only optical disks such as CD-ROMs and DVD-ROMs, write-once optical disks such as CD-Rs and DVD-Rs, rewritable optical disks and the like.

—Ink and Undercoating Liquid—

The ink and the undercoating liquid used in the ink jet recording method in the invention will be explained in detail.

The ink is composed so as to at least form an image. The ink preferably contains at least one polymerizable or crosslinkable material, and further a polymerization initiator, a lipophilic solvent, a coloring agent, and other components depending on necessity.

The undercoating liquid preferably contains at least a polymer and has a different composition from that of the ink. The undercoating liquid preferably contains at least one polyerizable or crosslinkable material, and preferably contains a polymerization initiator, a lipophilic solvent, a coloring agent, and other components depending on necessity.

The polymerization initiator is preferably capable of initiating a polymerization reaction or a crosslinking reaction with actinic energy rays. By using the polymerization initator, the undercoating liquid applied onto the recording medium can be cured by irradiation with actinic energy rays.

Further, the undercoating liquid preferably contains a radical polymerizable composition. The radical polymerizable composition in the invention contains at least one radical polymerizable material and at least one radical polymerization initiator. By using the radical polymerizable composition, the curing reaction of the undercoating liquid can be performed with high sensitivity in a short time.

The ink in the invention is preferably contains a coloring agent. The undercoating liquid to be used in combination with such an ink preferably contains no coloring agent; contains a coloring agent to the amount of less than 1% by mass; or contains a white pigment as a coloring agent. Each component constituting each liquid will be described in detail.

(Polymer)

The undercoating liquid of the invention includes at least one polymer. By including a polymer in the undercoating liquid, an effect of preventing spreading of the ink that has been ejected onto the partially cured undercoating liquid can be imparted to the undercoating liquid.

The mechanism of the above effect has not been clear, but is presumed as follows:

That is, the viscosity of the undercoating liquid increases by adding a polymer and the dot shape of the ink remains granular without reaching the bottom of the undercoating liquid, when the droplet size of the ejected ink is minute. Then, as the droplet size of the ink increases, the ink starts to flow from the undercoating liquid portion where the ink has accumulated and the ink droplets spread, and as a result, the ink droplets connect with the adjacent ink droplets.

Any kind of polymer can be used in the invention, but is preferably not water-soluble but oil-soluble, since in the preferable embodiment of the invention, the polymer is dissolved in an oil-soluble monomer. Examples of the non-water soluble polymers preferably used in the invention include those described in International Publication pamphlet No. 88/00723 and Japanese Application Publication Laid-Open No. 63-44658. Among these, vinyl or polyester polymers having a repeating unit containing a —(C═O)— linkage are particularly preferably used in the invention. The vinyl monomer favorably used for synthesizing the above vinyl polymers may be used in combination of two or more kinds as a comonomer to each other, according to purposes (e.g., improving solubility). Further, for the purpose of adjusting color development or solubility, a monomer having an acidic group can also be used as a comonomer to such a degree that the resulting comonomer is not water-soluble. Additionally, crosslinkable monomers having two or more ethylene unsaturated components can also be used, and the monomers of such types described in JP-A No. 60-151636 and the like can be favorably used.

When a hydrophilic monomer (here, a monomer is defined as hydrophilic when a homopolymer thereof exhibits hydrophilicity) is used as a comonomer with the vinyl monomer used in the invention, the content of the hydrophilic monomer in the copolymer is not particularly limited as long as the resulting comonomer does not exhibit hydrophilicity, but is preferably 40 mol % or less, more preferably 20 mol % or less, and still more preferably 10 mol % or less. Further, when a hydrophilic comonomer to be copolymerized with the monomer in the invention has an acidic group, the content of the hydrophilic comonomer in the copolymer is generally 20 mol % or less and preferably 10 mol % or less, and further preferably none of such a monomer is contained in the copolymer, from the viewpoint of image stability. The monomer used for polymer synthesizing is preferably methacrylate type, acrylamide type or methacrylamide type, and particularly preferably acrylamide type or methacrylamide type.

Further, the number average molecular weight of the polymers of methacrylate type, acrylamide type and methacrylamide type that can be used in the invention is preferably from 5,000 to 150,000, and more preferably from 10,000 to 100,000. Polymers consisting of only monomer(s) such as styrene, α-methyl styrene, β-methyl styrene, or those having a substituent on the benzene ring thereof are also preferably used as the polymer in the invention. In this case, the number average molecular weight of the polymer is preferably in the range of from 500 to 5,000.

Examples of the polyester polymers used in the invention include polyester resins obtained from condensation of a polyalcohol and a polybasic acid, and polyester resins obtained by ring-opening polymerization. As the polyalcohols used for the former polyesters, glycols or polyalkyl glycols having a HO—$R_1$—OH structure ($R_1$ represents a hydrocarbon chain having 2 to 12 carbon atoms, and is an aliphatic hydrocarbon chain in particular) are effectively used; and as the polybasic acids, those having a HOOC—$R_2$—COOH ($R_2$ represents a single bond or a hydrocarbon chain having 1 to 12 carbon atoms) are effectively used. Preferable examples of the above polyalcohols and polybacic acids used in the invention include those described in JP-A No. 6-250331.

As the monomers used for preparing the latter polyesters, lactones of 4 to 9-membered ring such as β-propiolactone, ϵ-caprolactone and dimethylpropiolactone are preferably used. Two or more types of the polyalcohols, polybasic acids and/or lactone monomers may be used in combination for the polyester polymers according to purposes, as is the case with the above-described vinyl polymers. A hydrophilic monomer (here, referred to as a monomer that constitutes a homopolymer thereof that exhibits hydrophilicity) can also be used as a comonomer for the polyester polymers, as is the case with the above vinyl polymers, and is preferably used in the amount as described in the case of the vinyl polymers. The polymers which are not water-soluble used in the invention is defined as the polymer having a solubility of 3 g or less, preferably 1 g or less, with respect to 100 g (25° C.) of distilled water. Specific examples of the polymers used in the invention are described below, but the invention is not limited thereto. The copolymerization ratios of the copolymers shown in the following examples are described in terms of mole ratio.

Among the polymers used in the invention, acrylamide polymers are particularly preferably used.

Acrylamide polymers are obtained by polymerizing an acrylamide monomer or methacrylamide monomer (hereinafter, simply referred to as "acrylamide" sometimes). It is presumed that the acrylamide polymers having an amide linkage exhibits a particularly significant effect of preventing the ink droplets from spreading by the interaction with the undercoating liquid.

The acrylamide polymers used in the invention may be either a homopolymer or a copolymer. When the acrylamide polymer is a copolymer, it may be either a copolymer of two or more acrylamide monomers or a copolymer of an acrylamide monomer and a monomer other than the acrylamide monomer. The ratio of the monomers may be determined as appropriate, but in a case of a copolymer of an acrylamide monomer and a monomer other than the acrylamide monomer, the content of the acrylamide monomer is preferably 20% or more, more preferably 50% or more and further preferably 70% or more, in terms of number average molecular weight. The content of the acrylamide monomer is particularly preferably 100%. Further, the acrylamide is preferably a homopolymer for convenience of polymerization. The acrylamides used in the invention may also have a substituent such as an alkyl group, alkoxy group, aryl group, aryloxy group, heterocyclic group, heterocyclic oxy group, acyl group, acyloxy group, or halogen atom.

In the invention, the average polymerization degree of the acrylamide unit (hereinafter, simply referred to as "average polymerization degree" sometimes) of the acrylamide polymer is preferably from 30 to 1,000, more preferably from 40 to 800 and still more preferably from 50 to 600, from the viewpoint of viscosity, solubility, preventing property of spreading of the ejected droplets and coating property, when used in the undercoating liquid.

Known compounds referred to as acrylamide polymers may be selected as appropriate, but the weight average molecular weight thereof is preferably in the range of from 5,000 to 150,000, and more preferably from 10,000 to 100,000.

As the acrylamide polymers used in the invention, alkyl group-substituted acrylamide polymers and aromatic group-substituted acrylamide polymers are preferably used, and the alkyl group-substituted acrylamide polymers are most preferable. In the invention, all of the alkyl groups having a chain structure, branched structure or ring structure are defined as an alkyl group.

Preferable examples of the alkyl group-substituted acrylamide polymers include those substituted with an alkyl group of 1 to 20 carbon atoms (preferably 1 to 12, and more preferably 2 to 12) such as polyethyl acrylamide, poly t-butyl acrylamide, polyoctyl acrylamide, poly t-octyl acrylamide, polylauryl acrylamide, polycyclohexyl acrylamide, poly t-butyl methacrylamide, and polylauryl methacrylamide.

The acrylamide polymer(s) may be used singly or in combination. The content of the acrylamide polymer(s) in the undercoating liquid is preferably from 1 to 50 mass %, more preferably from 2 to 40 mass % and still more preferably from 5 to 30 mass %, with respect to the total mass of the undercoating liquid.

When the content of the acrylamide polymer(s) is in the above range, it is further effective in that the spreading of the ejected ink dots and the connection thereof can be ensured to a certain degree, while being suppressed so that the shapes of the ink droplets are not impaired and image disorder and bleeding in the image are not caused. Further, it is also advantageous in that the viscosity of the undercoating liquid can be kept low, thereby enabling coating the undercoating liquid with high precision, even with a low-cost roll coater.

The following are part of the specific examples of the polymers used in the invention, but the invention is not limited thereto. The copolymerization ratios shown in the following specific examples are based on mole ratio.

P-1) polymethacrylate
P-2) polyethyl methacrylate
P-3) polyisopropyl methacrylate
P-4) polymethylchloro acrylate
P-5) poly(2-tert-butylphenyl acrylate)
P-6) poly(4-tert-butylphenyl acrylate)
P-7) ethyl methacrylate/n-butyl acrylate copolymer (70:30)
P-8) methyl methacrylate/acrylonitrile copolymer (65:35)
P-9) methyl methacrylate/styrene copolymer (90:10)
P-10) N-tert-butyl methacrylamide/methyl methacrylate/acrylic acid copolymer (60:30:10)
P-11) methyl methacrylate/styrene/vinyl sulfoneamide copolymer (70:20:10)
P-12) methyl methacrylate/cyclohexyl methacrylate copolymer (50:50)
P-13) methyl methacrylate/acrylic acid copolymer (95:5)
P-14) methyl methacrylate/n-butyl methacrylate copolymer (65:35)
P-15) methyl methacrylate/N-vinyl-2-pirrolidone copolymer (90:10)
P-16) poly(N-sec-butyl acrylamide)
P-17) poly(N-tert-butyl acrylamide)
P-18) polycyclohexyl methacrylate/methyl methacrylate copolymer (60:40)
P-19) n-butyl methacrylate/methyl methacrylate/acrylamide copolymer (20:70:10)
P-20) diacetone acrylamide/methyl methacrylate copolymer (20:80)
P-21) N-tert-butyl acrylamide/methyl methacrylate copolymer (40:60)
P-22) poly(N-n-butyl acrylamide)
P-23) tert-butyl methacrylate/N-tert-butyl acrylamide copolymer (50:50)
P-24) tert-butyl methacrylate/methyl methacrylate copolymer (70:30)
P-25) poly(N-tert-butyl methacrylamide)
P-26) N-tert-butyl acrylamide/methyl methacrylate copolymer (60:40)
P-27) methyl methacrylate/acrylonitrile copolymer (70:30)
P-28) methyl methacrylate/styrene copolymer (75:25)
P-29) methyl methacrylate/hexyl methacrylate copolymer (70:30)
P-30) poly(4-biphenyl acrylate)
P-31) poly(2-chlorophenyl acrylate)
P-32) poly(4-chlorophenyl acrylate)
P-33) poly(pentachlorophenyl acrylate)
P-34) poly(4-ethoxycarbonylphenyl acrylate)
P-35) poly(4-methoxycarbonylphenyl acrylate)
P-36) poly(4-cyanophenyl acrylate)
P-37) poly(4-methoxyphenyl acrylate)
P-38) poly(3,5-dimethyladamantyl acrylate)
P-39) poly(3-dimethylaminophenyl acrylate)
P-40) poly(2-naphtyl acrylate)
P-41) poly(phenyl acrylate)
P-42) poly(N,N-dibutyl acrylamide)
P-43) poly(isohexyl acrylamide)
P-44) poly(isooctyl acrylamide)
P-45) poly(N-methyl N-phenyl acrylamide)
P-46) poly(adamantyl methacrylate)
P-47) poly(sec-butyl methacrylate)
P-48) N-tert-butyl acrylamide/acrylic acid copolymer (97:3)
P-49) poly(2-chloroethyl methacrylate)
P-50) poly(2-cyanoethyl methacrylate)
P-51) poly(2-cyanomethylphenyl methacrylate)
P-52) poly(4-cyanophenyl methacrylate)
P-53) poly(cyclohexyl methacrylate)
P-54) poly(2-hydroxypropyl methacrylate)
P-55) poly(4-methoxycarbonylphenyl methacrylate)
P-56) poly(3,5-dimethyladamantyl methacrylate)
P-57) poly(phenyl methacrylate)
P-58) poly(4-butoxycarbonylphenyl methacrylamide)
P-59) poly(4-carboxyphenyl methacrylamide)
P-60) poly(4-ethoxycarbonylphenyl methacrylamide)
P-61) poly(4-methoxycarbonylphenyl methacrylamide)
P-62) poly(cyclohexyl chloroacrylate)
P-63) poly(ethyl chloroacrylate)
P-64) poly(isobutyl chloroacrylate)
P-65) poly(isopropyl chloroacrylate)

P-66) poly(phenyl acrylamide)
P-67) poly(cyclohexyl acrylamide)
P-68) poly(phenyl methacrylamide)
P-69) poly(cyclohexyl methacrylamide)
P-70) poly(butylene adipate)
P-71) polystyrene
P-72) poly(α-methylstyrene)
P-73) poly(β-methylstyrene)
P-74) poly(4-chlorostyrene)
P-75) poly(4-methoxystyrene)
P-76) poly(4-methylstyrene)
P-77) poly(2,4-dimethylstyrene)
P-78) poly(4-isopropylstyrene)
P-79) poly(4-t-butylstyrene)
P-80) poly(3,4-dichlorostyrene)
P-81) poly(N-ethyl acrylamide)
P-82) poly(N-n-octyl acrylamide)
P-83) poly(N-t-octyl acrylamide)
P-84) poly(N-lauryl acrylamide)
P-85) poly(N-methoxyethyl acrylamide)
P-86) poly(N-lauryl methacrylamide)
P-87) poly(t-butyl acrylate)
P-88) poly(t-butyl methacrylate)

(Polymerizable or Crosslinkable Material)

The polymerizable or crosslinkable material in the invention causes polymerization or crosslinking by the action of an initiating species such as a radical generated from a polymerization initiator described later, or the like, and has a function to cure a composition containing the initiating species.

Known polymerizable or crosslinkable materials that cause a polymerization or crosslinking reaction such as a radical polymerization reaction or dimerization reaction can be applied as the polymerizable or crosslinkable material. Examples of the polymerizable or crosslinkable materials include an addition polymerizable compound having at least one ethylenically unsaturated double bond, a polymer compound having a maleimide group in a side chain, and a polymer having a group having an unsaturated double bond positioned adjacent to an aromatic core and is capable of photodimerization, such as a cinnamyl group, a cinnamylidene group, a chalcone group or the like, in a side chain. Among these, an addition polymerizable compound having at least one ethylenically unsaturated double bond is more preferable, and particularly preferably a compound selected from the compounds having at least one and more preferably two or more of terminal ethylenically unsaturated bonds (monofunctional or multifunctional compound). It can be appropriately selected from the widely known compounds in the industrial field to which the invention is related, and examples thereof include a compound having a chemical form of a monomer, a prepolymer (i.e., a dimer, a trimer, and an oligomer), a mixture thereof, and a copolymer of these compounds.

The polymerizable or crosslinkable materials may be used alone, or in combination of two or more kinds.

The polymerizable or crosslinkable materials in the invention are particularly preferably various known radical polymerizable monomers that cause a polymerization reaction by an initiating species generated from a radical initiator.

Examples of the radical polymerization monomers include (meth)acrylates, (meth)acrylamides, aromatic vinyls, vinyl ethers, and compounds having an inner double bond (maleic acid, etc.). In this case, "(meth)acrylate" refers to both or either one of "acrylate" and "methacrylate," and "(meth) acryl" refers to both or either one of "acryl" and "methacryl."

Specific examples of the (meth)acrylates include the following compounds.

Specific examples of the mono functional (meth)acrylates include hexyl(meth)acrylate, 2-ethylhexyl(meth)acrylate, tert-octyl(meth)acrylate), isoamyl(meth)acrylate, decyl (meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl(meth)acrylate, 2-ethylhexyl diglycol(meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl (meth)acrylate, 3-methoxybutyl(meth)acrylate, alkoxymethyl(meth)acrylate, alkoxyethyl(meth)acrylate, 2-(2-methoxyethoxy)ethyl(meth)acrylate, 2-(2-butoxyethoxy)ethyl(meth)acrylate, 2,2,2-trifluoro ethyl(meth)acrylate, 1H,1H,2H,2H-perfluorodecyl(meth)acrylate, 4-butylphenyl(meth)acrylate, phenyl(meth)acrylate, 2,4,5-tetramethylphenyl(meth)acrylate, 4-chlorophenyl(meth) acrylate, phenoxymethyl(meth)acrylate, phenoxyethyl (meth)acrylate, glycidyl(meth)acrylate, glycidyloxybutyl (meth)acrylate, glycidyloxyethyl(meth)acrylate, glycidyloxypropyl(meth)acrylate, tetrahydrofurfuryl(meth) acrylate, hydroxyalkyl(meth)acrylate, 2-hydroxyethyl(meth) acrylate, 3-hydroxypropyl(meth)acrylate, 2-hydroxypropyl(meth)acrylate, 2-hydroxybutyl(meth) acrylate, 4-hydroxybutyl(meth)acrylate, dimethylaminoethyl(meth)acrylate, diethylaminoethyl(meth)acrylate, dimethyaminopropyl(meth)acrylate, diethylaminopropyl(meth) acrylate, trimethoxysilylpropyl(meth)acrylate, trimethylsilylpropyl(meth)acrylate, polyethyleneoxide monomethylether(meth)acrylate, oligoethyleneoxide monomethylether(meth)acrylate, polyethyleneoxide(meth) acrylate, oligoethylenoxide(meth)acrylate, oligoethyleneoxide monoalkylether(meth)acrylate, polyethyleneoxide monoalkylether(meth)acrylate, dipropylene glycol(meth) acrylate, polypropyleneoxide monoalkylether(meth)acrylate, oligopropyleneoxide monoalkylether(meth)acrylate, 2-methacryloyloxyethyl succinic acid, 2-methacryloyloxyhexahydrophthalic acid, 2-methacryloyloxyethyl-2-hydroxypropyl phthalate, butoxydiethylene glycol(meth)acrylate, trifluoroethyl(meth)acrylate, perfluorooctylethyl(meth)acrylate, 2-hydroxy-3-phenoxypropyl(meth)acrylate, EO-modified phenol(meth)acrylate, EO-modified cresol(meth)acrylate, EO-modified nonylphenol(meth)acrylate, PO-modified nonylphenol(meth)acrylate, and EO-modified-2-ethyhexyl (meth)acrylate.

Specific examples of the bifunctional(meth)acrylates include 1,6-hexadiol di(meth)acrylate, 1,10-decanediol di(meth)acrylate, neopentyl glycol di(meth)acrylate, 2,4-dimethyl-1,5-pentanediol di(meth)acrylate, butylethylpropanediol(meth)acrylate, ethoxylated cyclohexanemethanol di(meth)acrylate, polyethylene glycol di(meth)acrylate, oligoethylene glycol di(meth)acrylate, ethylene glycol di(meth) acrylate, 2-ethyl-2-butyl-butanediol di(meth)acrylate, hydroxypivalic neopentyl glycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, and tricyclodecane di(meth) acrylate.

Specific examples of the trifunctional (meth)acrylates include trimethylolpropane tri(meth)acrylate, trimethylolethane tri(meth)acrylate, alkyleneoxide-modified tri(meth) acrylate of trimethylolpropane, pentaerythritol tri(meth)acrylate, dipentaerythritol tri(meth)acrylate, trimethylolpropane tris((meth)acryloyloxypropyl)ether, isocyanuric alkyleneoxide-modified tri(meth)acrylate, propionic dipentaerythritol tri(meth)acrylate, tris((meth)acryloyloxyethyl)isocyanurate, hydroxypivalaldehyde-modified dimethylolpropane tri (meth)acrylate, sorbitol tri(meth)acrylate, propoxylated trimethylolpropane tri(meth)acrylate, and ethoxylated glycerin triacrylate.

Specific examples of the tetrafunctional (meth)acrylates include pentaerythritol tetra(meth)acrylate, sorbitol tetra (meth)acrylate, ditrimethylolpropane tetra(meth)acrylate, propionic dipentaerythritol tetra(meth)acrylate, and ethoxylated pentaerythritol tetra(meth)acrylate.

Specific examples of the pentafunctional (meth)acrylates include sorbitol penta(meth)acrylate and dipentaerythritol penta(meth)acrylate.

Specific examples of the hexafunctional (meth)acrylates include dipentaerythritol hexa(meth)acrylate, sorbitol hexa (meth)acrylate, alkyleneoxide-modified hexa(meth)acrylate of phosphazene, and captolactone-modified dipentaerythritol hexa(meth)acrylate.

Examples of the (meth)acrylamides include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth) acrylamide, N-isopropyl(meth)acrylamide, N-methylol (meth)acrylamide, N,N-dimethyl(meth)acrylamide, N,N-diethyl(meth)acrylamide, and (meth)acryloylmorphorine.

Specific examples of the aromatic vinyls include styrene, methylstyrene, dimethylstyrene, trimethylstyrene, ethylstyrene, isopropylstyrene, chlormethylstyrene, methoxystyrene, acetoxystyrene, chlorstyrene, dichlorstyrene, bromstyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethyhexyl)styrene, 4-(2-ethylhexyl)styrene, allylstyrene, isopropenylstyrene, butenylstyrene, octenylstyrene, 4-t-butoxycarbonylstyrene, 4-methoxystyrene, and 4-t-butoxystyrene.

Specific examples of the vinylethers include the following compounds.

Specific examples of the mono functional vinylethers include methyvinylether, ethylvinylether, propylvinylether, n-butylvinylether, t-butylvinylether, 2-ethylhexylvinylether, n-nonylvinylether, laurylvinylether, cyclohexylvinylether, cyclohexylmethylvinylether, 4-methylcyclohexylmethylvinylether, benzylvinylether, dicyclopentenylvinylether, 2-dicyclopentenoxyethylvinylether, methoxyethylvinylether, ethoxyethylvinylether, butoxyethylvinylether, methoxyethoxyethylvinylether, ethoxyethoxyethylvinylether, methoxypolyethylene glycol vinylether, tetrahydrofurfurylvinylether, 2-hydroxyetylvinylether, 2-hydroxypropylvinylether, 4-hydroxybutylvinylether, 4-hydroxymethylcyclohexylmethylvinylether, diethylene glycol monovinylether, polyethylene glycol vinylether, chlorethylvinylether, chlorbutylvinylether, chlorethoxyethylvinylether, phenylethylvinylether, and phenoxypolyethylene glycol vinylether.

Examples of the polyfunctional vinylethers include divinylethers such as ethylene glycol divinylether, diethylene glycol divinylether, polyethylene glycol divinylether, propylene glycol divinylether, butylene glycol divinylether, hexanediol divinylether, bisphenol A alkyleneoxide divinylether and bisphenol F alkyleneoxide divinylether; and polyfunctional vinylethers such as trimethylolethane trivinylether, trimethylolpropane trivinylether, ditrimethylolpropane tetravinylether, glycerin trivinylether, pentaerythritol tetravinylether, dipentaerythritol pentavinylether, dipentaerythritol hexavinylether, ethyleneoxide added trimethylolpropane trivinylether, propyleneoxide added trimethylolpropane trivinylether, ethyleneoxide added ditrimethylolpropane tetravinylether, propyleneoxide added ditrymethylolpropane tetravinylether, ethyleneoxide added pentaerythritol tetravinylether, propyleneoxide added pentaerythritol tetravinylether, ethyleneoxide added dipentaerythritol hexavinylether, and propyleneoxide added dipentaerythritol hexavinylether.

The vinylether compound is preferably a di- or tri-vinylether compound from the viewpoint of curing property, adhesion to a recording medium, surface hardness of the formed image or the like, and particularly preferably a divinylether compound.

Other examples of the radical polymerizable monomers in the invention include vinylesters such as vinyl acetate, vinyl propionate and vinyl versatate; allylesters such as allyl acetate; halogen-containing monomers such as vinylidene chloride and vinyl chloride; cyanide vinyls such as (meth) acrylonitrile; and olefins such as ethylene and propylene.

Among the above, the radical polymerizable monomer is preferably a (meth)acrylate and (meth)acrylamides in view of curing speed, and particularly preferably a (meth)acrylate of tetrafunctional or more in view of curing speed. From the viewpoint of the viscosity of the ink composition, it is preferable to use a polyfunctional (meth)acrylate in combination with a mono functional or bifunctional (meth)acrylate or (meth)acrylamide.

The content of the polymerizable or crosslinkable material in the ink and the undercoating liquid is preferably in the range of from 50 to 99.6% by mass with respect to the total solid content (mass) in each liquid droplet, more preferably in the range of from 70 to 99.0% by mass, and further preferably in the range of from 80 to 99.0% by mass.

The content of the polymerizable or crosslinkable material in the liquid droplet is preferably in the range of from 20 to 98% by mass with respect to the total mass of each liquid droplet, more preferably in the range of from 40 to 95% by mass, and particularly preferably in the range of from 50 to 90% by mass.

(Polymerization Initiator)

The ink and the undercoating liquid can be preferably composed using at least one polymerization initiator, and it is preferable that at least the undercoating liquid contains the polymerization initiator. This polymerization initiator is a compound that generates initiating species such as a radical by application of active light, heat, or both of these, and allow the polymerization or crosslinking reaction of the above-described polymerizable or crosslinkable materials to initiate, promote and cure.

From the aspect of the polymerizability, the polymerization initiator preferably causes a radical polymerization, and is particularly preferably a photopolymerization initiator.

The photopolymerization initiator is a compound that causes a chemical change by the action of light and an interaction with a sensitizing dye in an electronically excited state and produces at least any one of a radical, acid and base, and a photoradical generator is preferable from the viewpoint that the polymerization can be initiated with a simple means as exposure.

The photopolymerization initiator in the invention can be selected from the photopolymerization initiators having sensitivity to actinic light rays such as ultraviolet rays of from 400 to 200 nm, far ultraviolet rays, g-rays, h-rays, i-rays, KrF excimer laser beams, ArF excimer laser beams, electron beams, X-rays, molecular beams or ion beams.

Specifically, known photopolymerization initiators in the art can be used without limitation, such as the ones described in Bruce M. Monroe et al., *Chemical Reviews,* 93, 435 (1993); R. S. Davidson, *Journal of Photochemistry and Biology A: Chemistry,* 73, 81 (1993); J. P. Faussier, "Photoinitiated Polymerization—Theory and Applications", *Rapra Review Report*, vol. 9, Rapra Technology (1998); and M. Tsunooka et al., *Prog. Polym. Sci.,* 21, 1 (1996). Further, a group of compounds that oxidatively or reductively generates a bond cleavage through interaction with a sensitizing dye in an electronically excited state as described in F. D. Saeva, *Topics in Current Chemistry,* 156, 59 (1990); G. G. Maslak, *Topics in Current Chemistry,* 168, 1 (1993); H. B. Shuster et al., *JACS,* 112, 6329 (1990); I. D. F. Eaton et al., *JACS,* 102, 3298 (1980), and the like.

Preferable photopolymerization initiators can be exemplified by: (a) aromatic ketones; (b) aromatic onium salt compounds; (c) organic peroxides; (d) hexaarylbiimidazole compounds; (e) ketoxime ester compounds; (f) borate compounds; (g) azinium compounds; (h) metallocene compounds; (i) active ester compounds; and (j) compounds having a carbon-halogen bond.

Preferable examples of the (a) aromatic ketones include a compound having a benzophenone skeleton or a thioxanthone skelton described in J. P. Fouassier, J. F. Rabek, "Radiation Curing in Polymer Science and Technology", pp. 77-117 (1993). More preferable examples of the (a) aromatic ketones include α-thiobenzophenone compounds described in Japanese Patent Publication (JP-B) No. 47-6416, benzoin ether compounds described in JP-B No. 47-3981, α-substituted benzoin compounds described in JP-B No. 47-22326, benzoin derivatives described in JP-B No. 47-23664, aroylphosphonic esters described in JP-A No. 57-30704, dialkoxybenzophenone described in JP-B No. 60-26483, benzoinethers described in JP-B No. 60-26403 and JP-B No. 62-81345, α-aminobenzophenones described in JP-B No. 1-34242, U.S. Pat. No. 4,318,791 and EP No. 0284561A1, p-di(dimethylaminozenzoyl)benzene described in JP-A No. 2-211452, thio-substituted aromatic ketones described in JP-A No. 61-194062, acylphosphine sulfides described in JP-B No. 2-9597, acylphosphines described in JP-B No. 2-9596, thioxantones described in JP-B No. 63-61950, and coumarins described in JP-B No. 59-42864.

Examples of the (b) aromatic onium salt compounds include aromatic omium salts of the elements in the groups of V, VI, and VII in the periodic table, specifically N, P, As, Sb, Bi, O, S, Se, Te or I. Preferable examples thereof include iodonium salts described in EP No. 104143, U.S. Pat. No. 4,837,124, JP-A No. 2-150848 and JP-A No. 2-96514; sulfonium salts described in EP Nos. 370693, 233567, 297443, 297442, 279210 and 422570, U.S. Pat. Nos. 3,902,144, 4,933,377, 4,760,013, 4,734,444 and 2,833,827; diazonium salts (such as benzene diazoniums that may have a substituent); diazonium salt resins (such as formaldehyde resins of diazophenylamine); N-alkoxypyridium salts (examples thereof include compounds described in U.S. Pat. No. 4,743, 528, JP-A Nos. 63-138345, 63-142345, 63-142346 and JP-B No. 46-42363, specific examples of which including 1-methoxy-4-phenylpyridium and tetrafluoroborate); and compounds described in JP-B Nos. 52-147277, 52-14278 and 52-14279. Radicals and acids are produced as the active species.

Examples of the (c) "organic peroxides" includes almost all of the organic compounds having one or more oxygen-oxygen bonds in the molecule and can be exemplified by ester peroxide type compounds, such as 3,3',4,4'-tetrakis(t-butylperoxycarbonyl)benzophenone, 3,3',4,4'-tetrakis(t-amylperoxycarbonyl)benzophenone, 3,3',4,4'-tetrakis(t-hexylperoxycarbonyl)benzophenone, 3,3',4,4'-tetrakis(t-octylperoxylcarbonyl)benzophenone, 3,3',4,4'-tetrakis (cumylperoxycarbonyl)benzophenone, 3,3',4,4'-tetrakis(p-isopropylcumylperoxycarbonyl)benzophenone, and di-t-butyldiperoxyisophthalate.

Examples of the (d) hexaarylbiimidazoles include the lophin dimers described in JP-B Nos. 45-37377 and 44-86516, such as 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetrakis(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis (o-trifluorophenyl)-4,4',5,5'-tetraphenylbiimidazole.

Examples of the (e) ketoxime esters include 3-benzoyloxyiminobutane-2-one, 3-acetoxyimonobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-p-toluenesulfonyloxyiminobutane-2-one, and 2-ethoxycarbonyloxyimino-1-phenylpropane-1-one.

Examples of the (f) borate compounds include the compounds described in U.S. Pat. Nos. 3,567,453 and 4,343,891, and EP Nos. 109,772 and 109,773.

Examples of the (g) azinium compounds are include the compounds having a N—O bond described in JP-A Nos. 63-138345, 63-142345, No. 63-142346 and 63-143537, and JP-B No. 46-42363.

Examples of the (h) metallocene compounds include the titanocene compounds described in JP-A Nos. 59-152396, 61-151197, 63-41484, 2-249, and 2-4705; and the iron-arene complexes described in JP-A Nos. 1-304453 and 1-152109.

Specific examples of the titanocene compounds include di-cyclopentadienyl-Ti-di-chloride, di-cyclopentadienyl-Ti-bis-phenyl, di-cyclopentadienyl-Ti-bis-2,3,4,5,6-pentafluoropheny-1-yl, di-cyclopentadienyl-Ti-bis-2,3,5,6-tetrafluoropheny-1-yl, di-cyclopentadienyl-Ti-bis-2,4,6-trifluoropheny-1-yl, di-cyclopentadienyl-Ti-2,6-difluoropheny-1-yl, di-cyclopentadienyl-Ti-bis-2,4-difluoropheny-1-yl, di-methylcyclopentadienyl-Ti-bis-2,3,4,5,6-pentafluoropheny-1-yl, di-methylcyclopentadienyl-Ti-bis-2,3,5,6-tetrafluoropheny-1-yl, di-methylcyclopentadienyl-Ti-bis-2,4-difluoropheny-1-yl, bis(cyclopentadienyl)-bis(2,6-difluoro-3-(pyri-1-yl)phenyl) titanium, bis(cyclopentadienyl)bis[2,6-difluoro-3-(methylsulfoneamide)phenyl]titanium, and bis(cyclopentadienyl)bis [2,6-difluoro-3-(N-butylbiaroyl-amino)phenyl]titanium.

Examples of the (i) active ester compounds include the nitrobenzylester compounds described in EP Nos. 0290750, 046083, 156153, 271851 and 0388343, U.S. Pat. Nos. 3,901, 710 and 4,181,531, JP-A Nos. 60-198538 and 53-133022; iminosulfonate compounds described in EP Nos. 0199672, 84515, 044115 and 0101122, U.S. Pat. Nos. 4,618,564, 4,371,605 and 4,431,774, JP-A Nos. 64-18143, 2-245756 and 4-365048; and the compounds described in JP-B No. 62-6223, JP-B No. 63-14340, and JP-A No. 59-174831.

Preferable examples of the (j) compounds having a carbon-halogen bond include the compounds described in Wakabayashi et al., *Bull. Chem. Soc. Japan,* 42, 2924 (1969), compounds described in U.K. Patent No. 1388492, compounds described in JP-A No. 53-133428, and the compounds described in German Patent No. 3337024.

Further, preferable examples of the compounds also include the compounds described in F. C. Schaefer et al., *J. Org. Chem.*, 29, 1527 (1964), compounds described in JP-A Nos. 62-58241 and 5-281728, compounds described in German Patent Nos. 2641100 and 3333450, and the compounds described in German Patent Nos. 3021590 and 3021599.

Examples of the photopolymerization initiator in the invention may be the compounds as shown below, but are not limited thereto. In the following formulae, Ar represents an aromatic group.

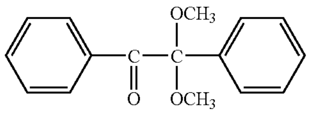

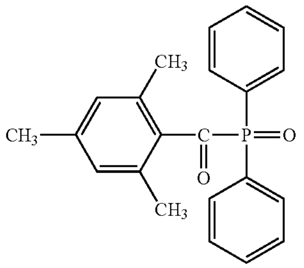

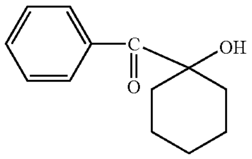

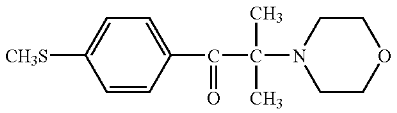

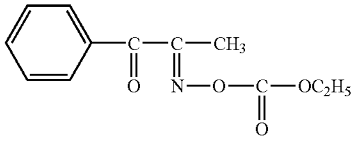

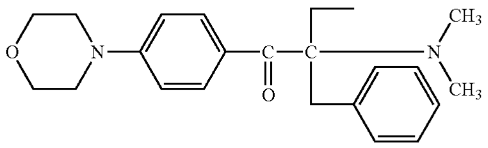

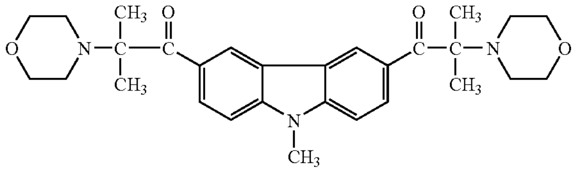

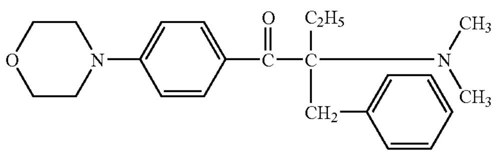

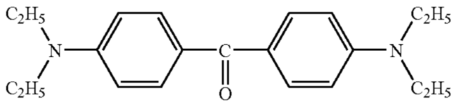

-continued

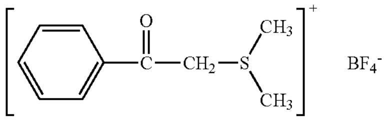

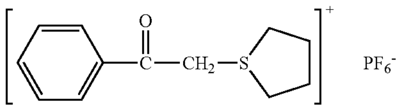

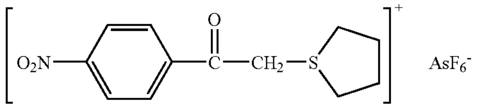

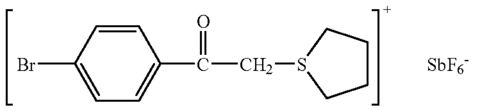

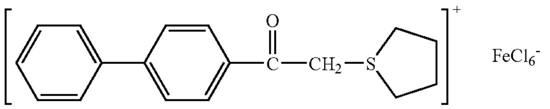

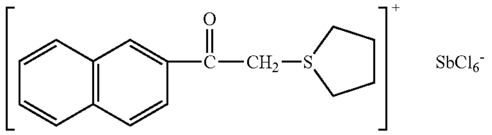

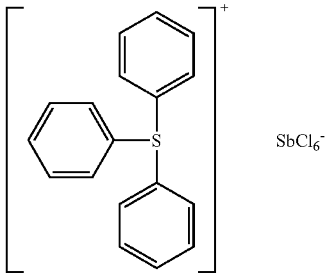

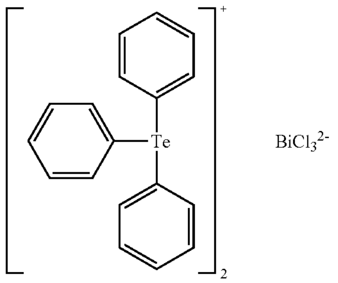

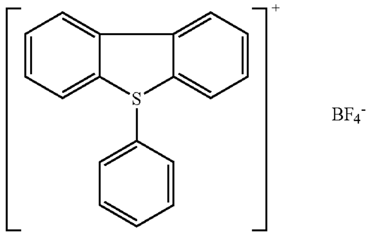

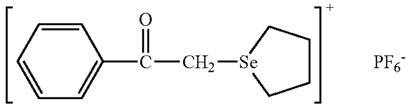

-continued
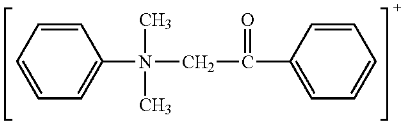
$BF_4^-$
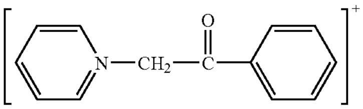
$SbF_6^-$
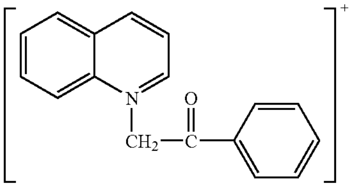
$BF_4^-$
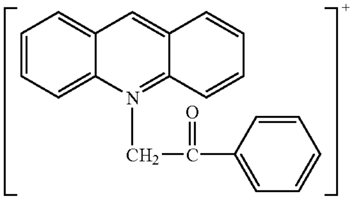
$BF_4^-$
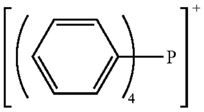
$BF_4^-$
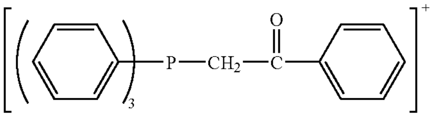
$AsF_6^-$
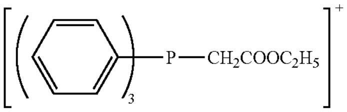
$PF_6^-$
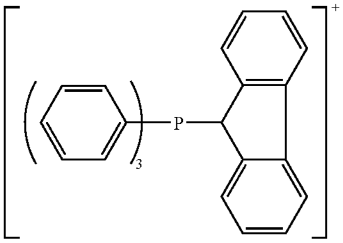
$BF_4^-$
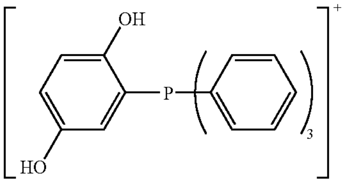
$BF_4^-$
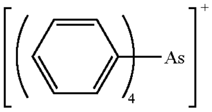
$BF_4^-$
-continued
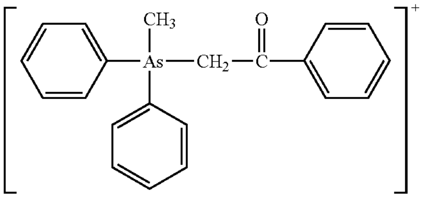
$BF_4^-$
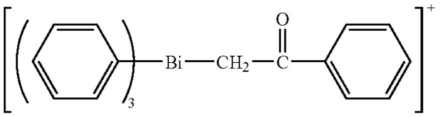
$BF_4^-$
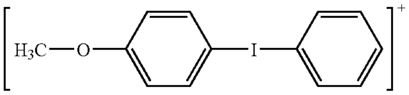
$BF_4^-$
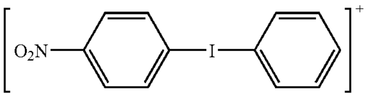
$BF_4^-$
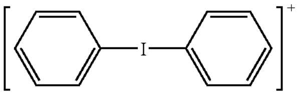
$PF_6^-$
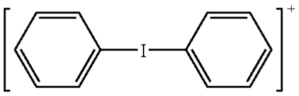
$SbF_6^-$
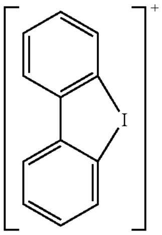
$BF_4^-$
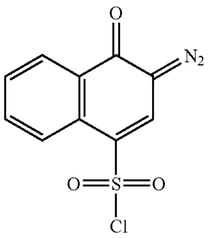
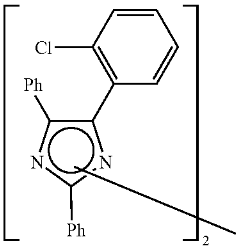
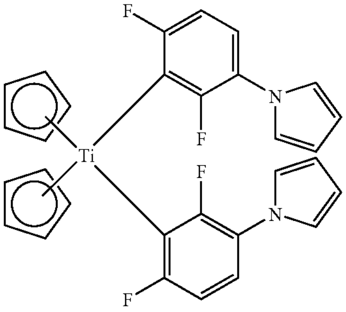
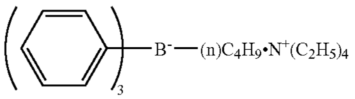
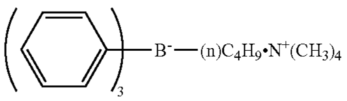

-continued
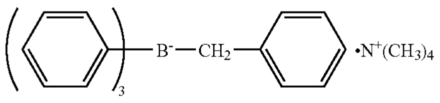
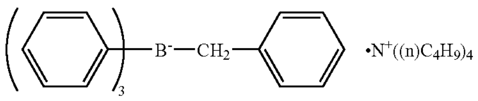
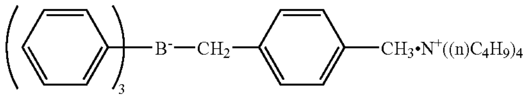
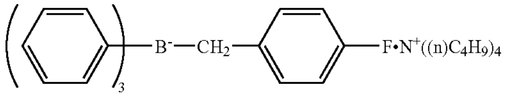
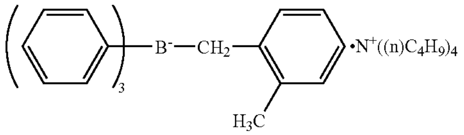
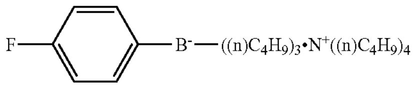
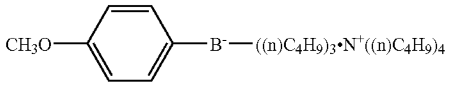
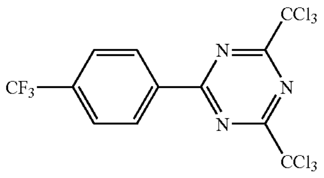
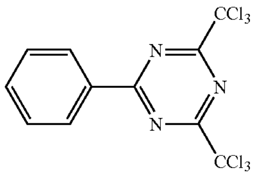
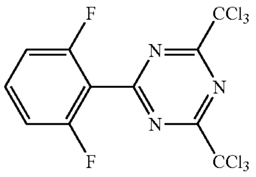
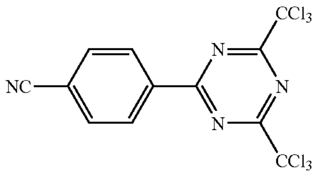
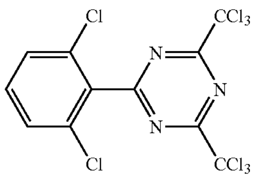
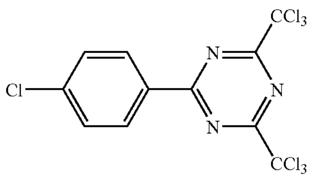
-continued
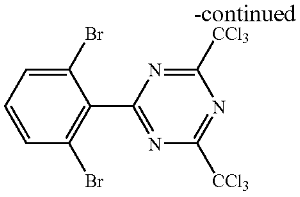
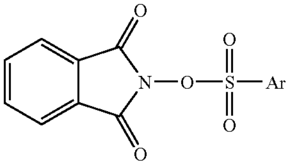
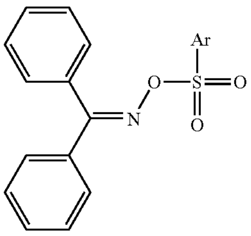
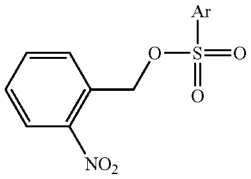
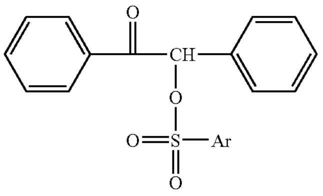
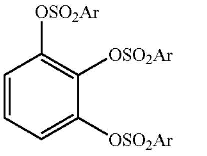
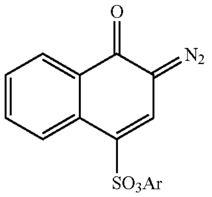
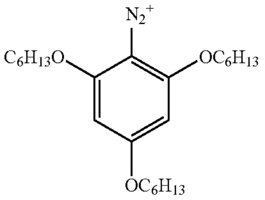
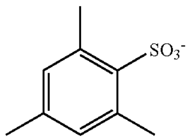
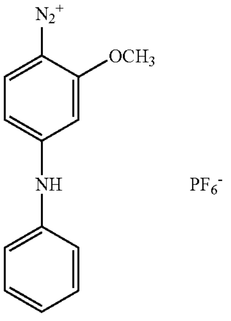
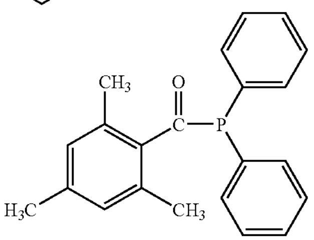

-continued

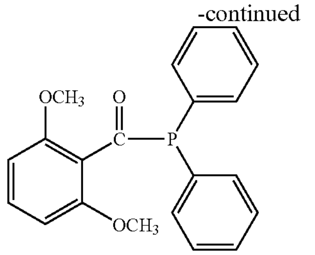

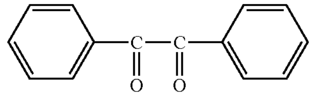

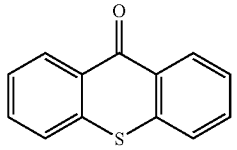

The polymerization initiator preferably has a high degree of sensitivity. However, from the viewpoint of storage stability, the polymerization initiator that does not cause thermal decomposition at a temperature up to 80° C. is preferably selected.

The polymerization initiator may be used alone or in combination of two or more kinds. Known sensitizers may be also used in combination for the purpose of improving the sensitivity as long as the effect of invention is not spoiled.

The content of the polymerization initiator in the undercoating liquid is preferably in the range of from 0.5 to 20% by mass with respect to the amount of the polymerizable material contained in the undercoating liquid, more preferably from 1 to 15% by mass, and particularly preferably from 3 to 10% by mass, from the viewpoint of temporal stability, curing property and curing speed. By containing the polymerization initiator of the amount in the above-described range, occurrence of precipitation or separation with the lapse of time and deterioration in the performances such as ink strength or rubbing resistance after curing can be suppressed.

The polymerization initiator may be contained in the ink as well as in the undercoating liquid, and the content thereof can be appropriately determined in the range where the storage stability of the ink can be maintained at the desired level. The content of the polymerization initiator in the ink droplet is preferably from 0.5 to 20% by mass with respect to the polymerizable or crosslinkable compound in the ink, and more preferably from 1 to 15% by mass.

(Sensitizing Dye)

A sensitizing dye may be added for the purpose of improving the sensitivity of the photopolymerization initiator in the invention. Preferred examples of the sensitizing dyes are the compounds included in the following compounds indicated below and have an absorption wavelength in the range of from 350 nm to 450 nm.

Polynuclear aromatics (for example, pyrene, perylene, and triphenylene), xanthenes (for example, fluorescein, eosin, erythrosine, rhodamine B, and rose bengal), cyanines (for example, thiacarbocyanine and oxacarbocyanine), merocyanines (for example, merocyanine and carbomerocyanine), thiazines (for example, thionine, methylene blue, and toluyzine blue), acridines (for examples, acridine orange, chloroflavin, and acriflavin), anthraquinones (for example, anthraquinone), squaryliums (for example, squarylium), and cumarins (for example, 7-diethylamino-4-methylcumarin).

Examples of the preferred sensitizing dyes are the compounds represented by the following Formulae (IX) to (XIII).

(IX)

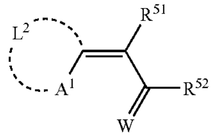

(X)

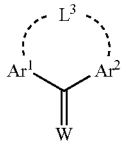

(XI)

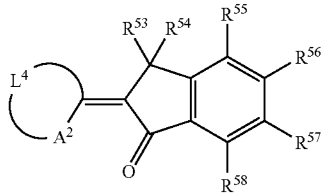

(XII)

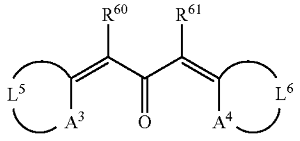

(XIII)

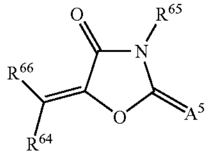

In Formula (IX), $A^1$ represents a sulfur atom or —$NR^{50}$—, $R^{50}$ represents an alkyl group or an aryl group, $L^2$ represents a non-metal atomic group that forms a basic nucleus of a dye together with the adjacent $A^1$ and the adjacent carbon atom, $R^{51}$ and $R^{52}$ each independently represent a hydrogen atom or a monovalent non-metal atomic group, wherein $R^{51}$ and $R^{52}$ may form an acid nucleus of a dye by bonding to each other. W represents an oxygen atom or a sulfur atom.

In Formula (X), $Ar^1$ and $Ar^2$ each independently represent an aryl group, and connect with each other via a bond by -$L^3$-, wherein $L^3$ represents —O— or —S—. W represents an oxygen atom or a sulfur atom.

In Formula (XI), $A^2$ represents a sulfur atom or —$NR^{59}$—, $L^4$ represents a non-metal atomic group that forms a basic nucleus of a dye together with the adjacent $A^2$ and the carbon atom. $R^{53}$, $R^{54}$, $R^{55}$, $R^{56}$, $R^{57}$, and $R^{58}$ each independently represent a group of a monovalent non-metal atomic group, and $R^{59}$ represents an alkyl group or an aryl group.

In Formula (XII), $A^3$ and $A^4$ each independently represent —S—, —$NR^{62}$—, or —$NR^{63}$—, $R^{62}$ and $R^{63}$ each independently represent a substituted or unsubstituted alkyl group or a substituted or unsubstituted aryl group, $L^5$ and $L^6$ each independently represent a non-metal atomic group that forms a basic nucleus of a dye together with the adjacent $A^3$, $A^4$, and the adjacent carbon atom, and $R^{60}$ and $R^{61}$ each independently represent a hydrogen atom or a monovalent non-metal atomic group, or can form an aliphatic or aromatic ring by bonding to each other.

In Formula (XIII), $R^{66}$ represents an aromatic ring or a hetero ring that may have a substituent, and $A^5$ represents an oxygen atom, a sulfur atom, or $—NR^{67}—$, $R^{64}$, $R^{65}$, and $R^{67}$ each independently represent a hydrogen atom or a monovalent non-metal atomic group, and $R^{67}$ and $R^{64}$, and $R^{65}$ and $R^{67}$ can bond to each other to form an aliphatic or an aromatic ring.

Specific examples of the compounds represented with the Formulae (IX) to (XIII) include Exemplary Compounds (A-1) to (A-20) shown as follows.

(A-1)

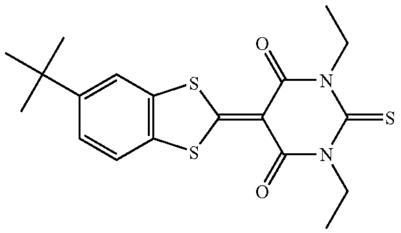

(A-2)

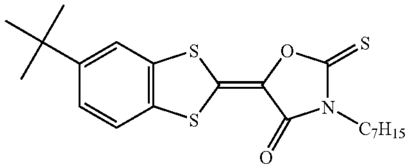

(A-3)

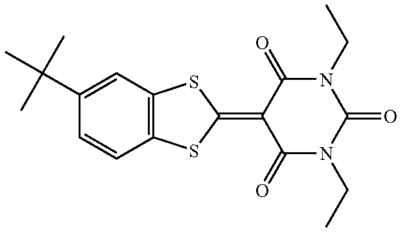

(A-4)

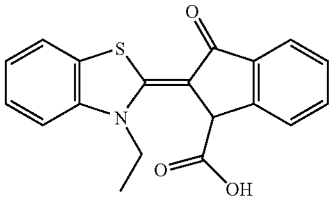

(A-5)

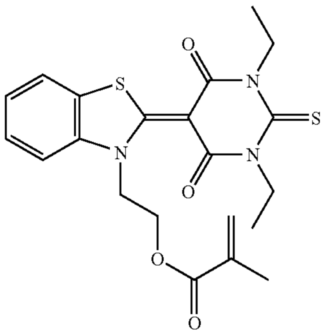

(A-6)

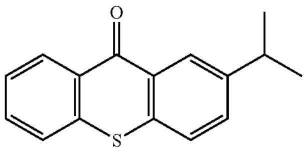

-continued (A-7)

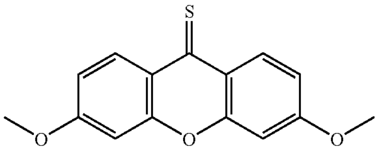

(A-8)

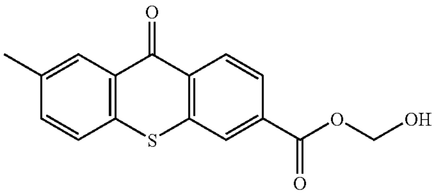

(A-9)

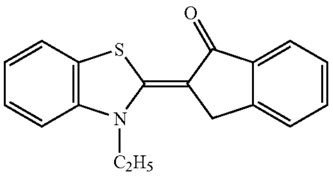

(A-10)

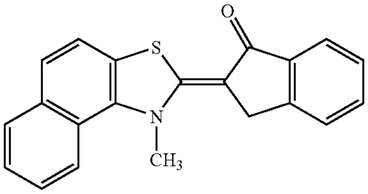

(A-11)

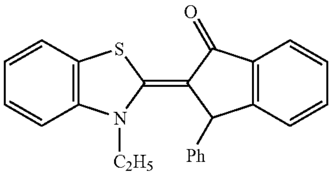

(A-12)

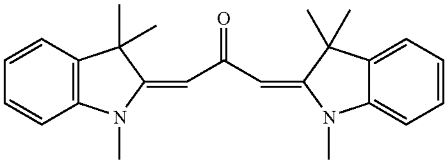

(A-13)

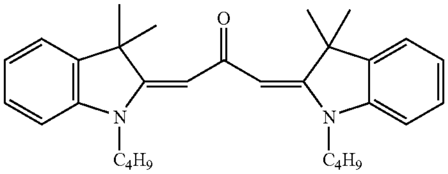

(A-14)

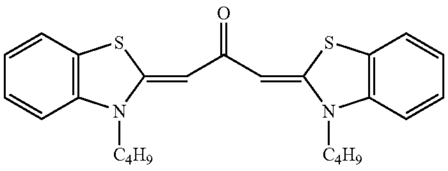

-continued (A-15)

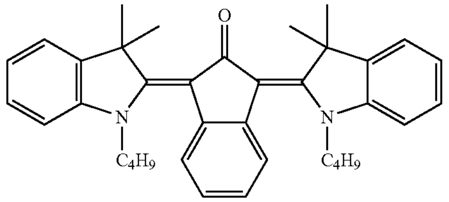

(A-16)

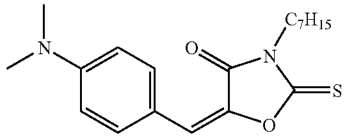

(A-17)

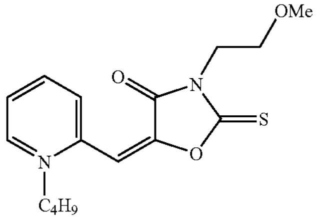

(A-18)

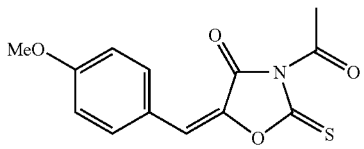

(A-19)

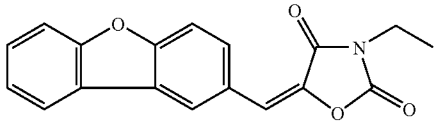

(A-20)

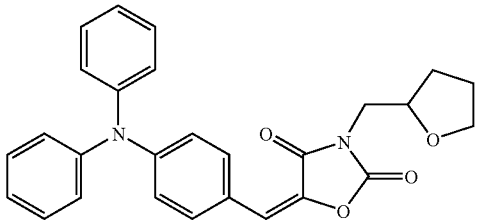

(Cosensitizer)

Known compounds having the capacity to further improve sensitivity or suppress the inhibition of polymerization by oxygen may be added as a cosensitizer.

Examples of the cosensitizers include amines such as the compounds described in M. R. Sander et al., *Journal of Polymer Society*, vol. 10, 3173 (1972), JP-B No. 44-20189, JP-A Nos. 51-82102, 52-134692, 59-138205, 60-84305, 62-18537 and 64-33104, and Research Disclosure No. 33825. Specific compounds thereof include triethanolamine, p-dimethylaminobenzenethylester, p-formyldimethyaniline, and p-methylthiodimethylaniline.

Other examples of the cosensitizers include thiols and sulfides such as the thiol compounds described in JP-A No. 53-702, JP-B No. 55-500806, and JP-A No. 5-142772, and the disulfide compounds described in JP-A No. 56-75643. Specific examples thereof include 2-mercaptobenzothiazole, 2-mercaptobenzoxazole, 2-mercaptobenzoimidazole, 2-mercapto-4-(3H)-quinazoline, and β-mercaptonaphthalene.

Other examples of the cosensitizers further include amino acid compounds (for example, N-phenylglycine), the organic metal compounds described in JP-B No. 48-42965 (for example, tributyl tin acetate), the hydrogen donors described in JP-B No. 55-34414, the sulfur compounds described in JP-A No. 6-308727 (for example, trithiane), the phosphor compounds described in JP-A No. 6-250387 (for example, diethylphosphite), and the compounds of Si—H and Ge—H described in JP-A No. 8-65779.

(Coloring Agent)

The ink and the undercoating liquid preferably contain at least one coloring agent, and more preferably a coloring agent is contained at least in the ink. The coloring agent may be included in the undercoating liquid and other liquids other than the ink.

The coloring agent is not particularly limited, and may be appropriately selected from known water-soluble dyes, oil-soluble dyes, and pigments. The ink and the undercoating liquid in the invention are preferably composed as a non-water soluble organic solvent system from the viewpoint of the effect of the invention, and oil-soluble dyes or pigments that readily dissolve and uniformly disperse in a non-water soluble medium are preferably used.

The content of the coloring agent in the ink is preferably from 1 to 30% by mass, more preferably from 1.5 to 25% by mass, and particularly preferably from 2 to 15% by mass. When the undercoating liquid contains a white pigment, the content thereof in the undercoating liquid is preferably from 2 to 45% by mass, and more preferably from 4 to 35% by mass.

Details of the pigments will be explained focusing on the preferable examples thereof in the invention.

(Pigment)

In the invention, it is preferable that a pigment is used as the coloring agent. Either of organic pigments and inorganic pigments can be used as the pigment, but a carbon black pigment can be named as a preferable black pigment. The pigments of black and the three basic colors of cyan, magenta, and yellow are generally used, but pigments having other hues such as red, green, blue, brown and white, metallic-glossy pigments such as gold and silver, and body pigments of colorless or a light color can also be used depending on the purposes.

Examples of the organic pigments are not limited by the hues thereof, and include the pigments of perylene, perynone, quinacridone, quinacridone quinone, anthraquinone, anthoanthrone, benzimidazolone, disazo condensation, disazo, azo, indanthrone, phthalocyanine, triarylcarbonium, dioxadine, aminoanthraquinone, diketopyrrolopyrrole, thio indigo, isoindoline, isoindolinone, pyranthrone and isoviolanthrone, and mixtures thereof.

Further specific examples of the pigments include perylene-based pigments such as C. I. Pigment Red 190 (C. I. No. 71140), C. I. Pigment Red 224 (C. I. No. 71127), and C. I. Pigment Violet 29 (C. I. No. 71129); perynone-based pigments such as C. I. Pigment Orange 43 (C. I. No. 71105) and C. I. Pigment Red 194 (C. I. No. 71100); quinacridone-based pigments such as C. I. Pigment Violet 19 (C. I. No. 73900), C. I. Pigment Violet 42, C. I. Pigment Red 122 (C. I. No. 73915), C. I. Pigment Red 192, C. I. Pigment Red 202 (C. I. No. 73907), C. I. Pigment Red 207 (C. I. No. 73900 and No. 73906), and C. I. Pigment Red 209 (C. I. No. 73905); quinacridone quinone-based pigments such as C. I. Pigment Red 206 (C. I. No. 73900/73920), C. I. Pigment Orange 48 (C. I. No. 73900/73920), and C. I. Pigment Orange 49 (C. I. No. 73900/73920); anthraquinone-based pigments such as C. I. Pigment Yellow 147 (C. I. No. 60645); anthoanthrone-based pigments such as C. I. Pigment Red 168 (C. I. No. 59300); benzimidazolone-based pigments such as C. I. Pigment Brown 25 (C. I. No. 12510), C. I. Pigment Violet 32 (C. I. No. 12517), C. I. Pigment Yellow 180 (C. I. No. 21290), C. I. Pigment Yellow 181 (C. I. No. 11777), C. I. Pigment Orange 62 (C. I. No. 11775), and C. I. Pigment Red 185 (C. I. No. 12516); disazo condensation-based pigments such as C. I. Pigment Yellow 93 (C. I. No. 20710), C. I. Pigment Yellow 94 (C. I. No. 20038), C. I. Pigment Yellow 95 (C. I. No. 20034), C. I. Pigment yellow 128 (C. I. No. 20037), C. I. Pigment Yellow 166 (C. I. No. 20035), C. I. Pigment Orange 34 (C. I. No. 21115), C. I. Pigment Orange 13 (C. I. No. 21110), C. I. Pigment Orange 31 (C. I. No. 20050), C. I. Pigment Red 144 (C. I. No. 20735), C. I. Pigment Red 166 (C. I. No. 20730), C. I. Pigment Red 220 (C. I. No. 20055), C. I. Pigment Red 221 (C. I. No. 20065), C. I. Pigment Red 242 (C. I. No. 20067), C. I. Pigment Red 248, C. I. Pigment Red 262, and C. I. Pigment Brown 23 (C. I. No. 20060);

Disazo-based pigments such as C. I. Pigment Yellow 13 (C. I. No. 21100), C. I. Pigment Yellow 83 (C. I. No. 21108), and C. I. Pigment Yellow 188 (C. I. No. 21094); azo-based pigments such as C. I. Pigment Red 187 (C. I. No. 12486), C. I. Pigment Red 170 (C. I. No. 12475), C. I. Pigment Yellow 74 (C. I. No. 11714), C. I. Pigment Yellow 150 (C. I. No. 48545), C. I. Pigment Red 48 (C. I. No. 15865), C. I. Pigment Red 53 (C. I. No. 15585), C. I. Pigment Orange 64 (C. I. No. 12760), and C. I. Pigment Red 247 (C. I. No. 15915); indanthrone-based pigments such as C. I. Pigment Blue 60 (C. I. No. 69800); phthalocyanine-based pigments such as C. I. Pigment Green 7 (C. I. No. 74260), C. I. Pigment Green 36 (C. I. No. 74265), C. I. Pigment Green 37 (C. I. No. 74255), C. I. Pigment Blue 16 (C. I. No. 74100), C. I. Pigment Blue 75 (C. I. No. 74160:2), and 15 (C. I. No. 74160); triarylcarbonium-based pigments such as C. I. Pigment Blue 56 (C. I. No. 42800) and C. I. Pigment Blue 61 (C. I. No. 42765:1); dioxadine-based pigments such as C. I. Pigment Violet 23 (C. I. No. 51319) and C. I. Pigment Violet 37 (C. I. No. 51345); aminoanthraquinone-based pigments such as C. I. Pigment Red 177 (C. I. No. 65300); diketopyrrolopyrrole-based pigments such as C. I. Pigment Red 254 (C. I. No. 56110), C. I. Pigment 255 (C. I. No. 561050), C. I. Pigment Red 264, C. I. Pigment Red 272 (C. I. No. 561150), C. I. Pigment Orange 71, and C. I. Pigment Orange 73; thio indigo-based pigments such as C. I. Pigment Red 88 (C. I. No. 73312); isoindoline-based pigments such as C. I. Pigment Yellow 139 (C. I. No. 56298) and C. I. Pigment Orange 66 (C. I. No. 48210); isoindolinone-based pigments such as C. I. Pigment Yellow 109 (C. I. No. 56284) and C. I. Pigment Orange 61 (C. I. No. 11295); pyranthrone-based pigments such as C. I. Pigment Orange 40 (C. I. No. 59700) and C. I. Pigment Red 216 (C. I. No. 59710); and isoviolanthrone-based pigments such as C. I. Pigment Violet 31 (60010).

In the invention, two or more kinds of the organic pigments or solid solutions of the organic pigments can be combined and used.

Other materials such as particles composed of a core of silica, almina, resin or the like having a dye or a pigment fixed on the surface, an insoluble laked compound of a dye, colored emulsion and colored latex can also be used as the pigment. Further, a pigment coated with a resin can be also used, which is called a micro capsule pigment and the products thereof are commercially available from Dainippon Ink and Chemicals, Inc., Toyo Ink MFG. Co., Ltd. and the like.

The volume average particle diameter of the pigment particles contained in the liquid is preferably in the range of from 10 to 250 nm, from the viewpoint of the balance between optical concentration and storage stability, and further preferably from 50 to 200 nm. The volume average particle diameter of the pigment particles can be measured with a particle diameter distribution analyzer such as LB-500 (manufactured by HORIBA, Ltd.).

The coloring agents may be used alone or in the form of a mixture of two or more kinds thereof. Further, different coloring agents may be used in different liquid droplets to be ejected and liquids, or the same coloring agent may be used therein.

(Other Components)

Components other than the ones described above such as known additives can also be used as appropriate according to usage.

<Storage Stabilizer>

A storage stabilizer can be added in the ink and the undercoating liquid according to the invention (preferably in the ink) for the purpose of suppressing undesired polymerization during storage. The storage stabilizer is preferably used together with the polymerizable or crosslinkable material, and is preferably soluble in the liquid droplets or liquid or other coexistent components in which the storage stabilizer is contained.

Examples of the storage stabilizers include a quaternary ammonium salt, hydroxylamines, cyclic amides, nitriles, substituted ureas, heterocyclic compounds, organic acids, hydroquinone, hydroquinone monoethers, organic phosphines and copper compounds, and specific examples thereof include benzyltrimethylammonium chloride, diethylhydroxylamine, benzothiazole, 4-amino-2,2,6,6-tetramethylpiperizine, citric acid, hydroquinone monomethylether, hydroquinone monobutylether and copper naphthenate.

The addition amount of the storage stabilizer is preferably adjusted as appropriate according to the activity of the polymerization initiator, polymerization capability of the polymerizable or crosslinkable material, or the type of the storage stabilizer, but is preferably from 0.005 to 1% by mass in terms of the solid content, more preferably from 0.01 to 0.5% by mass, and further preferably 0.01 to 0.2% by mass, in view of the balance between storage stability and curing property.

<Conductive Salt>

Conductive salts are solid compounds that improve conductivity. In the invention, it is preferable that the conductive salt is not substantially used since there is a large possibility that they deposit at the time of storage, but appropriate amount thereof may be added when the solubility is in good condition by enhancing the solubility of the conductive salt or using a substance having high solubility in the liquid component, and the like.

Examples of the conductive salts include potassium thiocyanate, lithium nitrate, ammonium thiocyanate and dimethylamine hydrochloride.

<Solvent>

Known solvents can be used in the invention, as necessary. The solvent can be used for the purpose of improving the polarity, viscosity or the surface tension of the liquid (ink), improving the solubility or dispersibility of the coloring agent, adjusting the conductivity, or adjusting the printing performance.

The solvent in the invention is preferably a non-water soluble liquid that does not contain an aqueous solvent from the viewpoint of recording a high quality image that dries quickly and is uniform in line width, and is more preferably a solvent composed of a high boiling point organic solvent. The high boiling point organic solvent used in the invention preferably has a good compatibility with the constituent materials, especially with the monomers.

Preferable examples of the solvents include tripropylene glycol monomethylether, dipropylene glycol monomethylether, propylene glycol monomethylether, ethylene glycol monobutylether, diethylene glycol monobutylether, triethylene glycol monobutylether, ethylene glycol monobenzylether and diethylene glycol monobenzylether.

Although there are known low boiling point organic solvents having a boiling point of 100° C. or less, it is preferable to avoid using such solvents in consideration of unfavorable effects on the curing ability and the possibility of causing environmental pollution. In the case of using these solvents, it is preferable to select a solvent with high safety, i.e., a solvent with high control concentration (the index indicated according to the working environment evaluation standard), which is preferably 100 ppm or more and further preferably 200 ppm or more. Examples of such solvents include alcohols, ketones, esters, ethers and hydro carbons, and specifically include methanol, 2-butanol, acetone, methylethylketone, ethyl acetate, tetrahydrofuran.

The solvent can be used alone or in combination of two or more kinds. However, when water and/or a low boiling point organic solvent are used, the total amount thereof in each liquid is preferably from 0 to 20% by mass, more preferably from 0 to 10% by mass, and it is further preferable that they are substantially not contained. It is preferable that the ink and the undercoating liquid in the invention substantially does not contain water from the viewpoint of achieving temporal stability without decreasing the uniformity or increasing the turbidity of the liquid due to precipitation of a dye and the like, with the lapse of time, and from the viewpoint of securing the drying property when an impermeable or slow-permeable recording medium is used. The term “Substantially does not contain” here means that the admissible level of inevitable impurities may exist.

<Other Additives>

Known additives such as a polymer, a surface tension regulator, an ultraviolet absorber, an antioxidant, an anti-fading agent, and a pH regulator can be used in combination.

Known compounds may be appropriately selected and used as the above additives, and specific examples thereof include the additives described in JP-A 2001-181549.

Further, a pair of compounds that generate an aggregate or increase viscosity when they react with each other upon mixing can be contained separately in the ink and the undercoating liquid in the invention. The above pair of compounds has a characteristic of rapidly forming the aggregate or rapidly increasing viscosity of the liquid, thereby suppressing coalescence of adjacent liquid droplets more effectively.

Examples of the reaction of the above pair of compounds include an acid/base reaction, a hydrogen bonding reaction by a carbonic acid/amide group containing compound, a crosslinking reaction such as a reaction of boronic acid/diol, and a reaction by electrostatic interaction by cation/anion.

The following are the details of the ink jet recording device of the invention.

The ink jet recording device of the invention comprises an undercoating liquid application unit that applies an undercoating liquid containing a polymer onto a recording medium; an undercoating liquid curing unit that is provided downstream of the undercoating liquid application unit in a moving direction of the recording medium and that partially cures the undercoating liquid by applying energy onto at least a part of the undercoating liquid; and an image recording unit that is provided downstream of the undercoating liquid curing unit in a moving direction of the recording medium and that records an image by ejecting, onto the partially cured undercoating liquid, an ink that is curable by irradiation with actinic energy rays.

The ink jet recording device of the invention may further comprise a conveyance unit that conveys the recording medium and an actinic energy irradiation unit that is provided downstream of the image forming unit and that irradiates, with actinic energy rays, the recording medium on which an image is recorded by the image recording unit and further promotes the curing of the ink and the undercoating liquid.

The image recording unit is preferably an image recording unit that ejects the ink from at least one line-formation ink jet head, the head having a length corresponding to the entire width of a recordable width of the recording medium and being arranged in a direction perpendicular to a direction in which the recording medium is conveyed.

—Mechanism of Image Recording and Recording Device—

An example of the mechanism of the invention to form an image on a recording medium while avoiding interdroplet interference will be explained by referring to FIGS. 5A to 5D.

Figure 5A:
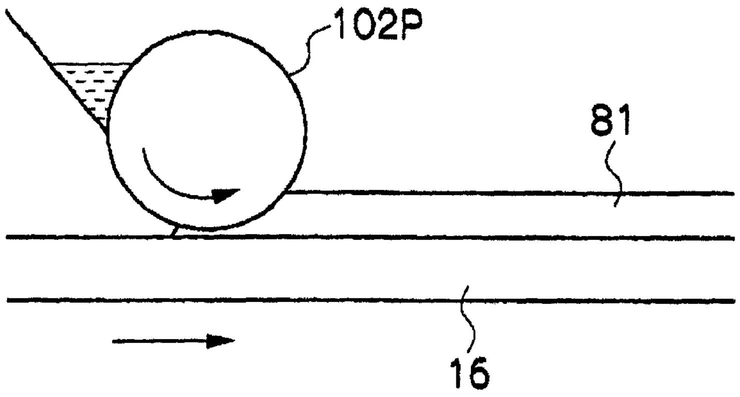
FIGS. 5A to 5D are flow charts showing the mechanism of forming an image.

The undercoating liquid that does not contain a coloring agent is applied onto a recording medium 16 to form a liquid film 81 consisting of the undercoating liquid on the surface of the recording medium 16, as shown in FIG. 5A. The undercoating liquid is applied by coating in FIG. 5A, but may also be applied by ejection using an ink jet head (also referred to as “ejection”), spray coating or the like.

The thickness of the liquid film of the applied undercoating liquid is determined as an average thickness obtained by dividing the value of the volume of the applied undercoating liquid by the value of the area onto which the undercoating liquid is applied. In the case where the undercoating liquid is applied by ejection, the thickness of the liquid film can be obtained from the value of the ejected volume and the value of the area onto which the undercoating liquid has been ejected. The thickness of the liquid film of the undercoating liquid is desirably uniform with no local unevenness. From this point of view, the undercoating liquid preferably wets the recording medium well and spreads thereon, i.e., has a small degree of static surface tension, as long as the liquid can be ejected stably from the ink jet head.

Figure 5B:
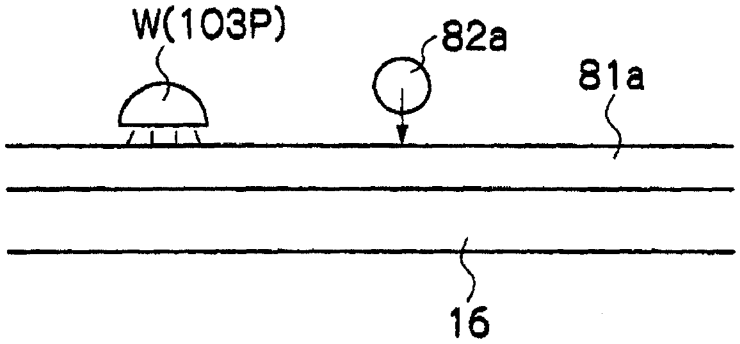
Figure 5C:
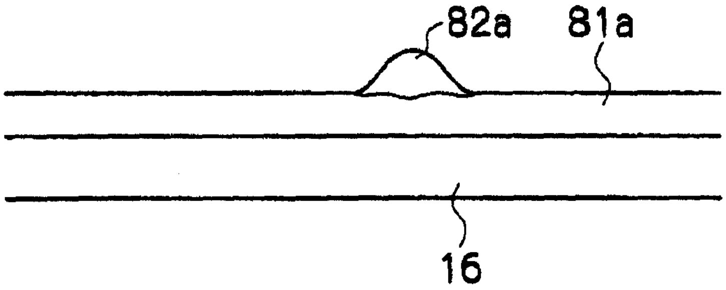

After the undercoating liquid is partially cured by irradiation with active light from a light source W (partially cured undercoating liquid (partially cured undercoating liquid layer); 81*a*), an ink droplet 82*a* is ejected as shown in FIG. 5B, thereby depositing the ink droplet 82*a* onto the undercoating film 81 as shown in FIG. 5C. At this time, the degree of curing at the surface of the undercoating layer is lower than that in the insider thereof, thereby having good compatibility with the ink droplet 82*a*.

Figure 5D:
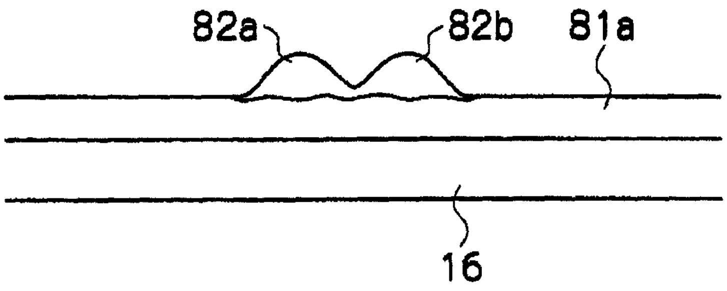

Subsequently, another ink droplet 82*b* is ejected onto the recording medium 16 in the region where the layer of the undercoating liquid 81*a* is formed and near the position where the first liquid droplet 82*a* has been ejected, as shown in FIG. 5D. At this time, the undercoating layer liquid layer 81 has a lower degree of curing at the surface thereof than in the inside thereof, thereby having good compatibility with the ink droplet 82*b*. Although a force works to make the ink droplet 82*a* and the ink droplet 82*b* to coalesce with each other, the interdroplet interference can be suppressed since the adhesion of the ink droplet and the surface of the undercoating layer is strong and the inside of the undercoating layer which has been cured acts as a resistance force against the coalescence between the ink droplets.

A substance that causes a chemical reaction by which a coloring material contained in the ink aggregates or becomes insoluble has conventionally been contained in the undercoating liquid, in order to avoid the interdroplet interference.

However, according to the invention, the interdroplet interference can be avoided without containing such a substance in the undercoating liquid.

While the interdroplet interference is avoided and the shapes of the ink droplets of 82*a* and 82*b* are maintained (in the case of the invention, during a period of from a few hundred milliseconds to 5 seconds) as shown in FIG. 5D, i.e., before the shapes of the droplets are lost, the ink droplets 82*a* and 82*b* are cured or partially cured to a level such that the shapes thereof are kept, and the color material in the ink droplets 82*a* and 82*b* are fixed onto the recording medium 16. At least the ink contains actinic energy rays curing-type polymerizable compound and is cured by a so-called polymerization reaction when irradiated with actinic energy rays such as ultraviolet rays. The polymerization compound can also be contained in the undercoating liquid, which is preferable for promoting adhesion since the whole liquid that has been ejected is cured.

Next, the entire configuration of an inline label printer, an example of the image recording device provided with the ink jet recording device in the invention, will be explained by reference with the figures.

Figure 6:
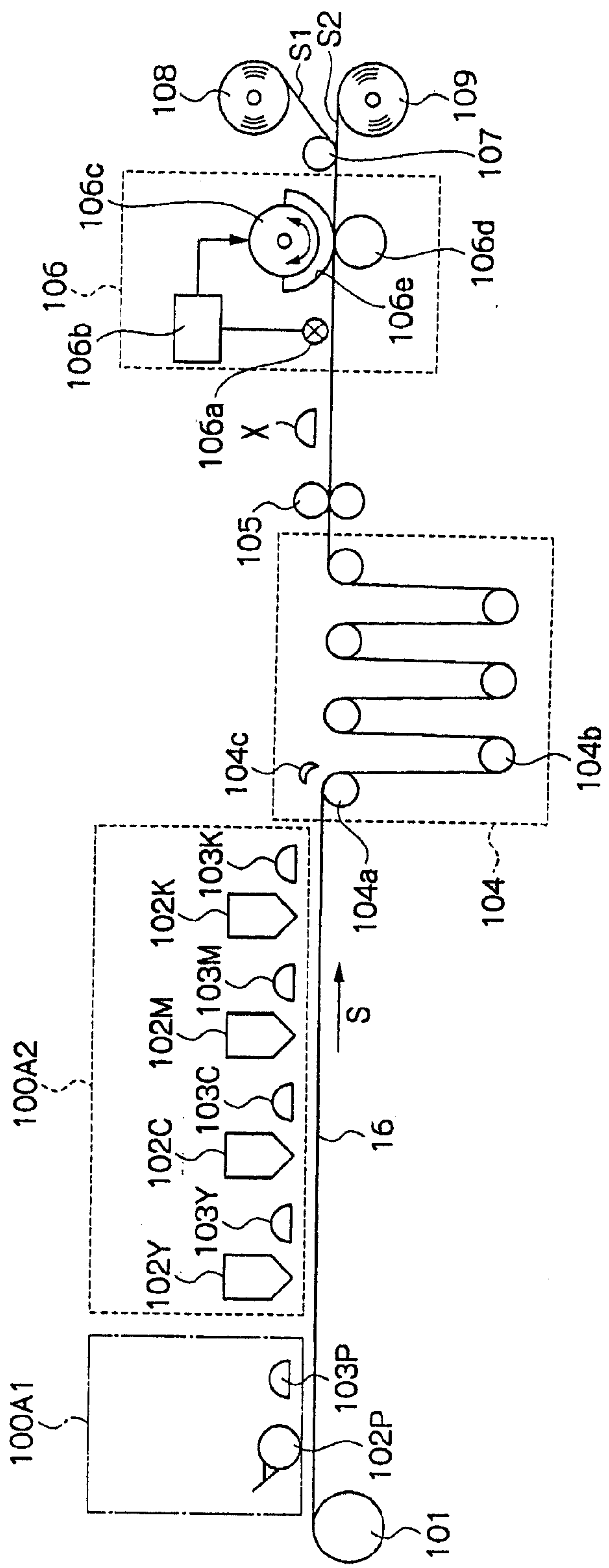
FIG. 6 is a schematic sectional view showing the entire configuration of an image recording device that records an image in accordance with the ink jet recording method of the invention.

FIG. 6 is an entire configuration diagram showing one example of an inline label printer (image recording device) 100. The image recording device 100 consists of an ink jet recording part 100A in the invention, a post-processing part 100B that performs a post-processing to the recording medium that has been recorded an image, and a buffer 104 as a cushioning unit provided between the ink jet recording part 100A and the post-processing part 100B.

The ink jet recording device in the invention is applied to the ink jet recording part 100A. The ink jet recording part 100A consists of an undercoating liquid film forming unit 100A1 that forms a partially cured undercoating liquid film that does not contain a coloring agent on the recording medium (label) 16, and an image forming unit 100A2 that forms a desired image on the recording medium 16 by applying four inks containing a coloring material on the prescribed position of the recording medium 16.

Favorable images can be formed particularly when a recording medium that does not have permeability (for example, OPP (Oriented Polypropylene Film), CPP (Casted Polypropylene Film), PE (Polyethylene), PET (Polyethylene Terephthalate), PP (Polypropylene), a soft wrapping material with low permeability, laminate paper, coated paper and art paper is used as the recording medium.

In FIG. 6, the ink jet recording part 100A is provided with the image forming unit 100A2 where an ink is applied by ink jetting onto the recording medium 16 on which the undercoating liquid has been applied with a roll coater 102P.

The image recording device 100 is provided with a liquid storage/loading unit that is prevented from light-transmittance (not shown) and store the undercoating liquid and the ink to be supplied to the undercoating liquid film forming part 100A1 and the image forming part 100A2; a paper supplying unit 101 that supplies the recording medium 16; an image detecting unit 104*c* that reads an image as the result of ejection of the ink (the state of the deposited ink droplets) by the image forming part 100A2; and a rewinding unit 109 that rewinds the recorded recording medium 16.

The paper supplying unit 101 is described in FIG. 6 as a paper supplying unit that supplies a roll paper (continuous paper), but the unit may be the type that supplies precut sheets of paper.

Further details of the ink jet recording unit 100A will now be explained. The ink jet recording unit 100A has the image forming part 100A2 including ejecting heads 102Y, 102C, 102M, and 102K that eject ink onto the recording medium 16 in a single pass, pinning light sources 103Y, 103C, and 103M, and a final curing light source 103K; and the undercoating liquid film forming part 100A1 including the roll coater 102P and a light source for partial curing 103P. Specifically, it is a so-called full-line head which is a line-formation head having a length corresponding to the entire width of the recordable area of the recording medium 16, the head being arranged in a direction perpendicular to a direction of conveying the recording medium (shown by an arrow S in FIG. 6). Further, the pinning light sources 103Y, 103C, and 103M are respectively arranged downstream of the ejecting heads 102Y, 102C and 102M, which cure the dots of ejected ink of each color at least to such a level that the dots do not lose their shape.

The roll coater 102P and the ejecting heads 102Y, 102C, 102M, and 102K having plural nozzles (liquid ejecting ports) are arranged in the length longer than at least one side of the recording medium 16 of the maximum size for which the ink jet recording part 100A is intended.

The ejecting heads 102Y, 102C, 102M, and 102K corresponding to each liquid are arranged in the order of yellow ink (Y), cyan ink (C), magenta ink (M), and black ink (K) from the upstream side (the left side of FIG. 6) along with the direction S of conveying the recording medium, and by which a color image can be formed on the recording medium 16.

Specifically, the undercoating liquid is first uniformly applied onto the recording medium 16 with the roll coater (102P), then partial curing of the undercoating liquid is performed by the ultraviolet light source for partial curing 103P. Next, the ink is ejected from the ejecting head for yellow ink 102Y toward the recording medium 16, then the yellow ink on the recording medium is partially cured to such a level that the surface thereof is not cured and the shape thereof is kept by the pinning light source 103Y arranged downstream of the ejecting head 102Y. Subsequently, the same processes as that of the yellow ink are repeated with the heads 102C and 102M, and after the ejection by the ejecting head for black ink 102K, curing is completed by the final curing light source 103K capable of completely curing the undercoating liquid and all of the inks. In this process, by partially curing the undercoating liquid and the inks after application, interdroplet interference can be avoided.

According to the image forming part 100A2 consisting of a full-line ejecting head, an image can be recorded on the entire surface of the recording medium 16 at one operation of relatively moving the recording medium 16 and the image forming part 100A2 in a direction of conveying the recording medium. Therefore, high-speed printing can be performed as compared with a case of using a shuttle type head in which the ejecting head moves back and forth in a direction perpendicular to the direction of conveying the recording medium while conveying the recording medium, thereby improving the productivity.

In the embodiments, inks of the standard colors YCMK (4 colors) are used, but the number of the colors or the combination thereof is not limited to the examples shown here, and other inks of a light color, dark color, white or other spot colors, or transparent inks may also be used depending on necessity. Examples of the possible constitutions thereof include using an ejecting head that ejects an ink of light colored type such as light cyan and light magenta in combination; delineating the background with a white ink; and adjusting the glossiness with a transparent ink.

UV light sources 103P, 103Y, 103C, 103M, and 103K radiate ultraviolet rays to the recording medium 16 in order to cure the ink containing a polymerizable compound. Known light sources such as a medium-pressure mercury lamp, a high-pressure mercury lamp, an ultrahigh-pressure mercury lamp, a metal-halide lamp, a xenon lamp, a carbon arc lamp, an ultraviolet fluorescent lamp, an ultraviolet LED, and an ultraviolet LD can be used as the ultraviolet light source. Among these, a high-pressure mercury lamp, an ultrahigh-pressure mercury lamp, and a metal-halide lamp are preferably used from the aspect of practicality. The UV light source preferably has a peak of the amount of light in the wavelength range of from 200 nm to 400 nm, and preferably has an irradiation light intensity in the range of from 1 to 500 $mW/cm^2$ in the wavelength at the peak amount of light. The UV light source is preferably constituted using a cold mirror in a reflector and an infrared cut glass in a cover glass so as to prevent the increase in temperature of the recording medium by the irradiation with heat rays. In a case of using an ink containing a radical based polymerizable compound, hindrance of the polymerization due to oxygen can be suppressed, and curing and fixing of the ink can be performed more favorably, by substituting the curing atmosphere created by the final curing light source 103K with an inert gas such as nitrogen (not shown).

An electron beam irradiation device (not shown) may also be used as a means of curing the ink containing a polymerizable compound.

In the above, the use of a UV light source and an electron beam irradiation device is discussed as a means of curing the polymerizable compound, but the means is not limited to thereto and other radiant rays such as α-rays, γ-rays, and X-rays may also be used.

The image detecting unit 104*c* includes an image sensor (such as a line sensor) to pick up the image of the result of the ejection by the image forming part 100A2, and functions as a means of checking the presence of ejection abnormalities, such as clogging of the nozzles, from the image read by the image sensor.

A buffer 104 is provided as a cushioning unit between the ink jet recording part 100A and the post-processing part 100B. The recording medium that has been subjected to ink jet recording passes through the buffer 104 consisting of several upper rollers 104*a* and several lower rollers 104*b*, while repeating going up and down a few times. The buffer 104 serves as a regulator that absorbs the difference between the operation speeds (the speeds for conveying the recording medium 16) in the ink jet recording part 100A positioned upstream of the buffer and in a later-described post-processing part 100B positioned downstream of the buffer.

In the downstream of the buffer 104 is provided a varnish coater 105. In the varnish coater 105, the surface of a label is slightly coated with a varnish to improve scratch-resistance of the label surface.

A drier X is provided downstream of the varnish coater 105. For example, a UV lamp (same as the final curing light source 103K) can be used for the drier X when a UV varnish is used.

A label cutting unit 106 provided downstream of the varnish coater 105 is composed of a marking reader 106*a*, a die cutter driver 106*b*, a dye cutter 106*c* equipped with a roll (a plate) 106*e* having a blade, and a facing roller 106*d*.

A label cut by the die cutter 106*c* in the label cutting unit 106 is wound up by a label winding unit 109 into the form of a product, and other parts are peeled off by a scrap removing unit 108 and disposed as a waste.

Structure of Ejecting Head

Figure 7A:
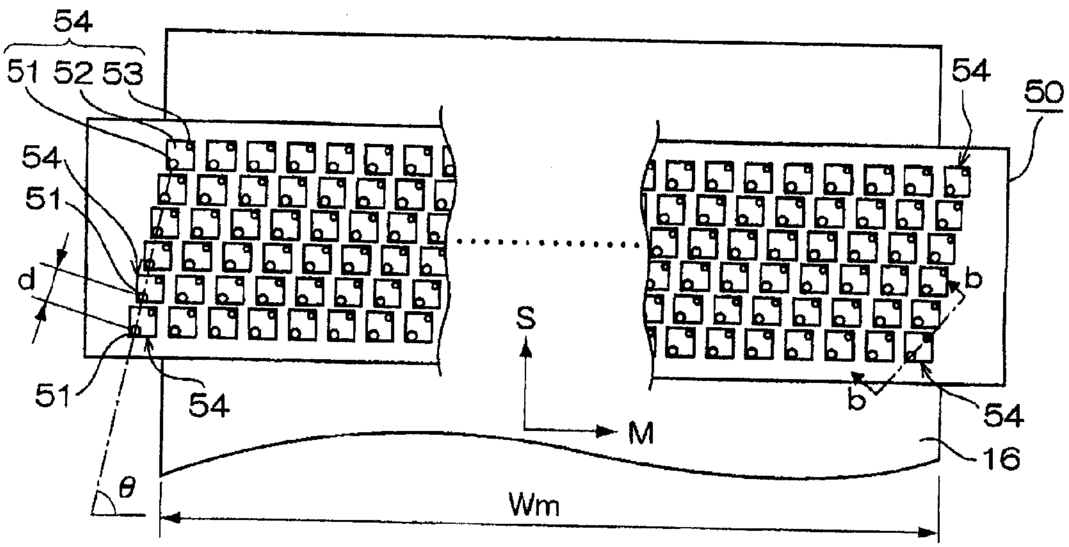
FIG. 7A is a plan view showing an example of a basic entire structure of the ejecting head shown in FIG. 6.

FIG. 7A is a plan perspective view showing an example of the entire basic structure of an ejecting head marked with the number 50 which is representative of the ejecting heads 102Y, 102C, 102M, and 102K.

The ejecting head 50 shown as one example in FIG. 7A is a so-called full-line head equipped with a number of nozzles 51 (liquid ejection ports) that eject liquid toward the recording medium 16 arranged in a two-dimensional manner over the length corresponding to the width Wm of the recording medium 16 in a direction (the main scanning direction indicated by an arrow M) which is perpendicular to a direction of conveying the recording medium 16 (the vertical scanning direction indicated by an arrow S).

In the ejecting head 50, plural pressure chamber units 54 each consisting of a nozzle 51, a pressure chamber 52 communicating to the nozzle 51 and a liquid supplying port 53 are arranged along two directions, i.e., the main scanning direction M and an inclined direction at a prescribed acute angle θ (0 degree<θ<90 degrees) with the main scanning direction M. For illustration purpose, only a part of the pressure chamber unit 54 is shown in FIG. 7A.

The nozzles 51 are arranged at a regular pitch d in the inclined direction at a prescribed acute angle θ with the main scanning direction M, which can be equated to that in which the nozzles are arranged in a straight line along with the main scanning direction M at an interval of "d×cos θ".

Figure 7B:
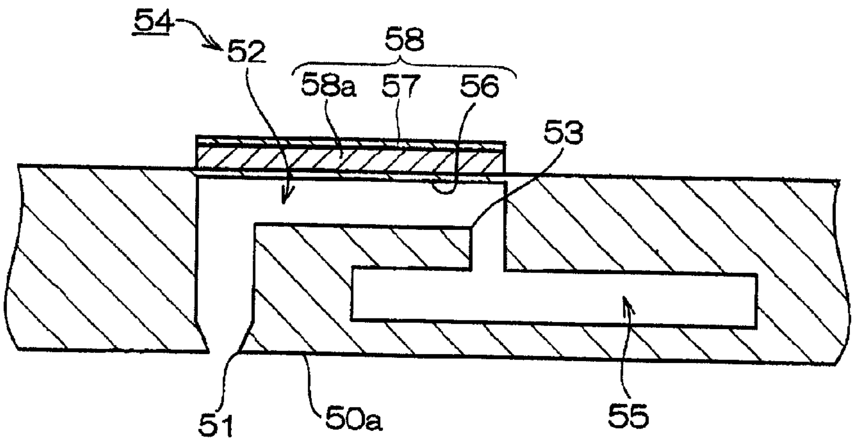
FIG. 7B is a b-b line section of FIG. 7A.

FIG. 7B shows a cross section along the b-b line shown in FIG. 7A of the pressure chamber unit 54 as an ejection element that constitutes the ejection head 50.

Each pressure chamber 52 communicates with a common liquid chamber 55 via the liquid supplying port 53. The common liquid chamber 55 communicates with a tank as a liquid supplying source (not shown), from which the liquid is supplied and distributed to each pressure chamber 52 via the common liquid chamber 55.

A piezoelectric body 58*a* is positioned on a vibrating plate 56 that forms a top face of the pressure chamber 52, and an individual electrode 57 is positioned on the piezoelectric body 58*a*. The vibrating plate 56 is grounded and functions as a common electrode. These vibrating plate 56, individual electrode 57 and piezoelectric body 58*a* constitute a piezoelectric actuator 58 that serves as a means of generating liquid ejection force.

When a prescribed driving voltage is applied to the individual electrode 57 in the piezoelectric actuator 58, the piezoelectric body 58*a* is deformed to change the volume of the pressure chamber 52, resulting in the change in pressure in the pressure chamber 52, and thereby a liquid is ejected from the nozzle 51. When the volume of the pressure chamber 52 returns back to the initial state after the ejection of the liquid, a new liquid is supplied to the pressure chamber 52 from the common liquid chamber 55 via the liquid supplying port 53.

In FIG. 7A, an example is shown in which plural nozzles 51 are arranged in a two-dimensional manner as the structure capable of forming an image with high resolution on the recording medium 16 at high-speed. However, the structure of the ejecting head in the invention is not particularly limited to the above structure and may be a structure in which the nozzles are arranged in a one-dimensional manner. The structure of the pressure chamber unit 54 as an ejection element that constitutes the ejecting head is also not particularly limited to the example shown in FIG. 7B. For example, the common liquid chamber 55 may be positioned above the pressure chamber 52 (i.e., the opposite side of the ejection face 50*a*) instead of positioning the same under the pressure chamber 52 (i.e., the ejection face 50*a* side of the pressure chamber 52). Further, the liquid ejection force may be generated by an exothermic body instead of the piezoelectric body 58*a*.

In the ink jet recording device in the invention, other means such as ejection of the undercoating liquid from nozzles may also be used for the application of the undercoating liquid onto the recording medium, instead of coating.

The device used for the coating is not particularly limited, and known coating devices can be selected as appropriate according to usage. Examples thereof include an air doctor coater, a blade coater, a rod coater, a knife coater, a squeeze coater, an impregnating coater, a reverse roll coater, a transfer roll coater, a gravure coater, a kiss roll coater, a cast coater, a spray coater, a curtain coater, and an extruding coater.

Liquid Supply System

Figure 8:
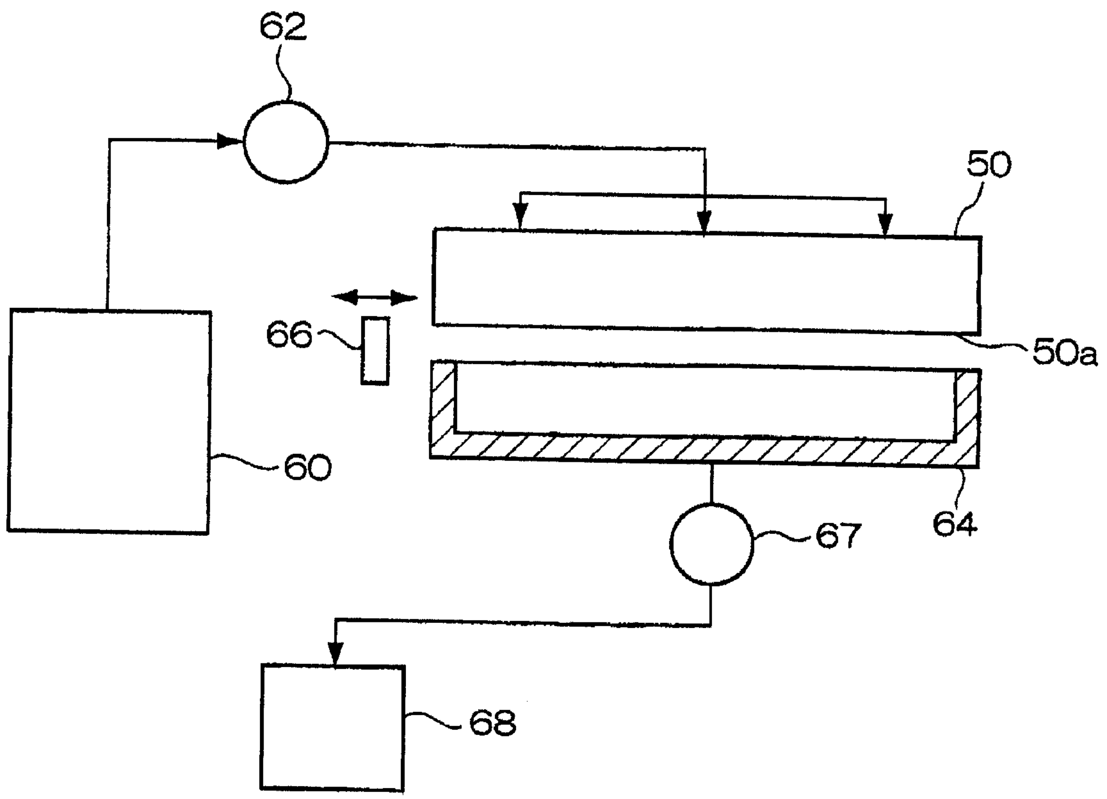
FIG. 8 is a schematic view showing an exemplary configuration of a liquid supplying system that constitutes the image recording device.

FIG. 8 is a schematic view showing a configuration of the liquid supply system in the image recording device 100.

A liquid tank 60 supplies a liquid to the ejecting head 50 as a base tank. In the midstream of a tube that connects the liquid tank 60 and the ejecting head 50, a liquid supplying pump 62 that sends the liquid to the ejecting head 50 is provided. The tube, liquid tank 60 and the ejecting head 50 preferably have a temperature which is regulated together with the ink contained therein, by a temperature detecting means and a heater. The ink temperature is preferably regulated to a range of from 40° C. to 80° C.

The image recording device 100 is provided with a cap 64 as a means for preventing a meniscus of the nozzle 51 from drying during the intermission of ejection, or from increasing in viscosity in the vicinity of the meniscus, and a cleaning blade 66 as a means for cleaning the ejection face 50*a*. A maintenance unit including the cap 64 and the cleaning blade 66 can be transferred relatively to the ejecting head 50 by a transfer system (not shown), and can be transferred to a maintenance position positioned below the ejecting head 50 from a prescribed retracting position as necessary.

The cap 64 is elevated relatively to the ejecting head 50 with an elevation mechanism (not shown). The elevation mechanism is designed to cover at least the region of the nozzle in the ejection face 50*a* with the cap 64, by elevating the cap 64 up to a prescribed position and attaching the cap 64 to the ejecting head 50.

The cap 64 preferably has the inside thereof divided into plural areas each corresponding to each row of the nozzles by dividing walls, and each of the divided areas can be selectively suctioned using a selector or the like.

The cleaning blade is composed of an elastic member such as rubber, and is capable of sliding on the ejection face 50*a* of the ejecting head 50 with a transfer mechanism for the cleaning blade (not shown). When the liquid droplets or foreign materials are attached onto the ejection face 50*a*, the ejection face 50*a* is wiped off by sliding the cleaning blade 66 on the ejection face 50*a* and cleaned.

A suction pump 67 sucks a liquid from the nozzle 51 of the ejecting head 50 while the ejection face 50*a* of the ejecting head 50 is covered with the cap 64, and sends the sucked liquid to a collection tank 68.

The above suction operation is also performed when the liquid tank 60 is loaded in the image recording device 100 and the liquid tank 60 is filled with a liquid from the liquid tank 60 (at the time of the initial filling) or when the liquid having viscosity that has been increased during the long-term cessation is removed (at the time of starting the operation after a long-term intermission).

Note that there are two types of ejections from the nozzle: first, a normal ejection performed onto a recording medium such as paper in order to form an image; and second, a purge performed onto the cap 64 serving as a liquid receiver (also referred to as a blank ejection).

Further, when air bubbles are mixed into the nozzle 51 or the pressure chamber 52 in the ejecting head 50 or increase in the viscosity in the nozzle 51 exceeds a certain level, the liquid cannot be ejected from the nozzle 51 by the above-described blank ejection. In this case, the liquid with the air bubbles or increased viscosity in the pressure chamber 52 in the ejecting head 50 is sucked by the suction pump 67 by applying the cap 64 onto the ejection face 50*a* in the ejecting head 50.

The ejecting head 50, liquid tank 60, liquid supplying pump 62, cap 64, cleaning blade 66, suction pump 67, collection tank 68 and an ink flowing route that connects these units, as well as other members and equipments with which the ink directly contact, preferably have dissolution resistance and swelling resistance. Further, these members and equipments preferably have a light shielding property.

Control System

Figure 9:
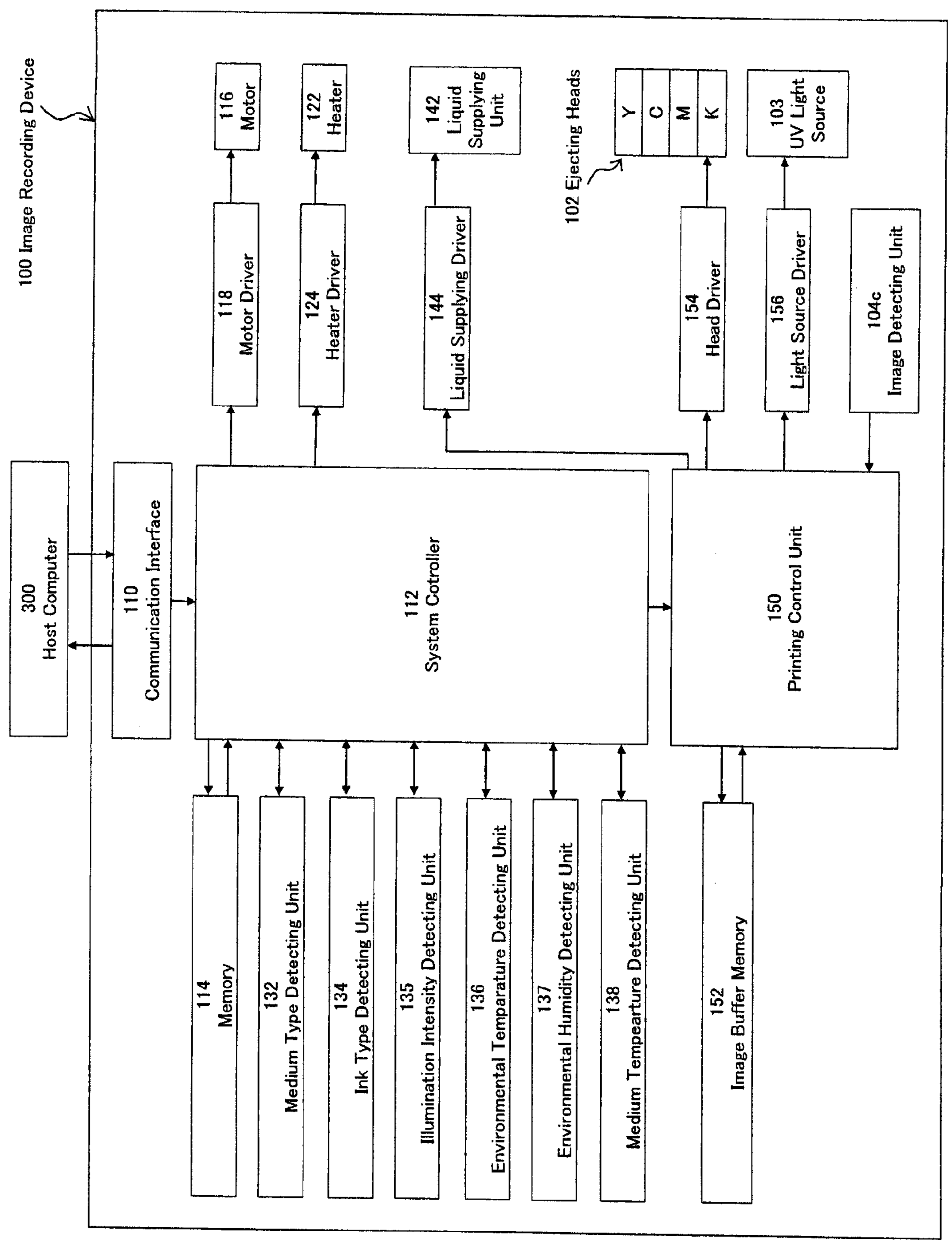
FIG. 9 is a block diagram showing an exemplary configuration of a control system that constitutes the image recording device.

FIG. 9 is a block diagram of the main part showing a system configuration of the image recording device 100.

In FIG. 9, the image recording device 100 is mainly composed of an image forming unit 102, image detecting unit 104*c*, UV light source 103, communication interface 110, system controller 112, memory 114, image buffer memory 152, motor for transportation 116, motor driver 118, heater 122, heater driver 124, medium type detecting unit 132, ink type detecting unit 134, illumination intensity detecting unit 135, environmental temperature detecting unit 136, environmental humidity detecting unit 137, medium temperature detecting unit 138, liquid supplying unit 142, liquid supplying driver 144, printing control unit 150, head driver 154, and a light source driver 156.

Since the image forming unit 102 is shown as a representative of the ejecting heads 102Y, 102C, 102M and 102K shown in FIG. 6, the UV light source is shown as a representative of the curing light sources 103P, 103Y, 103C, 103M and 103K shown in FIG. 6, and the image detecting unit 104*c* is the same as the one described in FIG. 6 which have been mentioned above, further explanations thereof are omitted here.

The communication interface 110 is an image data inputting means that receives the image data sent from a host computer 300. For the communication interface 110, wired interfaces such as USB (Universal Serial Bus) or IEEE1394, or wireless interfaces can be applied. The image data inputted into the image recording device 100 via the communication interface 110 are temporarily memorized in a first memory 114 for memorizing image data.

The system controller 112 is composed of a central processing unit (CPU), its surrounding circuit, and the like, and is a main controlling means of controlling the entire image recording device 100 according to a prescribed program that has been previously memorized in the first memory 114. That is, the system controller 112 controls each unit of the communication interface 110, motor driver 118, heater driver 124, medium type detecting unit 132, ink type detecting unit 134, printing control unit 150 and the like.

The motor for transportation 116 imparts a driving force to rollers, belts or the like that transport a recording medium. By this motor for transportation 116, the ejecting head 50 that constitutes the image forming unit 102 and the recording medium move relatively to each other. The motor driver 118 is a circuit that drives the motor for transportation 116 in accordance with the instructions given from the system controller 112.

The heater 122 is a circuit that drives a heater (or a cooling element) 122 which is not shown in the Figure, and maintains the temperature of the recording medium to be constant. The heater driver 124 is a circuit that drives the heater 122 in accordance with the instructions given from the system controller 112.

The medium type detecting unit 132 detects the type of the recording medium. There are various embodiments of detecting the type of the recording medium, and examples thereof include an embodiment of detecting the type by a sensor provided at a paper supplying unit which is not shown in the Figure; an embodiment of inputting the type by the operation of a user; an embodiment of inputting the type from the host computer 300; and an embodiment in which the type is automatically detected by analyzing the image data (for example, resolution or color) inputted from the host computer 300 or supplemental data of the image data.

The ink type detecting unit 134 detects the type of the ink. There are various embodiments of detecting the type of the ink and examples thereof include an embodiment of detecting by a sensor provided in the liquid storage/loading unit which is not shown in the Figure; an embodiment of inputting the type by the operation of a user; an embodiment of inputting the type from the host computer 300; and an embodiment in which the type is automatically detected by analyzing the image data (for example, resolution or color) inputted from the host computer 300 or supplemental data of the image data.

The illumination intensity detecting unit 135 detects the illumination intensity of the UV rays emitted from the UV light source 103. Examples of the embodiments of detecting the illumination intensity include an embodiment of detecting the illumination intensity by a sensor provided near the UV light source 103 shown in FIG. 6. The feedback of the output of this illumination intensity sensor is sent to the output of the UV light source.

The environmental temperature detecting unit 136 detects the temperatures of the outside air and the inside of the image recording device. Examples of the embodiments of detecting the environmental temperature include an embodiment of detecting the environmental temperature by a sensor provided at the outside or inside of the device.

The environmental humidity detecting unit 137 detects the humidity of the outside air and the inside of the image recording device. Examples of the embodiments of detecting the environmental humidity include an embodiment of detecting the humidity by a sensor provided at the outside or the inside of the device.

The medium temperature detecting unit 138 detects the temperature of the recording medium at the time of forming an image. There are various embodiments of detecting the medium temperature and examples thereof include an embodiment of detecting the temperature by a contact type temperature sensor and an embodiment of detecting the temperature by a non-contact type temperature sensor provided above the recording medium 16. The temperature of the recording medium is maintained to be constant by the heater 122.

The liquid supplying unit 142 is composed of a tube through which the ink flows from the liquid tank 60 shown in FIG. 8 to the image forming unit 102, the liquid supplying pump 62, and the like.

The liquid supplying driver 144 is a circuit that drives the liquid supplying pump that constitutes the liquid supplying unit and the like so that the liquid can be supplied to the image forming unit 102.

The printing control unit 150 produces the data (ejection data) necessary for each ejecting head 50 that constitute the image forming unit 102 to perform ejection (jetting) toward the recording medium based on the image data inputted in the image recording device 100. That is, the printing control unit 150 functions as an image processing means that performs image processing such as various processes, corrections or the like to generate the ejection data from the image data stored in the first memory 114 in accordance with the control of the system controller 112, and supplies the generated ejection data to the head driver 154.

The printing control unit 150 is accompanied with a second memory 152, and the ejection data and the like are temporarily stored in the second memory 152 at the time of performing the image processing in the printing control unit 150.

In FIG. 9, the second memory 152 is shown as an embodiment in which it accompanies the printing control unit 150. However, the first memory 114 can also function as the second memory 152 at the same time. Further, the printing control unit 150 and the system controller 112 can also be integrated and configured with a single processor.

The head driver 154 outputs a driving signal for the ejection to each ejecting head 50 that constitute the image forming unit 12 based on the ejection data given from the printing control unit 150 (practically, it is the ejection data stored in the second memory 152). The driving signal for the ejection outputted from this head driver 154 is given to each ejecting head 50 (specifically, the actuator 58 shown in FIG. 7B), the liquid (liquid droplets) is ejected onto the recording medium from the ejecting head 50.

A light source driver 156 is a circuit that controls the voltage, time and the timing to be inputted in the UV light source 103 based on the instructions given from the printing control unit 150, illumination intensity detected by the illumination intensity detecting unit 135, environmental temperature detected by the environmental temperature detecting unit 136, environmental humidity detected by the environmental humidity detecting unit 137 and the medium temperature detected by the medium temperature detecting unit 138, and drives the UV light source 103.

The following are the exemplary embodiments according to the invention:

1. An ink jet recording method comprising:

applying an undercoating liquid containing a polymer onto a recording medium;

partially curing the undercoating liquid that has been applied onto the recording medium; and recording an image by ejecting an ink that is curable by irradiation with actinic energy onto the partially cured undercoating liquid.

2. The ink jet recording method of 1, wherein the polymer is an acrylamide polymer.

3. The ink jet recording method of 1, wherein the undercoating liquid is partially cured by irradiation with actinic energy rays.

4. The ink jet recording method of 1, wherein the undercoating liquid contains a radical polymerizable composition.

5. The ink jet recording method of 1, wherein the image is recorded with a multi-color ink set, and the method further comprises partially curing of the ink of at least one color ejected onto the recording medium.

6. The ink jet recording method of 1, further comprising promoting of the curing of the ink and the undercoating liquid.

7. The ink jet recording method of 1, wherein the curing sensitivity of the ink is equal to or higher than the curing sensitivity of the undercoating liquid.

8. The ink jet recording method of 1, wherein the polymer is oil-soluble.

9. The ink jet recording method of 1, wherein the recording medium is non-permeable or slowly-permeable.

10. The ink jet recording method of 1, wherein the undercoating liquid is applied by a coater.

11. An ink jet recording device comprising:

an undercoating liquid application unit that applies an undercoating liquid containing a polymer onto a recording medium;

an undercoating liquid curing unit that is provided downstream of the undercoating liquid application unit in a moving direction of the recording medium and that partially cures the undercoating liquid by applying energy to at least a portion of the undercoating liquid; and an image recording unit that is provided downstream of the undercoating liquid curing unit in a moving direction of the recording medium and that records an image by ejecting, onto the partially cured undercoating liquid, an ink that is curable by irradiation with actinic energy rays.

12. The ink jet recording device of 11, further comprising:

a conveyance unit that conveys the recording medium; and actinic energy rays irradiation unit that is provided downstream of the image recording unit in a direction in which the recording medium is conveyed, and that irradiates, with actinic energy rays, the recording medium on which an image has been recorded by the image recording unit and further promotes the curing of the ink and the undercoating liquid, wherein the image recording unit ejects the ink from at least one line-formation ink jet head, the head having a length corresponding to the entire width of a recordable width of the recording medium and being arranged in a direction perpendicular to the direction in which the recording medium is conveyed.

13. The ink jet recording device of 11, wherein the polymer is an acrylamide polymer.

14. The ink jet recording device of 11, wherein the undercoating liquid is partially cured by irradiation with actinic energy rays.

15. The ink jet recording device of 11, wherein the undercoating liquid contains a radical polymerizable composition.

16. The ink jet recording device of 11, wherein the image is recorded with a multi-color ink set, and the ink jet recording device carries out partially curing of the ink of at least one color ejected onto the recording medium.

17. The ink jet recording device of 11, wherein the curing sensitivity of the ink is equal to or higher than the curing sensitivity of the undercoating liquid.

18. The ink jet recording device of 11, wherein the polymer is oil-soluble.

19. The ink jet recording device of 11, wherein the recording medium is non-permeable or slow-permeable.

20. The ink jet recording device of 11, wherein the undercoating liquid is applied by a coater.

EXAMPLES

Further details of the invention will now be explained by reference to Examples. However, the invention is not limited to the following examples as long as its main purport is not exceeded.

Example 1

<Preparation of Cyan Pigment Dispersion P-1>

PB15:3 (trade name: IRGALITE BLUE GLO, a pigment manufactured by Ciba Specialty Chemicals K.K.) 16 g, dipropylene glycol diacrylate (DPGDA, manufactured by DAICEL-CYTEC Company, Ltd) 48 g, and SOLSPERSE 32000 (a dispersant manufactured by Zeneca) 16 g were mixed with a stirrer for an hour. The resulting mixture was then dispersed with an Eiger mill and a cyan pigment dispersion P-1 was obtained.

The dispersion was conducted under the conditions that the mill was filled with zirconia beads having a diameter of 0.65 mm at a filling rate of 70%, the peripheral velocity was 9 m/s, and the dispersion time was 1 hours.

<Preparation of Cyan Ink Jet Recording Liquid I-1>

The following components were mixed by stirring and dissolved, and a cyan ink jet recording liquid I-1 was prepared. The surface tension at 25° C. of the cyan ink jet recording liquid I-1 was 27 mN/m, and the viscosity at 25° C. thereof was 15 mPa·s.

—Components—

| | |
|---|---|
| Pigment dispersion P-1 | 2.16 g |
| Dipropylene glycol diacrylate (polymerizable compound, DPGDA; manufactured by DAICEL-CYTEC Company, Ltd) | 9.84 g |
| Irg 907 (a photopolymerization initiator shown below; manufactured by Ciba Specialty Chemicals K.K.) | 1.5 g |
| DAROCURE ITX (a sensitizer shown below; manufactured by Ciba Specialty Chemicals K.K.) | 0.75 g |
| DAROCURE EDB (a sensitizer shown below; manufactured by Ciba Specialty Chemicals K.K.) | 0.75 g |

<Preparation of Magenta Pigment Dispersion P-2>

The magenta pigment dispersion P-2 was prepared in the same manner as that in the preparation of the cyan pigment dispersion P-1, except that a pigment PV 19 (Cinquasia Mazenta RT-355D; a pigment manufactured by Ciba Specialty Chemicals K.K.) and BYK-168 (a dispersant manufactured by BYK-Chemie Japan K.K.) were used instead of PB15:3 and SOLSPERSE 32000, respectively.

<Preparation of Yellow Pigment Dispersion P-3>

The yellow pigment dispersion P-3 was prepared in the same manner as that in the preparation of the cyan pigment dispersion P-1, except that a pigment PY 120 (NOVOPERM YELLOW H2G; a pigment manufactured by Clariant Japan K.K.) and BYK-168 (a dispersant manufactured by BYK-Chemie Japan K.K.) were used instead of PB15:3 and SOLSPERSE 32000, respectively.

<Preparation of Black Pigment Dispersion P-4>

The black pigment dispersion P-4 was prepared in the same manner as that in the preparation of the cyan pigment dispersion P-1, except that a carbon black (SPECIAL BLACK 250; manufactured by Degussa Japan Co., Ltd.) and SOLSPERSE 5000 (a dispersant manufactured by Zeneca) were used instead of PB15:3 and SOLSPERSE 32000, respectively.

<Preparation of Magenta Ink Jet Recording Liquid I-2>

The following components were mixed by stirring and dissolved, and a magenta ink jet recording liquid I-2 was prepared. The surface tension at 25° C. of the magenta ink jet recording liquid I-2 was 27 mN/m, and the viscosity at 25° C. thereof was 16 mPa·s.

—Components—

| | |
|---|---|
| Pigment dispersion P-2 | 5.86 g |
| Dipropylene glycol diacrylate (polymerizable compound, DPGDA; manufactured by DAICEL-CYTEC Company, Ltd) | 6.14 g |
| Irg 907 (a photopolymerization initiator shown below; manufactured by Ciba Specialty Chemicals K.K.) | 1.5 g |

-continued

| | |
|---|---|
| DAROCURE ITX (a sensitizer shown below; manufactured by Ciba Specialty Chemicals K.K.) | 0.75 g |
| DAROCURE EDB (a sensitizer shown below; manufactured by Ciba Specialty Chemicals K.K.) | 0.75 g |

<Preparation of Yellow Ink Jet Recording Liquid I-3>

The following components were mixed by stirring and dissolved, and a yellow ink jet recording liquid I-3 was prepared. The surface tension at 25° C. of the yellow ink jet recording liquid I-3 was 27 mN/m, and the viscosity at 25° C. thereof was 16 mPa·s.

—Components—

| | |
|---|---|
| Pigment dispersion P-3 | 4.68 g |
| Dipropylene glycol diacrylate (polymerizable compound, DPGDA; manufactured by DAICEL-CYTEC Company, Ltd) | 7.32 g |
| Irg 907 (a photopolymerization initiator shown below; manufactured by Ciba Specialty Chemicals K.K.) | 1.5 g |
| DAROCURE ITX (a sensitizer shown below; manufactured by Ciba Specialty Chemicals K.K.) | 0.75 g |
| DAROCURE EDB (a sensitizer shown below; manufactured by Ciba Specialty Chemicals K.K.) | 0.75 g |

<Preparation of Black Ink Jet Recording Liquid I-4>

The following components were mixed by stirring and dissolved, and a black ink jet recording liquid I-4 was prepared. The surface tension at 25° C. of the black ink jet recording liquid I-4 was 27 mN/m, and the viscosity at 25° C. thereof was 15 mPa·s.

—Components—

| | |
|---|---|
| Pigment dispersion P-4 | 3.3 g |
| Dipropylene glycol diacrylate (polymerizable compound, DPGDA; manufactured by DAICEL-CYTEC Company, Ltd) | 8.7 g |
| Irg 907 (a photopolymerization initiator shown below; manufactured by Ciba Specialty Chemicals K.K.) | 1.5 g |
| DAROCURE ITX (a sensitizer shown below; manufactured by Ciba Specialty Chemicals K.K.) | 0.75 g |
| DAROCURE EDB (a sensitizer shown below; manufactured by Ciba Specialty Chemicals K.K.) | 0.75 g |

<Preparation of Undercoating Liquid II-1>

The following components were mixed by stirring and dissolved, and the undercoating liquid II-1 that does not contain a polymer was prepared. The surface tension at 25° C. of the undercoating liquid II-1 was 22 mN/m, and the viscosity at 25° C. thereof was 12 mPa·s.

—Components—

| | |
|---|---|
| Dipropylene glycol diacrylate (polymerizable compound, DPGDA; manufactured by DAICEL-CYTEC Company, Ltd) | 11.85 g |
| Irg 907 (a photopolymerization initiator shown below; manufactured by Ciba Specialty Chemicals K. K.) | 1.5 g |
| DAROCURE ITX (a sensitizer shown below; manufactured by Ciba Specialty Chemicals K. K.) | 0.75 g |

-continued

| | |
|---|---|
| DAROCURE EDB (a sensitizer shown below; manufactured by Ciba Specialty Chemicals K. K.) | 0.75 g |
| BYK-307 (manufactured by BYK-Chemie Japan K. K.) | 0.15 g |

Irg 907

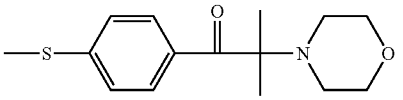

DAROCURE ITX

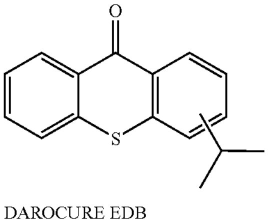

DAROCURE EDB

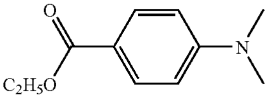

<Preparation of Undercoating Liquids II-2 to II-22>

The undercoating liquid II-2 to II-22 were prepared in the same manner as the preparation of the undercoating liquid II-1, except that the polymers were further added in the amounts as shown in the following Table 1.

In the above preparation process, the addition amount of the DPGDA was reduced in accordance with the addition amount of the polymer to be added so that the total amount of the undercoating liquid was 15 g. The type of the polymers to be added is described in Table 1.

TABLE 1

| Undercoating Liquid Standard | Polymer | Weight average molecular weight | Addition amount [mass %: with respect to the undercoating liquid] |
|---|---|---|---|
| II-1 | — | — | — |
| II-2 | P-17 | 20000 | 1% |
| II-3 | P-17 | 20000 | 2.5% |
| II-4 | P-17 | 20000 | 5% |
| II-5 | P-17 | 20000 | 7.5% |
| II-6 | P-17 | 20000 | 10% |
| II-7 | P-17 | 20000 | 15% |
| II-8 | P-17 | 20000 | 30% |
| II-9 | P-44 | 20000 | 10% |
| II-10 | P-82 | 20000 | 10% |
| II-11 | P-85 | 20000 | 10% |
| II-12 | P-67 | 20000 | 10% |
| II-13 | P-25 | 20000 | 10% |
| II-14 | P-84 | 20000 | 10% |
| II-15 | P-23 | 20000 | 10% |
| II-16 | P-13 | 20000 | 10% |
| II-17 | P-27 | 20000 | 10% |
| II-18 | P-87 | 20000 | 10% |
| II-19 | P-88 | 20000 | 10% |
| II-20 | P-28 | 20000 | 10% |
| II-21 | P-70 | 20000 | 10% |
| II-22 | P-79 | 20000 | 10% |

The surface tensions and viscosities of the above undercoating liquids II-2 to II-22 at 25° C. are shown in the following Table 2.

TABLE 2

| Undercoating Liquid Standard | Surface Tension [mN/m] | Viscosity [mPa · s] |
|---|---|---|
| II-2 | 22 | 15 |
| II-3 | 22 | 20 |
| II-4 | 22 | 35 |
| II-5 | 22 | 60 |
| II-6 | 22 | 95 |
| II-7 | 22 | 270 |
| II-8 | 22 | 1500 |
| II-9 | 22 | 120 |
| II-10 | 22 | 110 |
| II-11 | 22 | 150 |
| II-12 | 22 | 140 |
| II-13 | 22 | 105 |
| II-14 | 22 | 130 |
| II-15 | 22 | 85 |
| II-16 | 22 | 150 |
| II-17 | 22 | 80 |
| II-18 | 22 | 60 |
| II-19 | 22 | 65 |
| II-20 | 22 | 60 |
| II-21 | 22 | 140 |
| II-22 | 22 | 120 |

In the Examples, the surface tension was measured by a surface tensiometer (CBVP-Z, manufactured by KYOWA INTERFACE SCIENCE Co., Ltd.), and the viscosity was measured by a portable digital viscometer for laboratory use (VISCOSTICK, manufactured by MARUYASU INDUSTRIES Co., Ltd.)

<Image Recording and Evaluation>

An experimental apparatus having the following units were prepared for an image recording apparatus: a conveying unit that conveys a recording medium by rotating a driving roll; a roll coater that applied an undercoating liquid on the recording medium; a light source that partially cures the applied undercoating liquid consisting of an array of extra-high voltage mercury lamps arranged in parallel with a direction perpendicular to a direction in which the recording medium is conveyed, i.e., the main scanning direction (in a width direction) upon recording onto the recording medium; an ink jet printing device that records an image mounted with four full-line head sets, wherein each head set consists of two heads (manufactured by TOSHIBA TEC CORPORATION, droplet frequency; 6.2 KHz, number of nozzles; 636, nozzle density; 300 npi (nozzle/inch, hereinafter the same), droplet size; from 6 pL to 42 pl which is changeable in seven levels), and thus the total nozzle density of each head set is 600 npi; and a metal halide lamp that irradiates with actinic energy rays to perform further curing of the undercoating liquid and the recorded image.

On a conveyor route for the recording medium, the roll coater and the light source that partially cures the undercoating liquid are arranged in this order from upstream to downstream, as shown in FIG. 6, and the head unit having four heads for yellow, cyan, magenta and black and the extra-high mercury lamps that partially cure the ink are arranged downstream of the light source, wherein each of the light sources is respectively arranged downstream of each head, in such a manner that the recording medium can be conveyed right under the heads. The heads are fixed to the apparatus in the order of yellow, cyan, magenta and black, from upstream of the direction in which a recording medium is conveyed. Further, the metal halide lamp is provided downstream of the head for black.

In this Example, the experimental apparatus was charged with the undercoating liquid II-1 and the ink jet recording liquids I-1 to I-4 of four colors in the ink jet printing part thereof, then an image of 600 dpi×600 dpi was recorded onto the recording medium in accordance with the method as described below.

First, the undercoating liquid was uniformly applied to a thickness of 5 μm by a roll coater (application rate; 400 mm/s). After the application of the undercoating liquid, exposure was performed with the light source for partial curing of the undercoating liquid (light intensity; 500 mW/$cm^2$), then the applied undercoating liquid was partially cured.

At this time, the portion from the surface to a point 1 μm from the surface in a depth direction of the undercoating liquid on the recording medium was partially cured, and the internal side thereof was completely cured. The partially cured surface portion was scraped together and the viscosity at 25° C. thereof was measured by a portable digital viscometer for laboratory use (VISCOSTICK, manufactured by MARUYASU INDUSTRIES Co., Ltd.). The viscosity of the surface portion was 1000 mPa·s.

Subsequently, the ink jet recording liquids I-1 to I-4 were respectively ejected onto the recording medium on which the undercoating liquid has been applied, by the heads charged with the above ink jet recording liquids (here, irradiation for partial curing of the ink by the extra-high voltage mercury lamps provided together was not performed), and the liquids were cured by irradiating ultraviolet rays having a wavelength of 365 nm at a light intensity of 3000 mW/$cm^2$ with the metal halide lamp.

In this way, mono-color images were printed in the form of a line of 600 dpi in the main scanning direction and 150 dpi in the sub scanning direction (one drop is used, drop size; 6 pL), and in the form of a solid image of 600 dpi in the main scanning direction and 450 dpi in the sub scanning direction (two drops are used, drop size; 12 pL), by ejecting the ink jet recording liquids I-1 to I-4, respectively.

Additionally, solid images of 600 dpi in the main scanning direction and 450 dpi in the sub scanning direction (two drops are used, drop size; 12 pL) were printed with a change of the angle of the head.

Further, a full-color image of a woman was printed using all of the colors under the conditions of 600 dpi in the main scanning direction and 600 dpi in the sub scanning direction. In this process, pinning exposures were repeatedly performed after each ejection of each color by the extra-high voltage mercury lamps (light intensity; 500 mW/$cm^2$), and the inks of each color was partially cured (delivering rate of the recording medium; 400 mm/s, printed with three tones of from 6 to 12 pL, an anti-aliasing process was performed). Thereafter, irradiation with ultraviolet rays (wavelength; 365 nm) was performed at a light intensity of 3000 mW/$cm^2$ by the metal halide lamp, thereby fixing the image.

In the above process, the interval between the completion of application of the undercoating liquid and the ejection of the first color liquid (the yellow ink jet recording liquid I-3) was set at 0.2 second. A recording sheet LINTEC YUPO 80 (manufactured by Lintec Corporation) was used as the recording medium.

After the recording of the image using the undercoating liquid II-1, the same processes were performed by using the above-mentioned undercoating liquids II-2 to II-22 in place of the undercoating liquid II-1.

Measurement and evaluation were made on the obtained images. The results are shown in Tables 3 to 7.

1. Evaluation of Line Width

The line width of the image in the form of a line was measured by a dot analyzer (DA6000, manufactured by Oji Scientific Instruments).

2. Evaluation of Solid Images of 600 dpi×600 dpi

The solid images were evaluated by visual observation in accordance with the following criteria:

A: No white spots were observed over the whole image.

B: White spots (5 μm or smaller) were slightly observed.

C: White spots (greater than 5 μm) were distinctly observed.

3. Evaluation of Solid Images of 600 dpi×450 dpi

The solid images were evaluated by visual observation in accordance with the following criteria:

A: No white spots were observed over the whole image.

B: White spots (5 μm or smaller) were slightly observed.

C: White spots (greater than 5 μm) were distinctly observed.

4. Evaluation of Practical Images

The full-color images of a woman were evaluated by visual observation in accordance with the following criteria:

A: A favorable image with sufficient density and sharpness was obtained.

B: A region with high density (e.g., the hair of the woman) appeared pale in some degree.

C: The color tone over the whole image appeared pale.

D: The image appeared indistinct.

TABLE 3

<Cyan Ink>

| Undercoating Liquid Standard | Line width μm | 600 × 600 dpi Solid image | 600 × 450 dpi Solid image | Notes |
|---|---|---|---|---|
| II-1 | 60 | B | B | Comparative example |
| II-2 | 52 | A | A | The invention |
| II-3 | 50 | A | A | The invention |
| II-4 | 46 | A | A | The invention |
| II-5 | 44 | A | A | The invention |
| II-6 | 42 | A | A | The invention |
| II-7 | 40 | A | A | The invention |
| II-8 | 36 | A | A | The invention |
| II-9 | 42 | A | A | The invention |
| II-10 | 42 | A | A | The invention |
| II-11 | 42 | A | A | The invention |
| II-12 | 42 | A | A | The invention |
| II-13 | 42 | A | A | The invention |
| II-14 | 42 | A | A | The invention |
| II-15 | 45 | A | A | The invention |
| II-16 | 43 | A | A | The invention |
| II-17 | 54 | A | A | The invention |
| II-18 | 54 | A | A | The invention |
| II-19 | 54 | A | A | The invention |
| II-20 | 54 | A | A | The invention |
| II-21 | 54 | A | A | The invention |
| II-22 | 54 | A | A | The invention |

TABLE 4

<Magenta Ink>

| Undercoating Liquid Standard | Line width μm | 600 × 600 dpi Solid image | 600 × 450 dpi Solid image | Notes |
|---|---|---|---|---|
| II-1 | 60 | B | B | Comparative example |
| II-2 | 52 | A | A | The invention |

TABLE 4-continued

<Magenta Ink>

| Undercoating Liquid Standard | Line width μm | 600 × 600 dpi Solid image | 600 × 450 dpi Solid image | Notes |
|---|---|---|---|---|
| II-3 | 50 | A | A | The invention |
| II-4 | 46 | A | A | The invention |
| II-5 | 44 | A | A | The invention |
| II-6 | 42 | A | A | The invention |
| II-7 | 40 | A | A | The invention |
| II-8 | 36 | A | A | The invention |
| II-9 | 42 | A | A | The invention |
| II-10 | 42 | A | A | The invention |
| II-11 | 42 | A | A | The invention |
| II-12 | 42 | A | A | The invention |
| II-13 | 42 | A | A | The invention |
| II-14 | 42 | A | A | The invention |
| II-15 | 45 | A | A | The invention |
| II-16 | 43 | A | A | The invention |
| II-17 | 54 | A | A | The invention |
| II-18 | 54 | A | A | The invention |
| II-19 | 54 | A | A | The invention |
| II-20 | 54 | A | A | The invention |
| II-21 | 54 | A | A | The invention |
| II-22 | 54 | A | A | The invention |

TABLE 5

<Yellow Ink>

| Undercoating Liquid Standard | Line width μm | 600 × 600 dpi Solid image | 600 × 450 dpi Solid image | Notes |
|---|---|---|---|---|
| II-1 | 60 | B | B | Comparative example |
| II-2 | 52 | A | A | The invention |
| II-3 | 50 | A | A | The invention |
| II-4 | 46 | A | A | The invention |
| II-5 | 44 | A | A | The invention |
| II-6 | 42 | A | A | The invention |
| II-7 | 40 | A | A | The invention |
| II-8 | 36 | A | A | The invention |
| II-9 | 42 | A | A | The invention |
| II-10 | 42 | A | A | The invention |
| II-11 | 42 | A | A | The invention |
| II-12 | 42 | A | A | The invention |
| II-13 | 42 | A | A | The invention |
| II-14 | 42 | A | A | The invention |
| II-15 | 45 | A | A | The invention |
| II-16 | 43 | A | A | The invention |
| II-17 | 54 | A | A | The invention |
| II-18 | 54 | A | A | The invention |
| II-19 | 54 | A | A | The invention |
| II-20 | 54 | A | A | The invention |
| II-21 | 54 | A | A | The invention |
| II-22 | 54 | A | A | The invention |

TABLE 6

<Black Ink>

| Undercoating Liquid Standard | Line width μm | 600 × 600 dpi Solid image | 600 × 450 dpi Solid image | Notes |
|---|---|---|---|---|
| II-1 | 60 | B | B | Comparative example |
| II-2 | 52 | A | A | The invention |
| II-3 | 50 | A | A | The invention |
| II-4 | 46 | A | A | The invention |
| II-5 | 44 | A | A | The invention |
| II-6 | 42 | A | A | The invention |

TABLE 6-continued

<Black Ink>

| Undercoating Liquid Standard | Line width μm | 600 × 600 dpi Solid image | 600 × 450 dpi Solid image | Notes |
|---|---|---|---|---|
| II-7 | 40 | A | A | The invention |
| II-8 | 36 | A | A | The invention |
| II-9 | 42 | A | A | The invention |
| II-10 | 42 | A | A | The invention |
| II-11 | 42 | A | A | The invention |
| II-12 | 42 | A | A | The invention |
| II-13 | 42 | A | A | The invention |
| II-14 | 42 | A | A | The invention |
| II-15 | 45 | A | A | The invention |
| II-16 | 43 | A | A | The invention |
| II-17 | 54 | A | A | The invention |
| II-18 | 54 | A | A | The invention |
| II-19 | 54 | A | A | The invention |
| II-20 | 54 | A | A | The invention |
| II-21 | 54 | A | A | The invention |
| II-22 | 54 | A | A | The invention |

TABLE 7

<Practical Image>

| Undercoating Liquid Standard | Practical image | Notes |
|---|---|---|
| II-1 | B | Comparative example |
| II-2 | A | The invention |
| II-3 | A | The invention |
| II-4 | A | The invention |
| II-5 | A | The invention |
| II-6 | A | The invention |
| II-7 | A | The invention |
| II-8 | A | The invention |
| II-9 | A | The invention |
| II-10 | A | The invention |
| II-11 | A | The invention |
| II-12 | A | The invention |
| II-13 | A | The invention |
| II-14 | A | The invention |
| II-15 | A | The invention |
| II-16 | A | The invention |
| II-17 | A | The invention |
| II-18 | A | The invention |
| II-19 | A | The invention |
| II-20 | A | The invention |
| II-21 | A | The invention |
| II-22 | A | The invention |

From the results shown in Tables 3 to 7, it can be concluded that favorable fine-line description properties (fine-line reproducibility) can be obtained according to the invention in which a polymer is used. Further, as the addition amount of the polymer increases, an effect of obtaining an image with high density due to the coalescence of adjacent dots can also be attained at the same time. Additionally, it can be concluded that the acrylamide polymer is particularly preferable among the polymers that can be used in the invention, from the viewpoint of imparting a greater effect with a small addition amount thereof.

Example 2

The cyan ink jet recording liquid (I-1), magenta ink jet recording liquid (I-2), yellow ink jet recording liquid (I-3) and the undercoating liquid (II-6) used in Example 1 were prepared by adjusting the content of the initiator thereof so that the ratio of curing sensitivities represented by Sc/Su (Sc indicates the curing sensitivity of each ink jet recording liquid and Su indicates the curing sensitivity of the undercoating liquid) satisfies the values shown in Table 8. The change in the content of the polymerization initiator was compensated by changing the content of the dipropylene glycol diacrylate.

After curing the undercoating liquid to be in the same state of being cured as that in Example 1, an image was formed in which blank regions onto which no ink was ejected and lines of 1 mm width were alternately arranged, wherein the lines were formed by ejecting the inks of yellow, magenta and cyan in this order so as to overlap each other, using two drops, and further a black dot image (150 dpi×150 dpi, one drop) was superimposed thereon. After each ejection of the inks of each color, exposures were performed to cure the ink to be in the same state as that in Example 1.

The dot diameter of the black ink in the blank regions onto which no ink was ejected (du) and the dot diameter of the same in the regions onto which three colors of the inks have been ejected (dc) were measured. The resulting values of the ratio (dc/du) are shown in Table 8.

TABLE 8

| Sc/Su | dc/du |
|---|---|
| 5 | 0.7 |
| 2 | 1.0 |
| 1 | 1.0 |
| 1/2 | 1.1 |
| 1/5 | 1.3 |

According to the invention, an ink jet recording method and an ink jet recording device can be provided by which an image having excellent uniformity between various types of recording mediums can be recorded, irrespective of the type of the recording medium; ink bleeding or unevenness in line width or color due to coalescence of the ink droplets can be effectively suppressed; and an image can be well reproduced to details with high density while maintaining a uniform dot diameter, irrespective of the form of the image, when an image having low dot density is recorded with a small amount of a liquid (e.g., an image having low resolution or density).

Therefore, according to the invention, a high-quality image clearly reproduced to details with high density can be obtained due to coalescence of adjacent ink droplets over the whole area, even when an inexpensive head unit having low resolution is used.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink jet recording method comprising:

applying an undercoating liquid containing a polymer and substantially no aqueous solvent onto a recording medium;

partially curing the undercoating liquid that has been applied onto the recording medium; and recording an image by ejecting an ink that contains substantially no water and is curable by irradiation with actinic energy onto the partially cured undercoating liquid, wherein the polymer is a water insoluble acrylamide-based polymer or a methacrylamide-based polymer.

2. The ink jet recording method of claim 1, wherein the polymer is an acrylamide polymer.

3. The ink jet recording method of claim 1, wherein the undercoating liquid is partially cured by irradiation with actinic energy rays.

4. The ink jet recording method of claim 1, wherein the undercoating liquid contains a radical polymerizable composition.

5. The ink jet recording method of claim 1, wherein the image is recorded with a multi-color ink set, and the method further comprises partially curing of the ink of at least one color ejected onto the recording medium.

6. The ink jet recording method of claim 1, further comprising promoting of the curing of the ink and the undercoating liquid.

7. The ink jet recording method of claim 1, wherein the curing sensitivity of the ink is equal to or higher than the curing sensitivity of the undercoating liquid.

8. The ink jet recording method of claim 1, wherein the polymer is oil-soluble.

9. The ink jet recording method of claim 1, wherein the recording medium is non-permeable or slowly-permeable.

10. The ink jet recording method of claim 1, wherein the undercoating liquid is applied by a coater.

11. The ink jet recording method of claim 1, wherein the polymer is not photopolymerizable.

12. The ink jet recording method of claim 1, wherein the undercoating liquid further contains a high boiling point solvent.

* * * * *